(12) United States Patent
Weinberger et al.

(10) Patent No.: US 6,782,392 B1
(45) Date of Patent: Aug. 24, 2004

(54) SYSTEM SOFTWARE ARCHITECTURE FOR A PASSENGER ENTERTAINMENT SYSTEM, METHOD AND ARTICLE OF MANUFACTURE

(75) Inventors: Alan J. Weinberger, Monrovia, CA (US); Douglas C. Infiesto, Chino Hills, CA (US); Mark Ackland, Pasadena, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/085,161

(22) Filed: May 26, 1998

(51) Int. Cl.[7] ............................................. G06F 17/30
(52) U.S. Cl. ...................... 707/104.1; 707/102; 707/10
(58) Field of Search .......................... 707/3, 10, 104.1, 707/102; 709/217, 313

(56) References Cited

U.S. PATENT DOCUMENTS

| | | |
|---|---|---|
| 3,602,891 A | 8/1971 | Clark et al. |
| 3,811,127 A | 5/1974 | Griffee et al. |
| 3,860,932 A | 1/1975 | Hochbrueckner |
| 3,868,497 A | 2/1975 | Vietor |
| 3,972,045 A | 7/1976 | Perret |
| 3,997,718 A | 12/1976 | Ricketts et al. |
| 4,047,175 A | 9/1977 | Taira et al. |
| 4,058,837 A | 11/1977 | Muntz |
| 4,099,780 A | 7/1978 | Schmidhuber |
| 4,118,733 A | 10/1978 | Sarson et al. |
| 4,187,760 A | 2/1980 | Holt |
| 4,281,352 A | 7/1981 | Hoffman |
| 4,283,740 A | 8/1981 | Okada |
| 4,290,083 A | 9/1981 | Collender |
| 4,352,200 A | 9/1982 | Oxman |
| 4,393,329 A | 7/1983 | Lehnert |
| 4,427,038 A | 1/1984 | Oesterle et al. |

(List continued on next page.)

FOREIGN PATENT DOCUMENTS

| | | |
|---|---|---|
| EP | 0230280 | 7/1987 |

(List continued on next page.)

OTHER PUBLICATIONS

Roth et al., Database management: The Heart of Integrated Avionics, Aerospace & electronics Conf., NAECON 1993., Proceedings of the IEEE 1993 National, pp. 535–541 vol. 1, May 1993.*

Satyanarayanan, Accessing Information on Demand at any Location Mobile Information Access, IEEE Personal Communications, pp. 26–33 col. 3 issue 1, Feb. 1996.*

*Primary Examiner*—Greta Robinson
(74) *Attorney, Agent, or Firm*—Nathan O. Jensen; Kyle Eppele

(57) ABSTRACT

A passenger entertainment system is configured and operated using system software to route and process passenger transactions from requesting computer processors and dispatch appropriate resources to fulfill the transactions. To achieve this, passenger transactions are transmitted to a message processor, which decodes them and generates a request in a predetermined format. The request is transmitted to a transaction dispatcher that routes the request to a passenger entertainment service manager. The passenger entertainment service manager generates a response to the request message by querying files in a database. Appropriate resources are dispatched to service the passenger transactions that are defined in the response to the query.

20 Claims, 24 Drawing Sheets

U.S. PATENT DOCUMENTS

| | | |
|---|---|---|
| 4,428,078 A | 1/1984 | Kuo |
| 4,433,344 A | 2/1984 | Gardin et al. |
| 4,465,907 A | 8/1984 | Minear et al. |
| 4,472,607 A | 9/1984 | Houng |
| 4,475,196 A | 10/1984 | La Zor |
| 4,490,117 A | 12/1984 | Parker |
| 4,513,315 A | 4/1985 | Dekker et al. |
| 4,521,021 A | 6/1985 | Dixon |
| 4,521,806 A | 6/1985 | Abraham |
| 4,554,579 A | 11/1985 | Citta |
| 4,554,993 A | 11/1985 | Houng |
| 4,573,072 A | 2/1986 | Freeman |
| 4,584,603 A | 4/1986 | Harrison |
| 4,591,906 A | 5/1986 | Morales-Garza et al. |
| 4,630,821 A | 12/1986 | Greenwald |
| 4,647,980 A | 3/1987 | Steventon et al. |
| 4,649,570 A | 3/1987 | Terbrack et al. |
| 4,684,981 A | 8/1987 | Toyoshima et al. |
| 4,692,569 A | 9/1987 | Winner |
| 4,765,481 A | 8/1988 | Walsh et al. |
| 4,787,027 A | 11/1988 | Prugh et al. |
| 4,835,604 A | 5/1989 | Konda et al. |
| 4,853,555 A | 8/1989 | Wheat |
| 4,853,764 A | 8/1989 | Sutter |
| 4,866,515 A | 9/1989 | Tagawa et al. |
| 4,866,787 A | 9/1989 | Olesen |
| 4,868,577 A | 9/1989 | Wingard |
| 4,896,209 A | 1/1990 | Matsuzaki et al. |
| 4,918,535 A | 4/1990 | Grabis et al. |
| 4,945,563 A | 7/1990 | Horton et al. |
| 4,975,696 A | 12/1990 | Salter, Jr. et al. |
| 4,997,233 A | 3/1991 | Sharon |
| 4,999,729 A | 3/1991 | Stifter |
| 5,001,555 A | 3/1991 | Park |
| 5,024,398 A | 6/1991 | Riedinger et al. |
| 5,035,005 A | 7/1991 | Hung |
| 5,051,822 A | 9/1991 | Rhoades |
| 5,179,447 A | 1/1993 | Lain |
| 5,181,107 A | 1/1993 | Rhoades |
| 5,193,208 A | 3/1993 | Yokota et al. |
| 5,208,590 A | 5/1993 | Pitts |
| 5,214,505 A | 5/1993 | Rabowsky et al. |
| 5,218,167 A | 6/1993 | Gasque, Jr. |
| 5,220,419 A | 6/1993 | Sklar et al. |
| 5,289,272 A | 2/1994 | Rabowsky et al. |
| 5,301,245 A | 4/1994 | Endoh |
| 5,319,452 A | 6/1994 | Funahashi |
| 5,363,433 A | 11/1994 | Isono |
| 5,370,306 A | 12/1994 | Schulze et al. |
| 5,373,324 A | 12/1994 | Kuroda et al. |
| 5,374,104 A | 12/1994 | Moore et al. |
| 5,404,567 A | 4/1995 | DePietro et al. |
| 5,425,516 A | 6/1995 | Daines |
| 5,430,492 A | 7/1995 | Dambacher |
| 5,437,464 A | 8/1995 | Terasima et al. |
| 5,440,337 A | 8/1995 | Henderson et al. |
| 5,442,652 A | 8/1995 | Jacobson |
| 5,463,656 A | 10/1995 | Polivka et al. |
| 5,465,384 A | 11/1995 | Bejan et al. |
| 5,480,158 A | 1/1996 | Schulze et al. |
| 5,481,478 A | 1/1996 | Palmieri et al. |
| 5,481,757 A | 1/1996 | Mihara et al. |
| 5,510,900 A | 4/1996 | Shirochi et al. |
| 5,524,272 A | 6/1996 | Podowski et al. |
| 5,526,035 A | 6/1996 | Lappington et al. |
| 5,532,753 A | 7/1996 | Buchner et al. |
| 5,532,760 A | 7/1996 | Inoue |
| 5,537,152 A | 7/1996 | Ishikawa |
| 5,539,449 A | 7/1996 | Blahut et al. |
| 5,539,657 A | 7/1996 | Utsumi et al. |
| 5,546,050 A | 8/1996 | Florian et al. |
| 5,547,248 A | 8/1996 | Marechal |
| 5,555,021 A | 9/1996 | Igarashi |
| 5,565,908 A | 10/1996 | Ahmad |
| 5,568,484 A | 10/1996 | Margis |
| 5,581,270 A | 12/1996 | Smith et al. |
| 5,584,047 A | 12/1996 | Tuck |
| 5,596,647 A | 1/1997 | Wakai et al. |
| 5,596,745 A | 1/1997 | Lai et al. |
| 5,600,717 A | 2/1997 | Schneider et al. |
| 5,608,535 A | 3/1997 | Yoshida et al. |
| 5,610,822 A | 3/1997 | Murphy |
| 5,617,331 A | 4/1997 | Wakai et al. |
| 5,641,319 A | 6/1997 | Stoel et al. |
| 5,651,050 A | 7/1997 | Bhagat et al. |
| 5,655,117 A * | 8/1997 | Goldberg et al. ............ 707/102 |
| 5,757,796 A | 5/1998 | Hebb |
| 5,790,787 A * | 8/1998 | Scott et al. ................. 709/250 |
| 5,808,661 A | 9/1998 | Infiesto et al. |
| 5,854,591 A | 12/1998 | Atkinson |
| 5,956,716 A * | 9/1999 | Kenner et al. ................. 707/10 |
| 5,973,722 A | 10/1999 | Walai et al. |
| 6,002,758 A | 12/1999 | Ely et al. |
| 6,014,381 A | 1/2000 | Troxel et al. |
| 6,041,329 A * | 3/2000 | Kishi ......................... 707/100 |
| 6,049,819 A | 4/2000 | Buckle et al. |
| 6,058,288 A | 5/2000 | Reed et al. |
| 6,131,119 A | 10/2000 | Fukui |
| 6,163,823 A | 12/2000 | Henrikson |
| 6,201,797 B1 | 3/2001 | Leuca et al. |
| 6,469,634 B1 * | 10/2002 | Williams et al. ........ 340/825.72 |
| 6,499,027 B1 * | 12/2002 | Weinberger .................... 707/4 |

FOREIGN PATENT DOCUMENTS

| | | | |
|---|---|---|---|
| EP | 0277014 | 8/1988 | |
| EP | 0457673 | 11/1991 | |
| EP | 0569225 | 11/1993 | |
| EP | 0647914 | 4/1995 | |
| JP | 1291281 | 5/1988 | |
| JP | 63202194 | 8/1988 | |
| JP | 63208995 | 8/1988 | |
| JP | 63209333 | 8/1988 | |
| JP | 63215287 | 9/1988 | |
| JP | 1257640 | 10/1989 | |
| JP | 1300719 | 12/1989 | |
| JP | 1301430 | 12/1989 | |
| JP | 1301431 | 12/1989 | |
| JP | 2013490 | 1/1990 | |
| JP | 2148927 | 6/1990 | |
| JP | 2149196 | 6/1990 | |
| JP | 2155853 | 6/1990 | |
| JP | 2171399 | 7/1990 | |
| JP | 2179567 | 7/1990 | |
| JP | 2304791 | 12/1990 | |
| JP | 6111124 | 4/1994 | |
| JP | 7135500 | 5/1995 | |
| JP | 7202918 | 8/1995 | |
| JP | 9074551 | 3/1997 | |
| WO | WO90/15508 | 12/1990 | |
| WO | WO93/16558 | 8/1993 | |
| WO | WO94/13105 | 6/1994 | |
| WO | WO94/28679 | 8/1994 | |
| WO | WO95/12853 | 5/1995 | |
| WO | WO96/19897 | 6/1996 | |
| WO | WO9811686 A2 | 3/1998 | ............ H04H/1/02 |

* cited by examiner

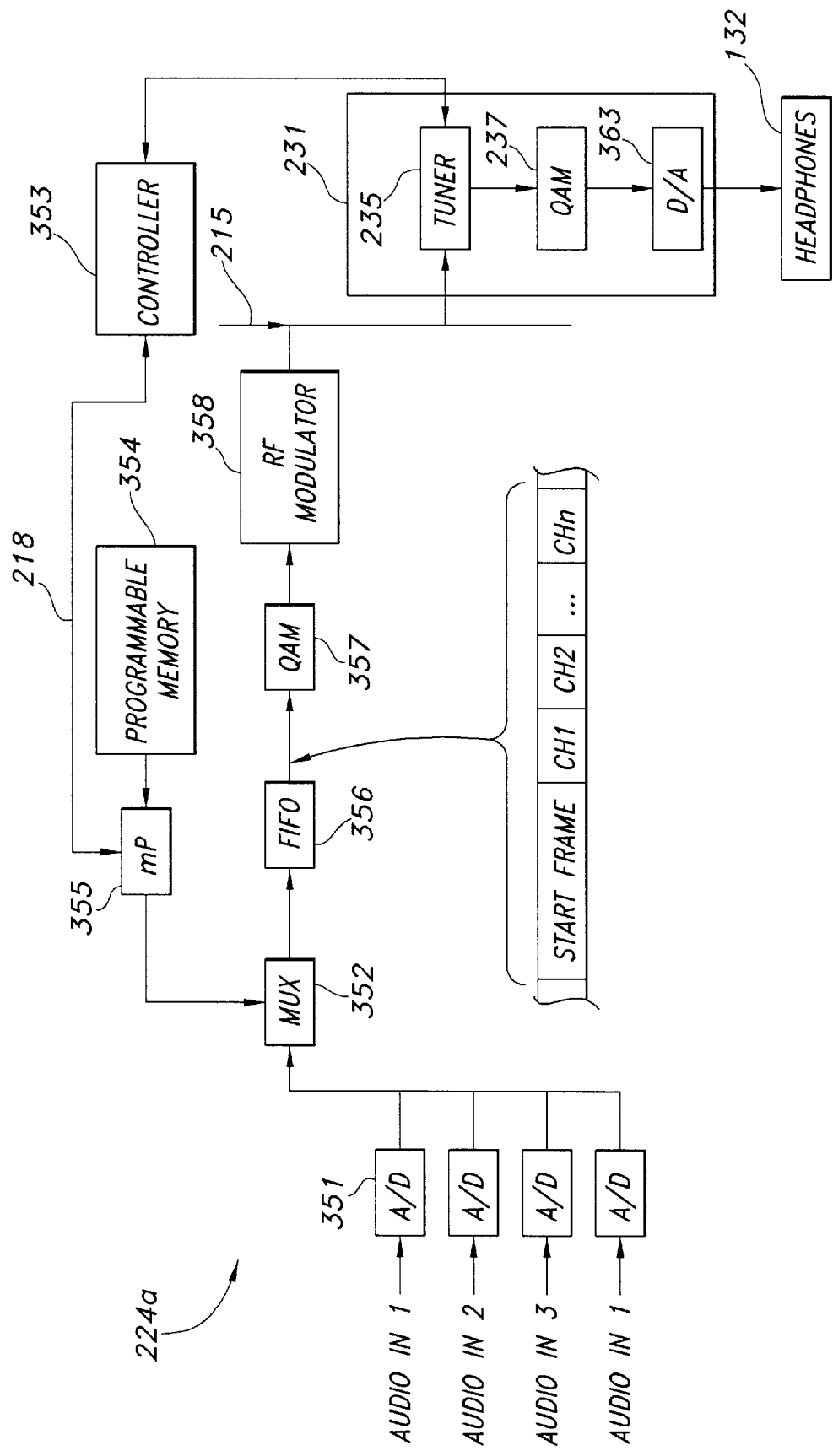

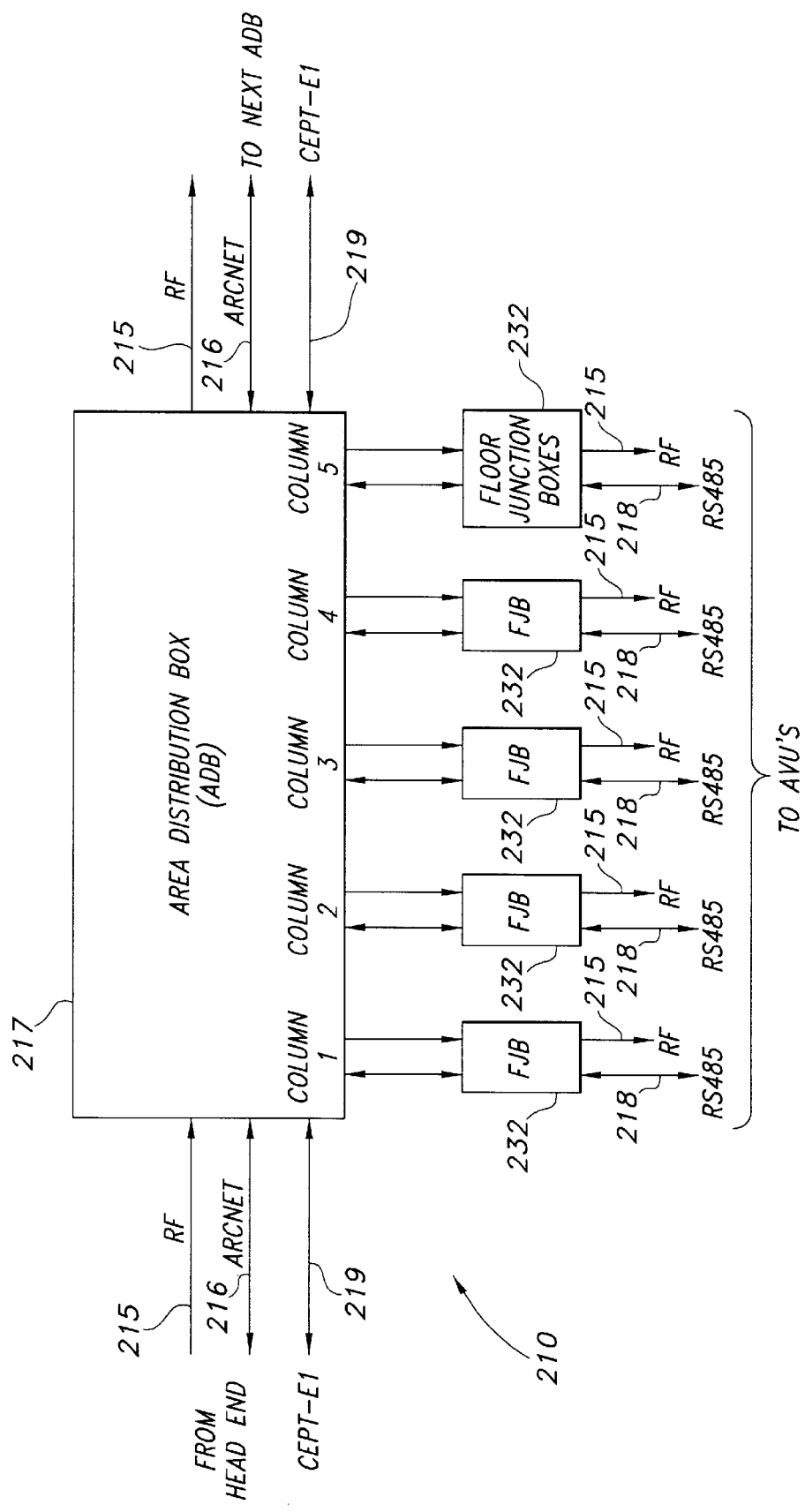

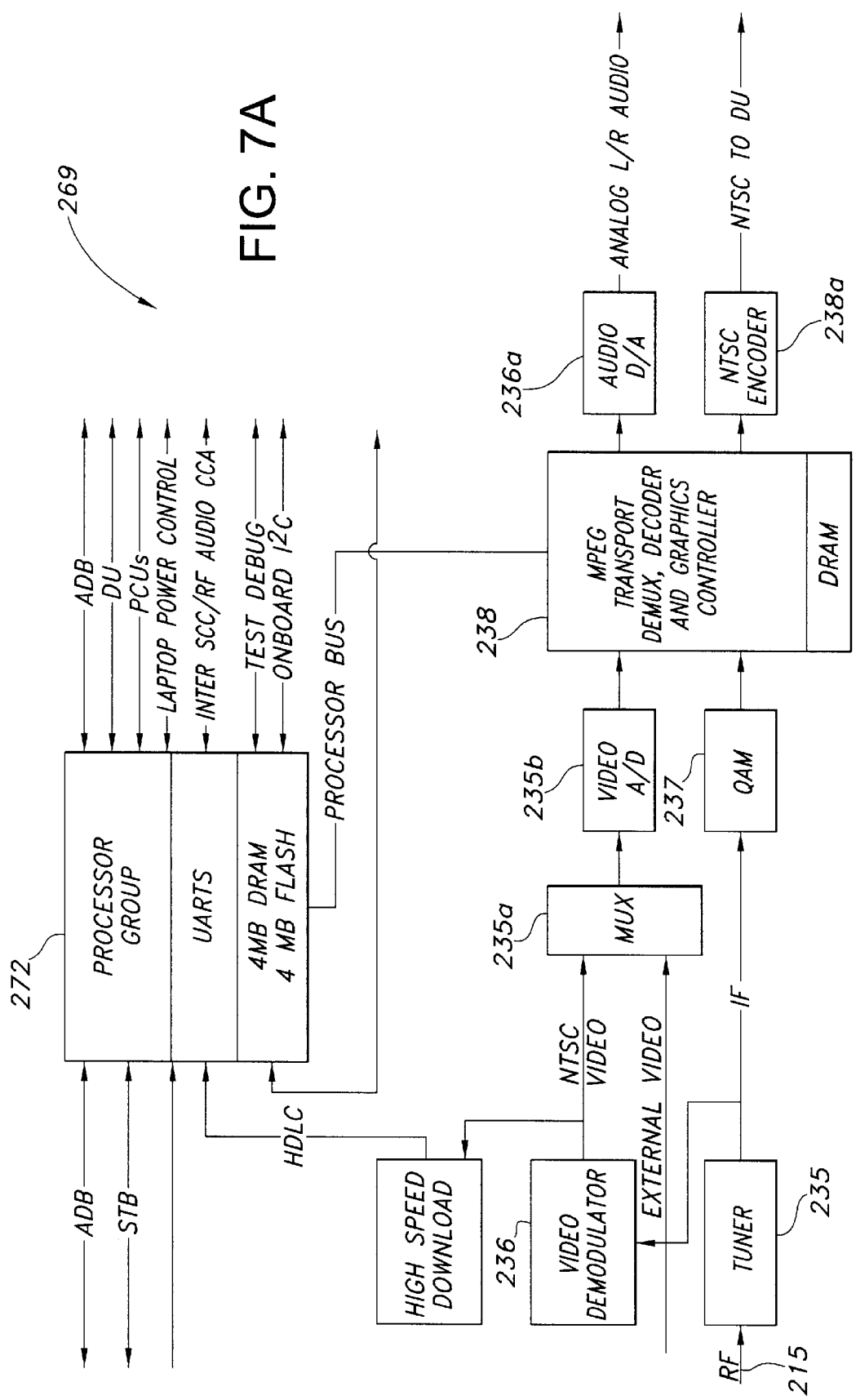

SYSTEM SOFTWARE ARCHITECTURE FOR A PASSENGER ENTERTAINMENT SYSTEM, METHOD AND ARTICLE OF MANUFACTURE

COPYRIGHT NOTIFICATION

Portions of this patent application contain materials that are subject to copyright protection. The copyright owner has no objection to the facsimile reproduction by anyone of the patent document, or the patent disclosure, as it appears in the Patent and Trademark Office.

FIELD OF THE INVENTION

The present invention relates to providing entertainment to passengers in a vehicle, and more specifically, to systems, methods and articles of manufacture that provide for a networked passenger entertainment system that integrates audio, video, passenger information, product ordering and service processing, communications, and maintainability features, and permits passengers to selectively order or request products and services, receive video, audio and game data for entertainment purposes, and communicate with other passengers and computers on- and off-board the aircraft, and which thereby provides for passenger selected delivery of content over a communication network.

BACKGROUND OF THE INVENTION

The assignee of the present invention manufactures in-flight aircraft passenger entertainment systems. Such systems distribute audio and video material to passengers derived from a variety of sources. For example, such systems provide passengers with audio generated from audio tape players, movies derived from video tape players, and interactive services such as games, shopping and telecommunications. A variety of inventions have been patented by the assignee of the present invention and others relating to in-flight aircraft entertainment systems and their components. Certain of these prior art systems and components are summarized below.

U.S. Pat. No. 3,795,771 entitled "Passenger Entertainment/Passenger Service and Self-Test System" discloses a time multiplexed passenger entertainment and service combined system suitable for distribution throughout compartments of super aircraft.

Common power supplies, cabling, and boxes, and hybrid microelectronics and/or medium or large scale MOSFET integrated circuit chips are employed. A main multiplexer receives passenger address or tape deck analog signals and converts them to a pulse code modulated digital bit stream which is time shared between channels. A coaxial cable transmits the bit stream to compartment submultiplexers. Each submultiplexer receives the digital bit stream, optionally inserts into the bit stream bits representing analog-to-digital converted movie audio or compartment introduced passenger address and distributes the data stream along four columns of seat group units on individual column coaxial cables. At each seat group unit a demultiplexer of a seat group demultiplexer/encoder converts the bit stream into the original analog signals, amplifies the analog signals and drives individual seat transducers for passenger listening.

A passenger control unit provides channel and volume level selection. The passenger service system provides control functions comprising reading light, stewardess call (aisle and control panel lights and chimes). The service system comprises a section timer/decoder to generate binary logic pulses which are transmitted by cable sequentially down and up the seat columns from seat group unit to seat group unit. A similar cable connects the corresponding overhead unit containing the reading lights, etc. to the section timer/decoder. The seat encoder of each seat group demultiplex-er/encoder receives digital interrogating signals, processes them relative to switch positions determined by the passenger and sends out results to the section timer/decoder. The overhead decoder of each seat group receives the retransmitted digital signals from the section timer/decoder and performs switching functions conforming to seat encoder commands. The system incorporates a self-test subsystem comprising a test signal generator and circuits operating in conjunction with the entertainment and service system circuits.

U.S. Pat. No. 5,289,272 entitled "Combined Data, Audio and Video Distribution System in Passenger Aircraft" discloses a passenger aircraft video distribution system that distributes modulated RF carrier signals from a central signal source to be used at each passenger seat. The carriers are modulated to contain audio, video also other digital data, such as graphics, and slide shows and the like. Analog video signals from the video source are modulated on individually discrete carriers in the range of 54 to 300 megahertz. Audio information, including audio sound channels and the video audio, are digitized and combined with digital data in a combined serial bit stream that is multiplexed, and then modulated on an RF carrier having a frequency sufficiently above the frequency band of the video signals so that the resulting spectrum of the modulated audio RF carrier does not interfere with the modulated video carriers. The RF carrier signals are combined and distributed to individual seats. The modulated audio carrier is separated from the video carriers at each seat or each group of seats and then demodulated and demultiplexed for selection at each individual seat of a chosen audio channel.

U.S. Pat. No. 4,866,515 entitled "Passenger Service and Entertainment System for Supplying Frequency-Multiplexed Video, Audio, and Television Game Software Signals to Passenger Seat Terminals" discloses a service and entertainment system for transmitting video signals, audio signals and television game software signals from a central transmitting apparatus to each of a plurality of terminals mounted at respective passenger seats in an aircraft, or at respective seats in a stadium, or theater, or the like. The video signals, audio signals and television game software signals are frequency-multiplexed and then transmitted to the terminals, so that desired ones of the frequency-multiplexed signals can be selected at each terminal unit.

U.S. Pat. No. 4,647,980 entitled "Aircraft Passenger Television System" discloses a television system that provides for individualized program selection and viewing by aircraft passengers. The system comprises a plurality of compact television receivers mounted in front of each airline passenger in a rearwardly facing position within the passenger seat immediately in front of each passenger. Each television receiver is provided as a lightweight module adapted for rapid, removable installation into a mounting bracket opening rearwardly on the rear side of a passenger seat, with a viewing screen set at a tilt angle accommodating an average reclined position of the seat. Exposed controls permit channel and volume selection by the individual passenger, and an audio headset is provided for plug-in connection to the module. A broadcast station on the aircraft provides prerecorded and/or locally received programs on different channels to each television module for individual passenger selection.

U.S. Pat. No. 4,630,821 entitled "Video Game Apparatus Integral with Aircraft Passenger Seat Tray" discloses a video game apparatus employed by a passenger of an aircraft. The apparatus includes a tray that is mounted on the rear of an aircraft seat. The tray has an internal hollow with a rectangular aperture on a top surface which surface faces the passenger when the tray is placed in a usable position. Located in the rectangular aperture is a TV display screen. Located in the internal hollow of the tray is a video game apparatus that operates to provide a video game display on the surface of said TV display screen. The surface of the tray containing the TV display screen also includes a plurality of control elements that are coupled to the video game apparatus to enable the passenger to operate the game. To energize the game, the tray contains a cable coupling assembly whereby when a cable is inserted into the assembly, the video game is energized to provide a display of a game selected by means of a selector switch also mounted on the top surface of the tray.

U.S. Pat. No. 4,352,200 entitled "Wireless Aircraft Passenger Audio Entertainment System" discloses that audio information in several audio channels is supplied via head sets to passengers seated aboard an aircraft in rows of seats including armrests and being distributed along an elongate passenger section inside a metallic fuselage. An antenna is run along the elongate passenger section of the aircraft for radio transmission inside such elongate passenger section. Individual antennas are provided for the passenger seats for receiving the latter radio transmission. These receiving antennas are distributed among predetermined armrests of the passenger seats. The audio information to be transmitted is provided in radio frequency channels in a band between 72 and 73 MHz. The distributed receiving antennas are coupled via seated passengers to the transmitting antenna. The radio frequency channels are transmitted in the mentioned band via the transmitting antenna, seated passengers and distributed receiving antennas to the predetermined armrests. Audio information is derived in the audio channels from the transmitted radio frequency channels also in the predetermined armrests. Passengers are individually enabled to select audio information from among the derived audio information in the audio channels. The selected audio information is applied individually to the headsets.

U.S. Pat. Nos. 5,965,647 and 5,617,331 entitled "Integrated Video and Audio Signal Distribution System and Method for use on Commercial Aircraft and Other Vehicles" disclose passenger entertainment systems employing an improved digital audio signal distribution system and method for use on commercial aircraft and other vehicles. A plurality of digital audio signal sources are provided for generating a plurality of compressed digital audio signals. The compressed digital audio signals are provided to a multiplexer that domain multiplexes the signals to produce a single composite digital audio data signal. The composite digital audio data signal is provided to a demultiplexer which is capable of selecting a desired channel from the composite digital audio data signal. The selected channel is provided to a decompression circuit, where it is expanded to produce a decompressed digital output signal. The decompressed digital output signal is then provided to a digital-to-analog converter and converted to an analog audio signal. The analog audio signal is provided to an audio transducer.

While the above patents disclose various aspects of passenger entertainment systems and components used therein, none of these prior art references disclose a fully integrated networked passenger entertainment system that integrates audio, video, product ordering and service processing, networked communications, and maintainability features. Accordingly, it is an objective of the present invention to provide for systems and methods that implement an integrated networked passenger entertainment and communication system that provides for passenger selected delivery of content over a communication network. It is a further objective of the present invention to provide for systems and methods that permit passengers to selectively order or request products or services, receive audio, video and game data, that permits communication of information to passengers from aircraft personnel, and that permits passengers to communicate with other passengers and computers located on- and off-board an aircraft.

SUMMARY OF THE INVENTION

The foregoing problems are overcome in an illustrative embodiment of the invention in which system software is used to enable a passenger entertainment system on a vehicle. The passenger entertainment system is configured and operated using the system software to provide passenger entertainment services including audio and video on-demand, information dissemination, product and service order processing, video teleconferencing and data communication services between passengers on-board the vehicle using a local networks, and between passengers and people and computers off-board the vehicle using a communications link.

The passenger entertainment system includes a system server and a network for supporting a plurality of computer processors that are each coupled to a video camera, a microphone, a video display, an audio reproducing device, and an input device located proximal to a plurality of seats. The computer processors and the system server comprise application software that selectively controls telephony applications and network services. The system server has a plurality of interfaces that interface to components of the passenger entertainment system.

The system software is used to route and process passenger transactions from requesting computer processors and dispatch appropriate resources to fulfill the transactions. To achieve this, passenger transactions are transmitted to a message processor, which decodes them and generates a request in a predetermined format. The request is transmitted to a transaction dispatcher that routes the request to a passenger entertainment service manager. The passenger entertainment service manager generates a response to the request message by querying files in a database. Appropriate resources are dispatched to service the passenger transactions that are defined in the response to the query.

BRIEF DESCRIPTION OF THE DRAWINGS

The various features and advantages of the present invention may be more readily understood with reference to the following detailed description taken in conjunction with the accompanying drawings, and in which:

FIG. 5a is a diagram illustrating distribution of QAM digital audio in accordance with in accordance with a preferred embodiment;

FIG. 6 is a block diagram of area distribution equipment in accordance with a preferred embodiment;

FIG. 7a is a block diagram of the seat controller card of the seat group equipment in accordance with a preferred embodiment;

DETAILED DESCRIPTION

System Overview

Figure 1:
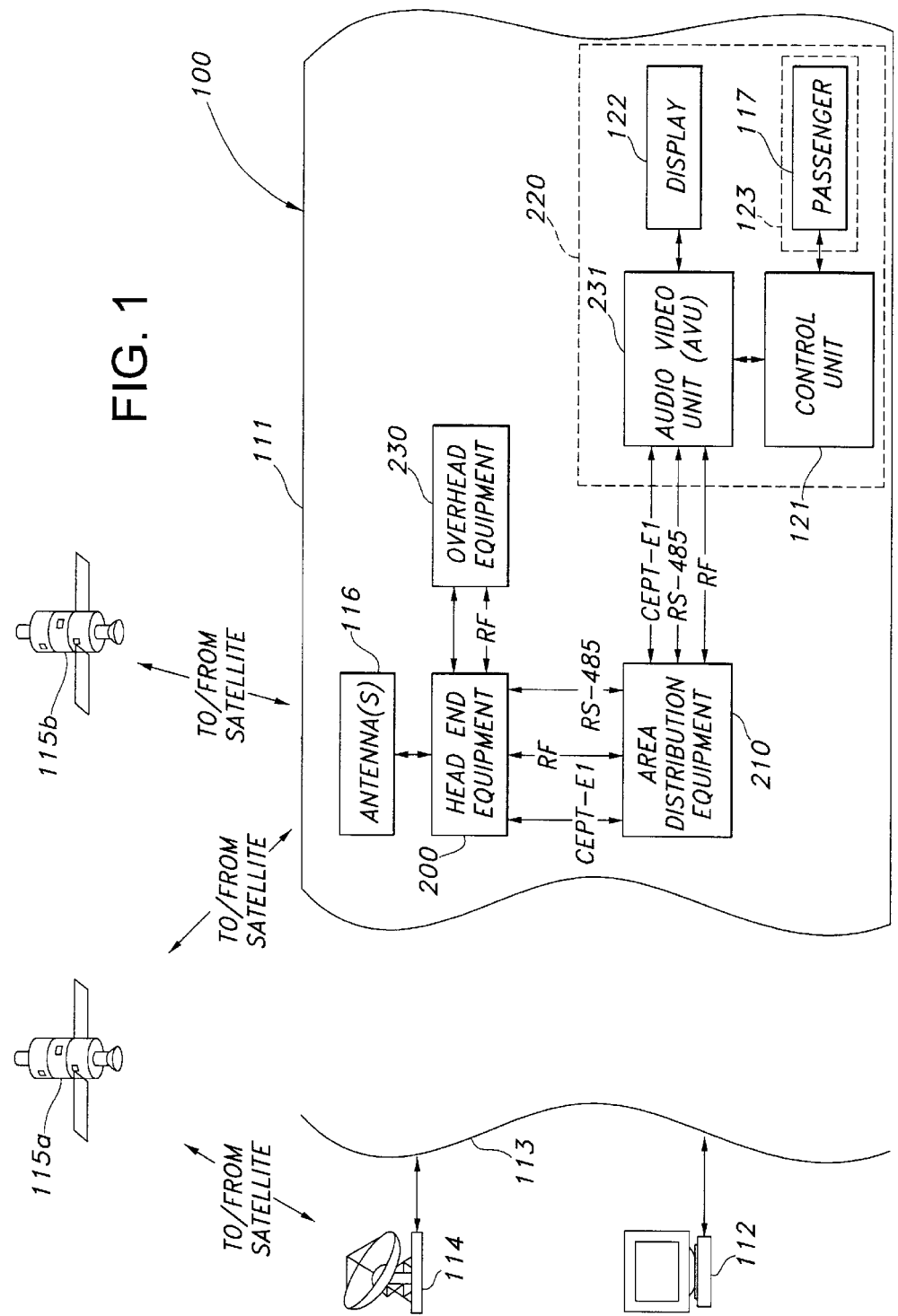
FIG. 1 illustrates an operational environment depicting a total entertainment system in accordance with a preferred embodiment.

FIG. 1 illustrates an operational environment depicting an exemplary total entertainment system 100 in accordance with a preferred embodiment. The operational environment shown in FIG. 1 depicts a flight of an aircraft 111 employing the total entertainment system 100. The total entertainment system 100 comprises an integrated networked passenger entertainment and communication system 100 that provides for in-flight passenger entertainment and information dissemination, service and product order processing, video teleconferencing and data communication between passengers on-board the aircraft 111, and video teleconferencing, voice and data communication between passengers 117 on-board the aircraft 111 and people and computers on the ground using local networks and the Internet 113. The present invention thus provides for a level of capabilities and services heretofore unavailable in any airborne passenger entertainment system.

The system 100 is comprised of four main functional areas including head end equipment 200, area distribution equipment 210, seat group equipment 220, and overhead equipment 230. The head end equipment 200 provides an interface to external hardware and operators. The area distribution equipment 210 routes signals to and/or from the head end equipment 200, the seat group equipment 220, and the overhead equipment 230, depending upon the type of service provided to or requested by the passengers. The seat group equipment 220 contains passenger control units (PCU) 121 and screen displays 122 for use by the passengers 117. The overhead equipment 230 includes video monitors and/or projectors and bulkhead screens or displays for displaying movies and other information. The system 100 thus routes or otherwise displays information to the passengers either under control of the flight attendants or passengers 117.

Video conferencing data and computer data derived from ground based computers 112 connected to the Internet 113 are transferred over the Internet 113 to a satellite ground station 114 and are uplinked to a communications satellite 115a orbiting the Earth. The communications satellite 115a downlinks the video conferencing and/or computer data to the aircraft 111 which is received by way of an antenna 116 that is part of a satellite communications system employed in the head end equipment 200 of the system 100. In a similar manner, video conferencing data and/or computer data derived from passengers 117 on-board the aircraft 111 is uplinked to the satellite 115a by way of the satellite communications system and antenna 116 to the satellite 115a, and from there is downlinked by way of the satellite ground station 114 and Internet 113 to the ground based computer 112.

One or more satellites 115a and 115b, which may be the same as or different from the satellites 115a and 115b used for Internet communication, transmit television signals to the aircraft 111. One currently deployed satellite television broadcast system is the DIRECTV system that has orbiting satellites 115a and 115b that may be used to transmit television programs to the aircraft 111, in a manner similar to ground-based systems used in homes and businesses. In the present system 100, however, a steerable antenna 116 is used to track the position of the satellite 115a that transmits the signals so that the antenna 116 remains locked onto the transmitted signal.

Handheld or fixed passenger control units 121 and seatback screen displays 122 (seat displays 122) are provided at each passenger seat 123 that permit the passengers 117 to interface to the system 100. The passenger control units 121 are used to control downloading of movies for viewing, select audio channels for listening, initiate service calls to flight attendants, order products and services, and control lighting. The passenger control units 121 are also used to control game programs that are downloaded and played at the passenger seat 123. In addition, the passenger control units 121 are also used to initiate video conferencing and computer data transfer sessions either within the aircraft or with ground based computers 112.

The present system 100 thus provides for an integrated and networked passenger entertainment and communication system 100 that in essence functions as an airborne intranet that provides a level of passenger selected and controlled entertainment and communications services, passenger services and product ordering services that has heretofore not been provided to aircraft passengers.

Figure 2:
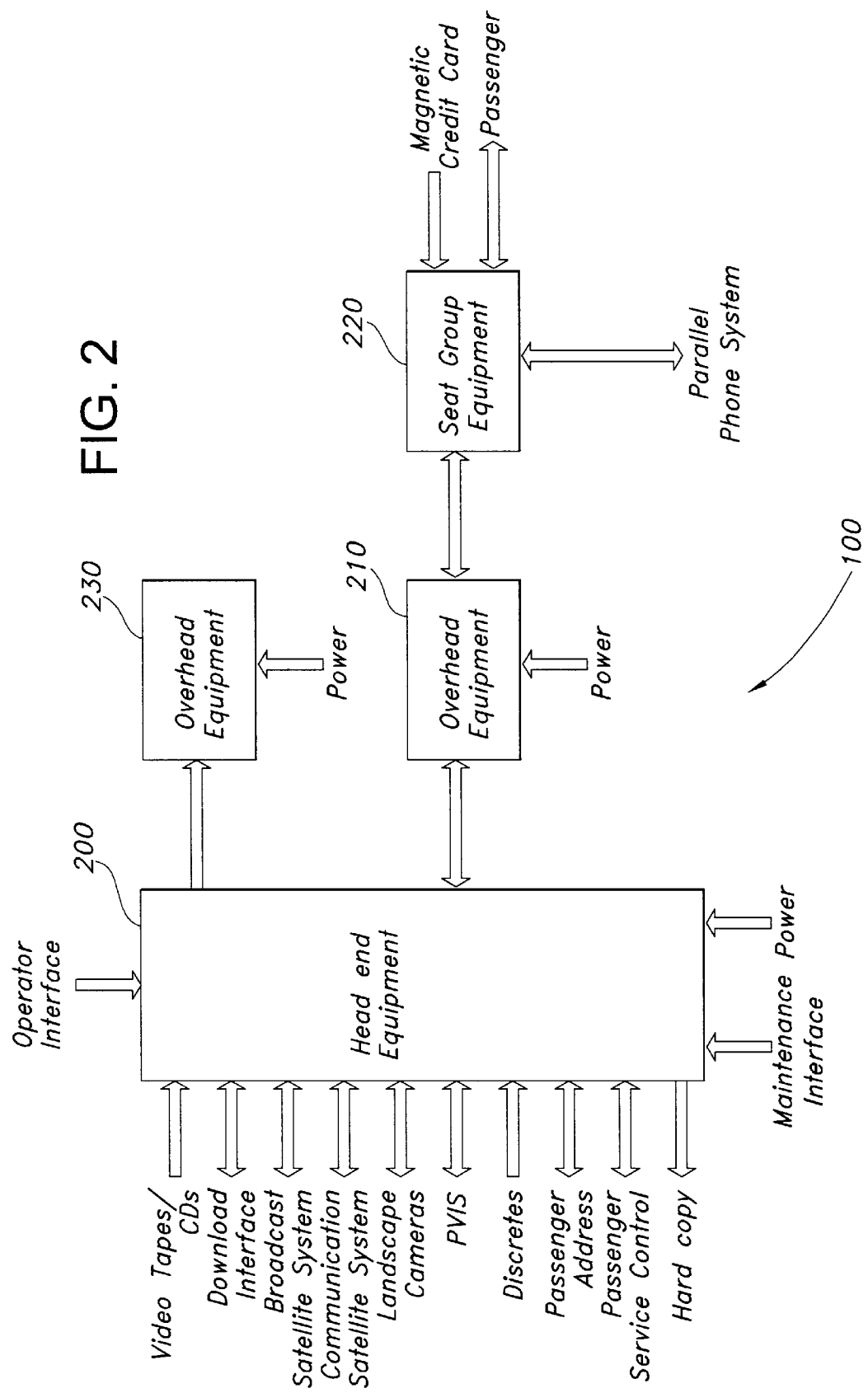
FIG. 2 is an exemplary block diagram of an embodiment of the total entertainment system.
Figure 3:
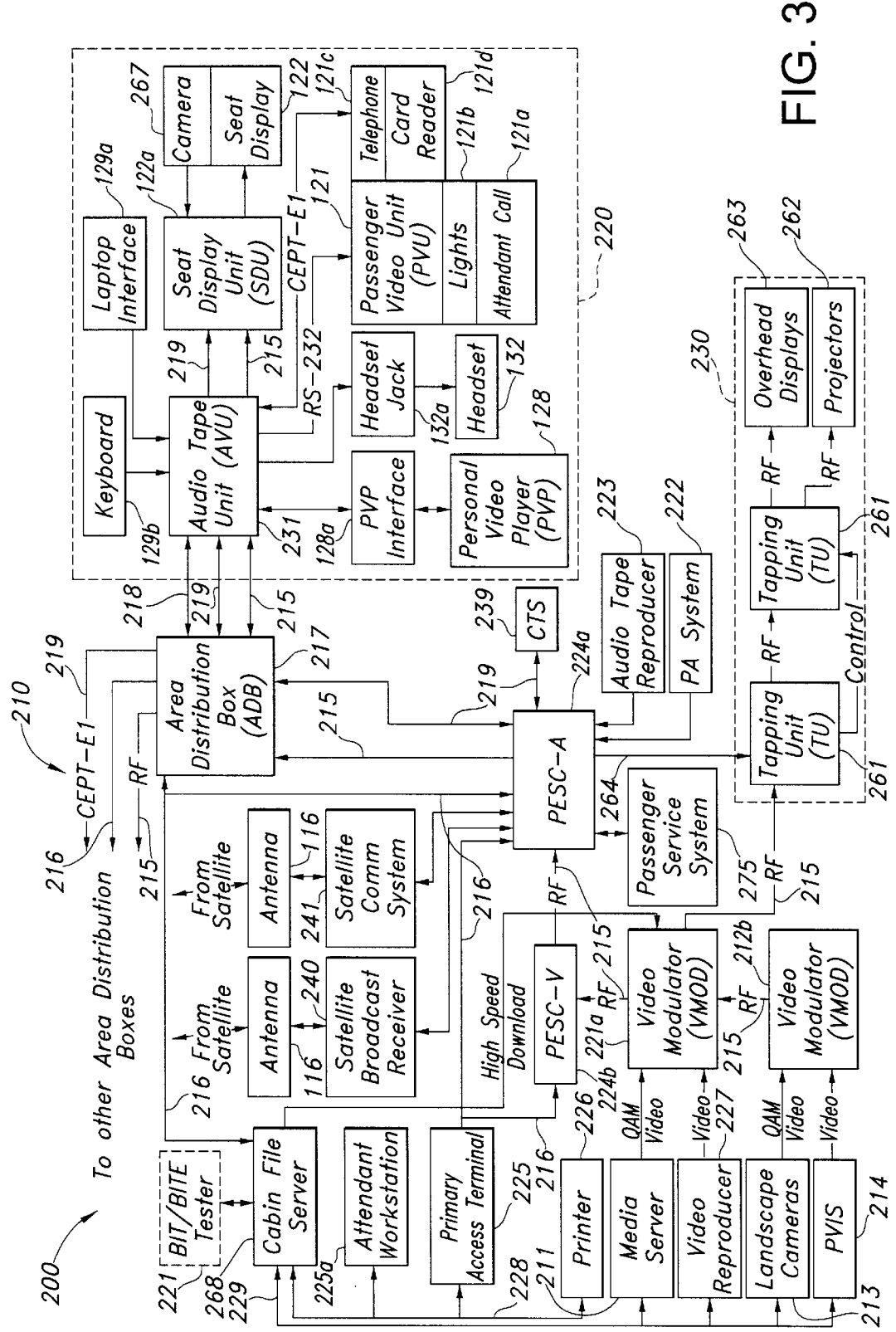
FIG. 3 shows a detailed block diagram of the total entertainment system of FIG. 2.

FIG. 2 is an exemplary block diagram of an embodiment of a total entertainment system 100 that is employed on the aircraft 111, and illustrates inputs, outputs and interfaces of the system 100. The system 100 comprises the head end equipment 200, the area distribution equipment 210, the seat group equipment 220, and the overhead equipment 230. The head end equipment 200 and the seat group equipment 220 include a variety of computer processors and operating software that communicate over various networks to control and distribute data throughout the aircraft 111 and send data to and receive data from sources external to the aircraft 111. A detailed embodiment of the total entertainment system 100 is shown in FIG. 3, which will be described after discussing a representative hardware environment that is useful in understanding the system 100 and its operation that is presented in FIG. 4.

Figure 4:
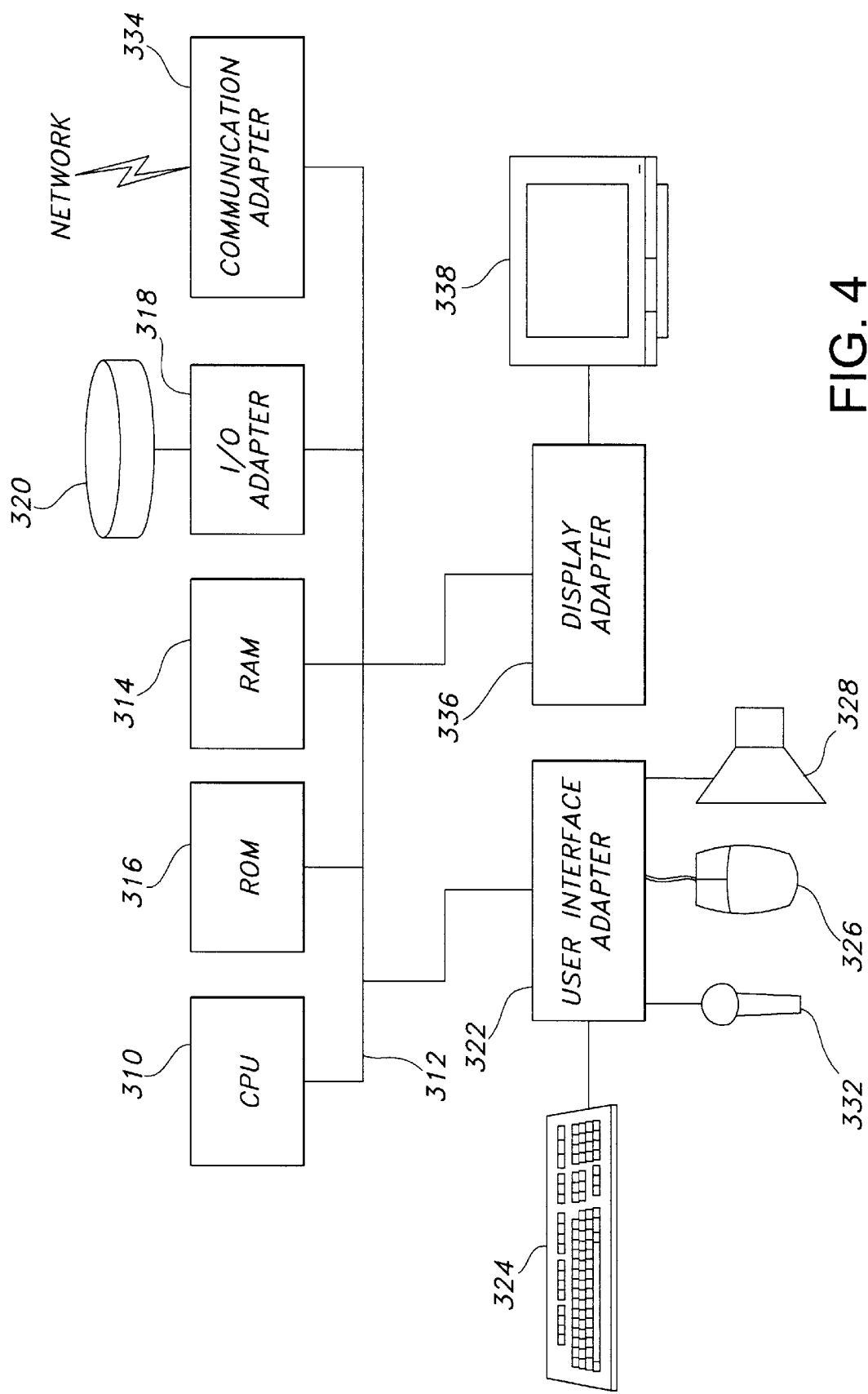
FIG. 4 shows a diagram illustrating a typical hardware configuration of a workstation employed in accordance with a preferred embodiment.

An embodiment of the system 100 is practiced in the context of a personal computer such as the IBM PS/2, Apple Macintosh computer or UNIX based workstation. A representative hardware environment is depicted in FIG. 4, which illustrates a typical hardware configuration of a workstation in accordance with a preferred embodiment having a central processing unit 310, such as a microprocessor, and a number of other units interconnected via a system bus 312. The workstation shown in FIG. 4 includes a random access memory (RAM) 314, read only memory (ROM) 316, an I/O adapter 318 for connecting peripheral devices such as disk storage units 320 to the bus 312, a user interface adapter 322 for connecting a keyboard 324, a mouse 326, a speaker 328, a microphone 332, and/or other user interface devices such as a touch screen (not shown) to the bus 312, communication adapter 334 for connecting the workstation to a communication network (e.g., a data processing network) and a display adapter 336 for connecting the bus 312 to a display device 338. The workstation typically has resident thereon an operating system such as the Microsoft Windows NT or Windows/95 operating system (OS), the IBM OS/2 operating system, the MAC OS, or UNIX operating system. Those skilled in the art will appreciate that the present invention may also be implemented on platforms and operating systems other than those mentioned.

Detailed System Description

The in-flight entertainment system 100 in accordance with a preferred embodiment is a complex system with many components and that forms a total entertainment system (TES) 100. To assist the reader in making and utilizing the invention without undue experimentation, the following is a detailed description that discusses some of the components and a typical system configuration. The system 100 in accordance with a preferred embodiment is a configurable and scaleable in-flight entertainment system 100 that provides a wide range of passenger entertainment, communications, passenger service, and cabin management services. A fully capable system 100 provides passengers with audio entertainment, video entertainment, video games, and other interactive and communications services.

The system 100 shown in FIG. 1 and 2 has four main functional areas comprising: 1) head end equipment 200, 2) area distribution equipment 210, 3) seat group equipment 220, and 4) overhead equipment 230. FIG. 3 shows the four functional areas and the line replaceable units (LRU) that comprise a typical passenger entertainment system 100. An overview of the LRUs in each of the functional areas is described in the following paragraphs.

The head end equipment 200 is the prime interface between external hardware and operators (purser and flight attendants). The head end equipment 200 includes an operator interface, an aircraft interface, a maintenance interface, and an interface for downloading configuration data to the system 100 and for downloading reports from the system.

The head end equipment 200 shown in FIG. 3 comprises a primary access terminal (PAT) 225 and a cabin file server (CFS) 268 that are used to control the system 100. The cabin file server 268 is a system controller that controls many of the system functions, such as interactive functions, and stores the system configuration database and the application software. The cabin file server 268 communicates with other components within the head end equipment 200 via an ARCNET interface 216. The cabin file server may be a computer terminal as shown in FIG. 4 that includes a hard disk drive and a database that stores the system 100 configuration and other system 100 information.

The cabin file server 268 is coupled to the primary access terminal 225 and to a printer 226 by way of an Ethernet network 228, such as a 100 Base-T Ethernet network, for example. Flight attendant workstations 225a are also coupled to the cabin file server 268 by way of the Ethernet network 228. A media file server 211 is controlled from the cabin file server 268 by way of an ARINC 485 (RS-485) network 229 coupled therebetween. The cabin file server 268 is optionally coupled to a BIT/BITE tester 221 that is used to perform built in testing operations on the system 100.

The cabin file server 268 provides the following functions: processes and stores transaction information from passengers; stores passenger usage statistics for movies, games, and shopping; stores passenger survey responses; stores flight attendant usage statistics for login/logout; provides flight attendant access control; controls the video reproducers; controls the landscape camera; controls the PVIS line replaceable unit; stores seat application software and game software; distributes seat application and game software via the RF distribution system; provides power backup sufficient to allow orderly automatic shutdown of the cabin file server 268 operating system when primary power is removed; provides indicators representing power, operational status, and communication status; downloads databases via the RF distribution system; provides the ability to print reports; and provides connectors for a keyboard, monitor, and mouse.

The primary access terminal 225 shown in FIG. 3 provides an operator interface to the system 100, enabling an operator to centrally control a video reproducer 227 and the media server 211, start BITE, control the landscape cameras 213, and other functions provided in the system 100. The primary access terminal 225 may also be a computer terminal as shown in FIG. 2 that may include a hard disk drive and a display 338 for graphical user interface (GUI) by a flight attendant to the system 100. The display may be a touch screen display to access the system 100. A keyboard (not shown) may also be provided to access the system 100. The primary access terminal 225 is used to configure the system 100 to set up the entertainment options that are available to passengers 117. The flight attendant workstations 225a are distributed throughout the aircraft 111 and allow flight attendants to respond to passenger service requests and to process orders and monetary transactions.

The primary access terminal 225 provides the following functions: a flight attendant interface to the cabin sales capability, a flight attendant interface to the video entertainment capability, a flight attendant interface to the report and receipt printing capability, monitoring of video and audio output from the video reproducer, maintenance personnel interface to system diagnostics and status reports, power backup sufficient to allow an orderly shutdown of the primary access terminal operating system when primary power is removed, indicators representing power, operational status, and communication status, single and dual plug stereo audio jack, magnetic card reader, and floppy disk drive.

The head end equipment 200 comprises the media server 211 that is coupled to a first video modulator 212a. The media server 211 may be one manufactured by Formation, for example. The media server 211 supplies 30 independent streams of video, and stores about 54 hour of video. The first video modulator 212a may be one manufactured by Olsen Technologies, for example. The video reproducer 227 (or video cassette player 227), such as a triple deck player manufactured by TEAC, for example, is also coupled to the first video modulator 212a. The video cassette player 227 may be three 8-mm Hi-8 video cassette players that output three video programs on three video channels under control of a flight attendant.

The video reproducer 227 (or video cassette player 227) outputs an NTSC video (and audio) streams corresponding to a first plurality of prerecorded video channels. The media server 211 stores and outputs a plurality of quadrature amplitude modulated MPEG-compressed video transport streams corresponding to a second plurality of prerecorded video channels. The first video modulator 212a modulates both the NTSC video streams from the video reproducer 227 and the quadrature amplitude modulated MPEG-compressed video streams from the media server 211 to produce modulated RF signals that are distributed to passenger seats 123 of the aircraft 111.

The head end equipment 200 also comprises one or more landscape cameras 213 and a passenger video information system (PVIS) 214 that are coupled to a second video modulator 212b. The landscape cameras 213 may be cameras manufactured by Sexton, or Puritan Bennett, for example. The second video modulator 212b may also be one manufactured by Olsen Technologies, for example. The passenger video information system 214 may be a unit manufactured by Airshow, for example.

The head end equipment 200 comprises first and second passenger entertainment system controllers (PESC-A, PESC-V) 224a, 224b, that comprise video, audio and telephone processors. Although only one unit is shown in FIG. 3, in certain configurations, primary and secondary PESC-A controllers 224a may be used. The second video modulator 212b routes RF signals through the first video modulator 212a, and the outputs of both video modulators 212a, 212b are routed through the second passenger entertainment system controller (PESC-V) 224b to the first passenger entertainment system controller (PESC-A) 224a. The first passenger entertainment system controller (PESC-A) 224a is used to distribute video and data by way of an RF cable 215 and an ARCNET network 216, to area distribution equipment 210 that routes the video and data to the passenger seats 123. The ARCNET network 216 is used to send control signals between components of the head end equipment and the components of the seat group equipment 220. The PESC-A 224a also provides an interface to the overhead equipment 230.

The first passenger entertainment system controller (PESC-A) 224a is coupled to the cabin file server 268 by way of the ARCNET network 216, and is coupled to the primary access terminal (PAT) 225 and the second passenger entertainment system controller (PESC-V) 224b by way of the ARCNET network 216. The first passenger entertainment system controller (PESC-A) 224a is also coupled to a public address (PA) system 222, to an audio tape reproducer (ATR) 223, and to a cabin telephone system (CTS) 239. The audio tape reproducer 223 may be one manufactured by Sony or Matsushita, for example. The cabin telephone system 239 may be systems manufactured by AT&T or GTE, for example. Signals associated with the cabin telephone system 239 are routed through the system 100 by means of a CEPT-E1 network 219.

The passenger entertainment system audio controller (PESC-A) 224a and the passenger entertainment system video controller (PESC-V) 224b are similarly designed and have similar capabilities. However, some features are implemented only in the PESC-A 224a or only in the PESC-V 224b. The passenger entertainment system controller software implements specific features particular to the PESC-A 224a or PESC-V 224b.

The passenger entertainment system controller performs the following functions: digitizes up to 32 audio inputs from entertainment and video audio sources, RF modulates the digital data, mixes the RF digital audio data with the RF input from a VMOD or another passenger entertainment system controller, outputs the combined RF video carrier and RF digital audio information to the RF distribution system, inputs up to five analog inputs, and multiplex in any combination to a maximum of five analog outputs, provides programmable volume control of the five analog outputs, provides RS-232, RS-485, ARINC-429, and ARCNET communications interfaces, provides input discretes for the control and distribution of PA audio to the seats, provides input and output discretes for the control and distribution of video announcement audio to the overhead PA system of the aircraft 111, provides input discretes for passenger entertainment system controller type and address information, provides input discrete for aircraft status (in air/on ground), amplifies output RF, software monitorable and controllable, provides an external test/diagnostic communication port, provides indicators representing power, operation status, and communication status, provides telephone control and distribution (PESC-A 224a only), and provides a fault depository for BIT data (PESC-A primary 224a only).

Figure 5:
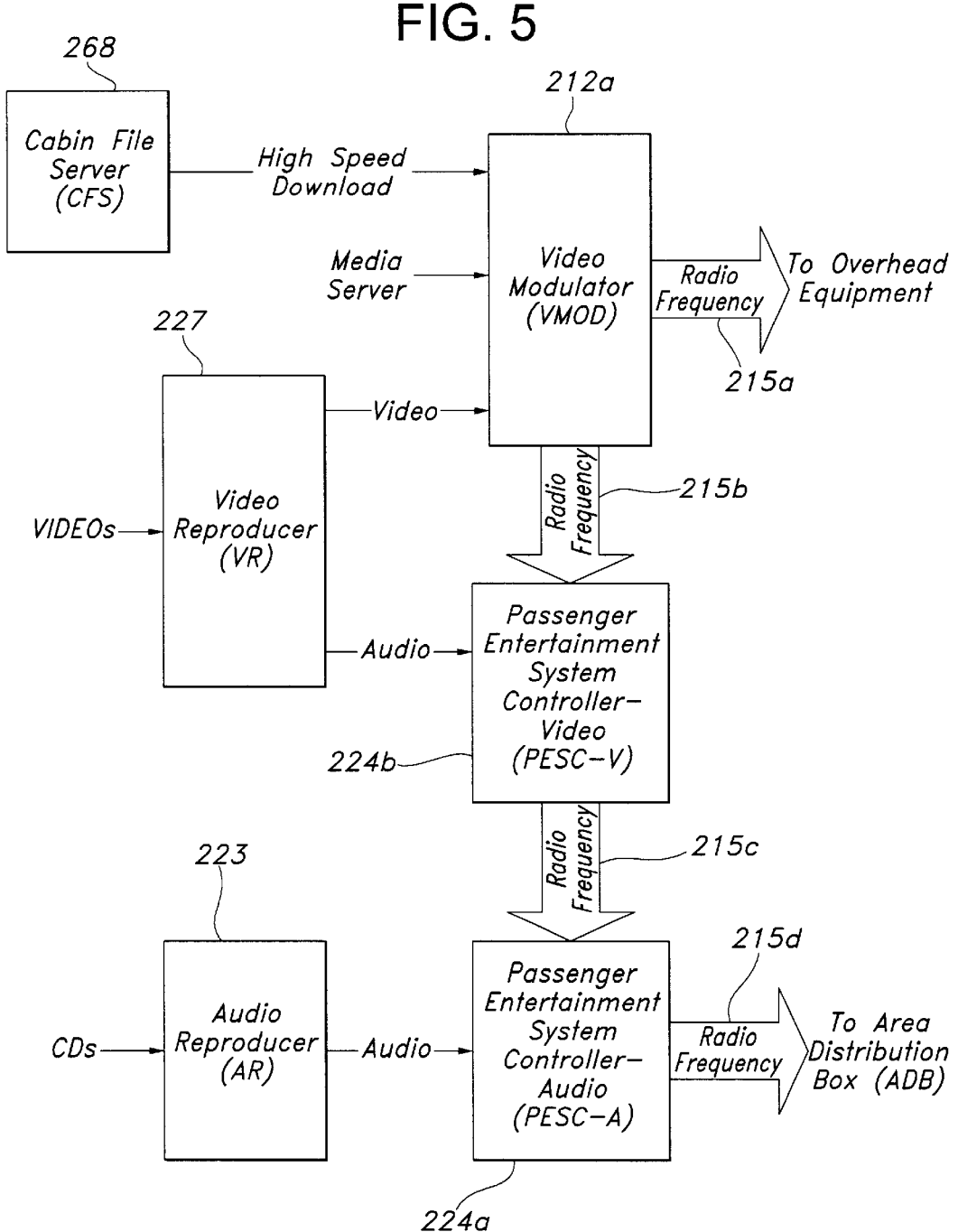
FIG. 5 is a diagram illustrating head end equipment in accordance with a preferred embodiment.

Referring now to FIG. 5, it shows a simplified diagram of the system 100 and illustrates distribution of video signals from the video cassette player 227 and media server 211 to the seat displays 122. To implement video on demand in accordance with a preferred embodiment, the media server 211 outputs 30 digital MPEG-compressed video transport streams on three video channels (ten streams each), while the video cassette player 227 outputs three video streams on three video channels.

To gain extra throughput, the 30 digital MPEG compressed video streams output by the media server 211 are 64-value quadrature amplitude modulated (QAM). However, it is to be understood, however, that by using 256-value QAM encoding, for example, the number of video programs delivered in each video channel may be further increased. Consequently, the present system 100 is not limited to any specific QAM encoding value.

The video streams from the video cassette player 227 and the quadrature amplitude modulated MPEG compressed video transport streams from the media server 211 are then modulated by the first video modulator 212a for transmission over the RF cables 215b, 215c, and 215d to an audio-video distribution unit 231 at each of the passenger seats 123 and RF cable 215a to overhead equipment 230. To provide first class passengers 117, for example, with true video on demand, the streams are controlled by the passengers 117, with one stream assigned to each passenger that requests video services.

The simultaneous transfer of video streams derived from both the video cassette player 227 and the media server 211 in an aircraft entertainment system is considered unique. In particular, conventional systems either process analog (NTSC) video signals or digital video signals, but do not process both simultaneously. However, in the present system 100, NTSC and quadrature amplitude modulated MPEG-compressed digital video signals are processed simultaneously through the first video modulator 212a and distributed to passenger seats 123 for display.

The first passenger entertainment system controller (PESC-A) 224a is coupled to a plurality of area distribution boxes 217 by way of the RF cable 215d and the ARCNET network 216. The area distribution boxes 217 are used to distribute digital and analog video streams to the audio-video distribution units 231 at the passenger seats 123.

FIG. 5a is a diagram illustrating the passenger entertainment system controller (PESC-A) 224a and a cooperative audio-video unit 231 that provide for distribution of quadrature amplitude modulated (QAM) digital audio signals to passenger seats 123 throughout the aircraft 111. The passenger entertainment system controller 224a comprises a plurality of analog to digital converters (A/D) 351 that digitize audio input signals from input sources, such as one or more audio tape reproducers 223, the public address system 222 and a passenger service system 275. The digitized signals from these sources are multiplexed in a multiplexer (MUX) 352 that is controlled by a controller 353 and microprocessor ($\mu$P) 355 having a programmable memory 354. The programmable memory 354 stores code for use by the microprocessor 355 in multiplexing the signals.

The output of the multiplexer 352 is input to a first-in first-out (FIFO) buffer 356 and output signals therefrom are quadrature amplitude modulated using a quadrature amplitude modulator (QAM) 357. The format of the output signals from the FIFO buffer 356 is shown and includes a start frame set of bits (header) followed by each of the respective audio channels (CH1 . . . CHn). The output of the quadrature amplitude modulator 357 is modulated onto a carrier by an RF modulator 358 that transmits the QAM and RF modulated signal over the RF cable 215 to the audio-video units 231 at each of the passenger seats 123.

The audio-video units 231 each comprise a RF tuner 235 that demodulates the RF modulated signal transmitted over the RF cable 215 that is coupled to a QAM demodulator 237 that demodulates the quadrature amplitude modulated signals. The output of the QAM demodulator 237 is converted to an analog signal by a digital to analog converter (D/A) 363 and sent to the headphones 132. Selection of a particular channel to be listened to by a passenger 117 is made using the tuner 235 that demodulates the signal associated with the selected channel.

The improved quadrature amplitude modulated (QAM) digital audio distribution provided by this aspect of the present invention provides for a greater number of audio channels to be communicated over the RF cable 215. This is similar to the quadrature amplitude modulation of the video streams discussed above with reference to FIG. 5. The quadrature amplitude modulation provides for a plurality of states (not compression) that increases the usage of the bandwidth of the RF cable 215. Any type of analog input signal may be processed, including signals from the audio tape reproducers 223, passenger address system 222, passenger service system 275 or other analog audio source.

The area distribution equipment 210 distributes information from the head end equipment 200 to the seat group equipment 220. The area distribution equipment 210 also provides power to the seat group equipment 220. FIG. 6 is a block diagram showing the area distribution equipment 210 in accordance with a preferred embodiment.

The area distribution equipment 210 distributes data throughout the communications network formed between the head end equipment 200 and the seat group equipment 220. The area distribution equipment 210 comprises the plurality of area distribution boxes 217 that are each coupled to a plurality of floor junction boxes 232 that are individually coupled to respective audio-video seat distribution units 231 in the seat group equipment 220 of respective columns of passenger seats 123.

In a basic system, the area distribution box (ADB) 217 provides for interfacing the first passenger entertainment system controller (PESC-A) 224a to audio-video units 231 either directly or via floor unction boxes 232. The area distribution boxes 217 interface to the audio-video seat distribution units 231 by way of the junction boxes 232 using full-duplex RS-485 interfaces 218 and RF cables 215. The RS-485 interfaces 218 provide control and data links between the seat group equipment 220 and the head end equipment 200. The RF cables 215 couple audio and video data to headphones 132 and seat displays 122 for listening and viewing by the passengers 117. The area distribution box 217 acts as a connection box to facilitate the distribution of system power, combined audio/video signals and service data for up to five columns of audio-video units 231, and relay of service data and combined audio/video signals to the next area distribution box 217. The area distribution box 217 has an RS-232 serial diagnostic port to allow verification of functionality.

The area distribution box 217 removes power from a seat column in which either a short circuit or ground fault condition is identified. The area distribution box 217 restores power to a seat column from which power had been removed without requiring physical access to the area distribution box 217. When power is reapplied to such a column, the short circuit protection circuit functions normally and removes power from the column if the short circuit condition persists. An area distribution box 217 processor monitors the status of the AC power output to each individual AVU column for BIT/BITE purposes.

The area distribution box 217 provides the means to adjust the RF level in order to ensure that the proper RF levels for the video and modulated audio signals are supplied to the AVU tuners and demodulators in the presence of changing system configurations and operational conditions. This RF leveling is accomplished by the local processor/s in the area distribution box 217 by controlling a variable attenuator.

The area distribution box 217 provides for interfacing voice data, originating at passenger telephones 121c, to the first passenger entertainment system controller 224a. The telephone interface provides for input data from each AVU column to be combined with input data from another area distribution box 217 and retransmitted to the first passenger entertainment system controller 224a or the next area distribution box 217.

Figure 7:
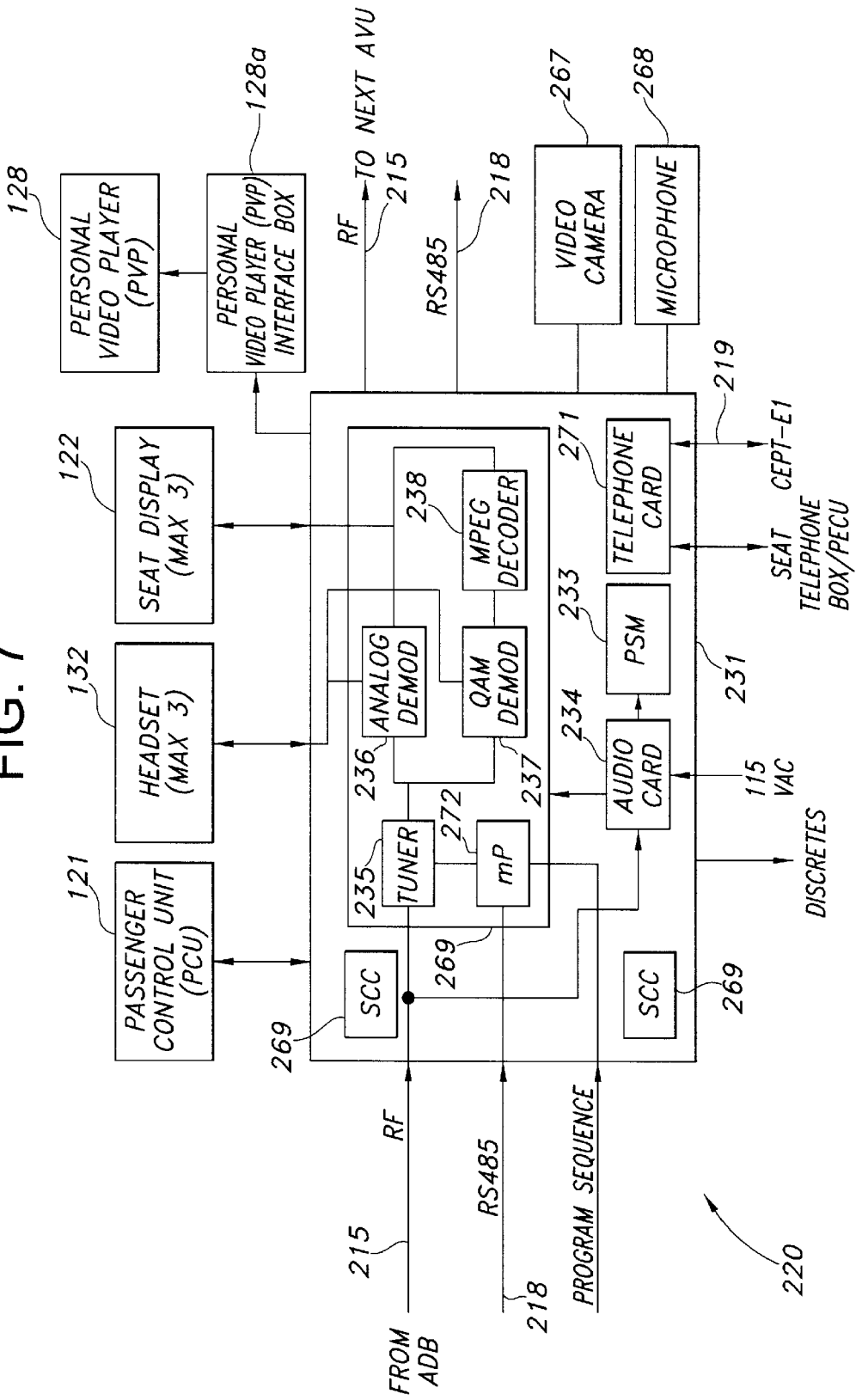
FIG. 7 is a block diagram of seat group equipment in accordance with a preferred embodiment.

FIG. 7 is a block diagram of exemplary seat group equipment 220 in accordance with a preferred embodiment. The seat group equipment 220 allows individual passengers 117 to interact with the system 100 to view movies, listen to audio, select languages, play games, video conference with others on and off the aircraft 111, and interface with other interactive services.

The seat group equipment 220 includes a passenger control unit 121, a seat display 122, headphones 132, interface 128a for a personal video player 128 (in certain zones), an audio-video unit 231 with a plurality of seat controller cards (SCC) 269 one for each seat 123 in a row to interface with the area distribution equipment 210, a video camera 267 and a microphone 268 for use in video conferencing, and a telephone card 271 that interfaces to the passenger control unit 121 when it includes the telephone 121*c* and/or credit card reader 121*d*. One audio-video unit 231 is provided for each seat 123 and controls distribution of video, audio and data to the headset or headphones 132, the seat display 122, and the passenger control unit 121.

Referring to FIG. 3, in certain zones of the aircraft 111, a personal computer interface 129*a* is provided which allows the passenger 117 to power a personal computer (not shown) and to interface to the system 100 through the audio-video unit 231. Alternatively, a keyboard 129*b* may be provided that allows the passenger 117 to interface to the system 100. The use of the personal computer 129*a* or keyboard 129*b* provides a means for uploading and downloading data by way of the satellite communications system 241 and the Internet.

The major functional requirements of the audio-video unit 231 are that it drives one to three seat display units 122 with or without touch screens, provides touch screen and display controls, provides two audio jacks per seat, provides two passenger control unit interfaces per seat 123, interfaces to a parallel telephone system, provides discrete signal interface, a parallel laptop power supply system, demodulates and tunes NTSC and QAM from the RF signal, provides PC type video games, provides an RS-485 interface for ADB-AVU or AVU-AVU communications, provides an interface for personal video players, and provides a PSS interface to an external parallel passenger service system (PSS), provides hardware and software interfaces that provide for video teleconferencing and Internet communications.

Referring to FIG. 7, one seat controller card 269 is dedicated to a passenger seat. Therefore, three seat controller cards 269 are required for a three-wide audio-video unit. Two seat controller cards 269 are required for a two-wide audio-video unit 231. A power supply module (PSM) 233 supplies power for the three seat controller cards 269, an audio card 234, the displays 122, and PCUs 121. The audio card 234 electrical circuits comprise RF demodulators to supply audio outputs. An interconnect card (not shown) connects the three seat controller cards 269, the audio card 234, the power supply module 233, and external connectors within the AVU 231.

The seat controller card (SCC) 269 provides many functions for a single passenger 117. Some of the functions that the seat controller card 269 provides include analog video and audio demodulation, graphics overlay capability, and Motion Picture Experts Group (MPEG) video and audio decompression. The seat controller card 269 provides the ability to demodulate the existing analog video signals as well as MPEG encoded signals delivered by the media server 211 that comprises a video-on-demand (VOD) server.

The seat controller cards 269 in FIGS. 7 and 7*a* in each audio-video seat distribution unit 231 contain a tuner 235 that downconverts the modulated RF signals to produce intermediate frequency signals containing the NTSC video streams and the quadrature amplitude modulated (QAM) MPEG compressed video streams. A QAM demodulator 237 and an MPEG decoder 238 are used to demodulate and decompress the quadrature amplitude modulated and compressed MPEG compressed video streams to produce MPEG NTSC video and audio signals for display.

An analog (video) demodulator 236 demodulates the NTSC video signals that are then passed to a video multiplexer 235*a* where an external NTSC video signal may be added. The NTSC signals are then digitized in a video A/D converter 235*b* and are passed to the MPEG decoder 238.

The format of the digital channels after QAM demodulation is MPEG-2 transport streams. The MPEG-2 transport streams may contain many streams of video, audio and data information. The MPEG decoder 238 (demultiplexer) may also receive data information to be sent to the SCC processor group 272. In the MPEG transport group, the capability exists to add text overlay with the digital video data. The digital data is converted to analog NTSC format using an NTSC encoder 238*a* for the display 122.

Each of the seat controller cards 269 includes a microprocessor (mP) 272 that controls the tuner. The microprocessor 272 is used to address the seat controller card 269 as a node on the network. A database is set up in the cabin file server 268 that includes entries for each of the microprocessors (i.e., each seat 123). The addressability feature permits programming of each seat to receive certain types of data. Thus, each audio-video unit 231 may be programmed to selectively receive certain videos or groups of video selections, or audio selections from selected audio reproducers. The addressability aspect of the present system 100 allows the airline to put together entertainment "packages" for distribution to different zones or groups of seats. Also, each seat (or seats in different zones) may be programmed to be able to play games, use the telephones 121*c* and credit card reader 121*d*, use a personal video player or computer, have the ability to engage in video teleconferencing and computer data interchange, or gain access to the Internet. Furthermore, the addressability associated with each seat permits order processing and tracking, and control over menus that are available to passengers at respective seats, for example. The addressability feature also permits dynamic reconfiguration of the total entertainment system 100.

To provide control from passenger seats 123, the microprocessor 272 in the audio-video unit 231 includes software that performs substantially the same functions as those in the primary access terminal 225. This may be achieved by selectively downloading a software module to the microprocessor 269 in the audio-video unit 231 when the passenger 117 requests this service. The downloaded software module operates in the same manner as the software on the primary access terminal 225. However, the RS-485 interface is used to send commands to the cabin file server 268 that control the ARINC-485 driver. Alternatively, and preferably, use of an Ethernet network 228 to interconnect the audio-video units 231 provides a readily implemented control path directly to the primary access terminal 225 and cabin file server 268, since they are normally connected by way of the Ethernet network 228.

The audio card 234 in FIG. 7 provides several functions. It demodulates the RF signal to provide audio. It has a multiplexer with audio inputs from the seat controller card 269, demodulated RF signal audio, and external audio. It routes the 115 VAC power to the power supply module and routes the DC power from the power supply module 233 to the interconnect card.

Figure 7B:
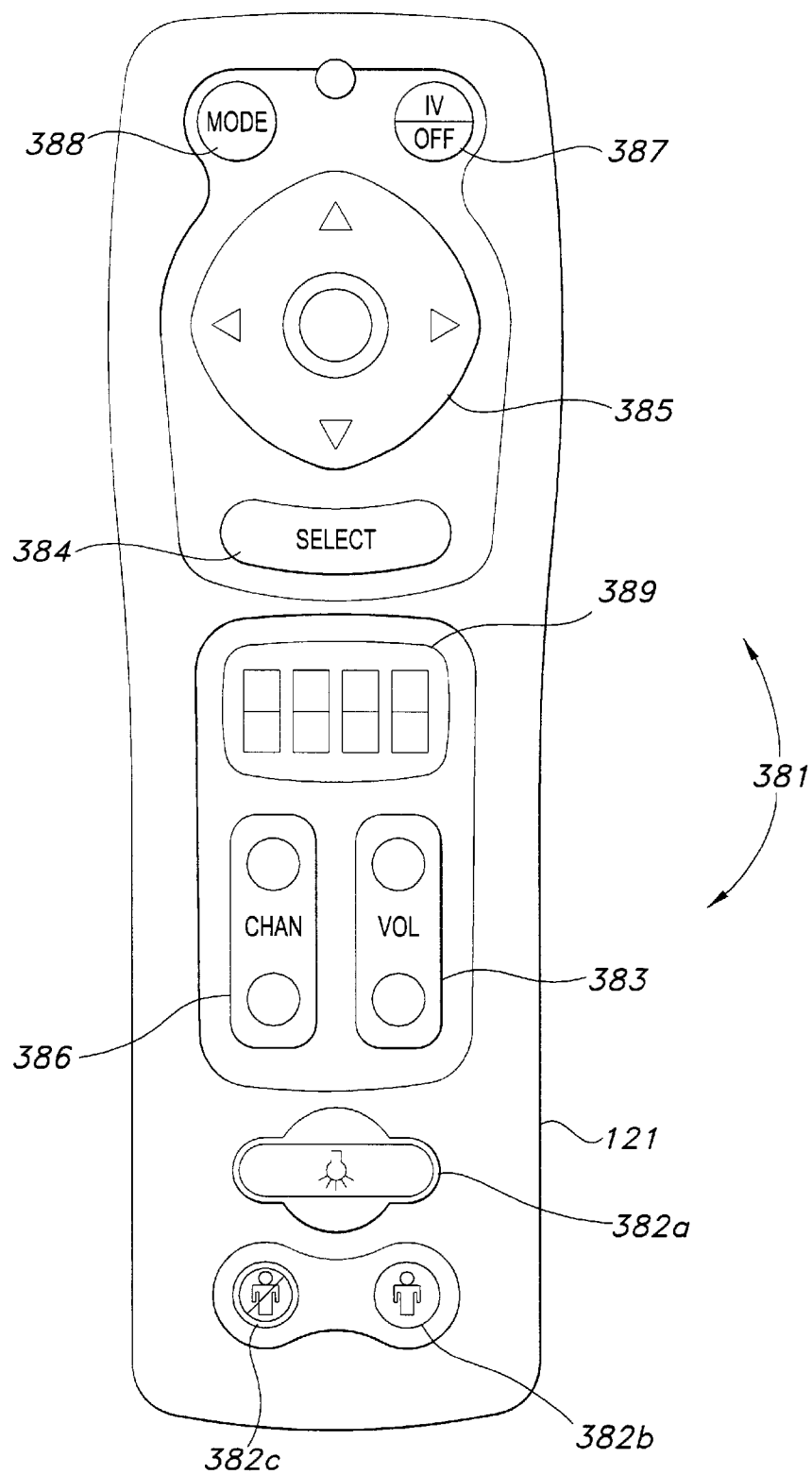
FIG. 7b illustrates a typical fixed passenger control unit.

FIG. 7*b* illustrates a typical fixed passenger control unit 121. The passenger control unit (PCU) 121 interfaces with the system 100 via the audio-video unit (AVU) 231 and provides a passenger interface having input controls 381 and display 389. The passenger control unit 121 communicates with the audio-video unit 231 for PCU/AVU data, AVU/PCU data, and power.

The passenger control unit 121 may be either side mounted or top mounted onto a seat 123 arm rest. The passenger control unit 121 has a four character alphanumeric display 389. Brightness of the LED display 389 is controllable, as a minimum, to two levels of brightness. The passenger control unit display 389 is controlled by the audio-video unit 231 to inform the passenger of current mode status and video functions.

The passenger control unit 121 also comprises depressible buttons that permit selection of items displayed on the seat display 122 and turn on call lights and overhead lights, and electronics. In designated sections or seats, the passengers also control selection of movies and games that are to be played, control the landscape cameras, and activate video conferencing and data communications. In selected sections (business and first class) of the aircraft 111, the telephone 121*c* and credit card reader 121*d* are integrated into the passenger control unit 121, while in other sections (such as coach class) these components are not provided.

A reading light on/off function key 382*a* turns on/off an overhead reading light. Call light on and call cancel function keys 382*b*, 382*c* permit calling a flight attendant. A volume control (increase/decrease volume) key 383 is provided. A select function key 384 allows the passenger to make a selection. Screen navigation function keys 385 provide a means for a passenger 117 to navigate through menus displayed on the display 122 or seat display unit (SDU) 122*a*. A channel up/down function key 386 provides for channel control (increase/decrease channel selection). A TV/OFF function key 387 turns the seat display unit backlight on. Pressing a mode function key 388 allows the passenger to have picture adjustment control of the seat video display through menus displayed on the seat display unit 122*a*.

The passenger control unit 121 interfaces to the credit card reader 121*d*. The credit card reader 121*d* reads three magnetically encoded tracks from credit cards that are encoded in accordance with ISO standards 7810 and 7811. Data content is read in accordance with the VisaNet Standards Manual and contain at least: major industry identifier, issuer identifier, primary account number, surname, first name, middle initial, expiration date, service code, and PIN verification data.

Figure 8:
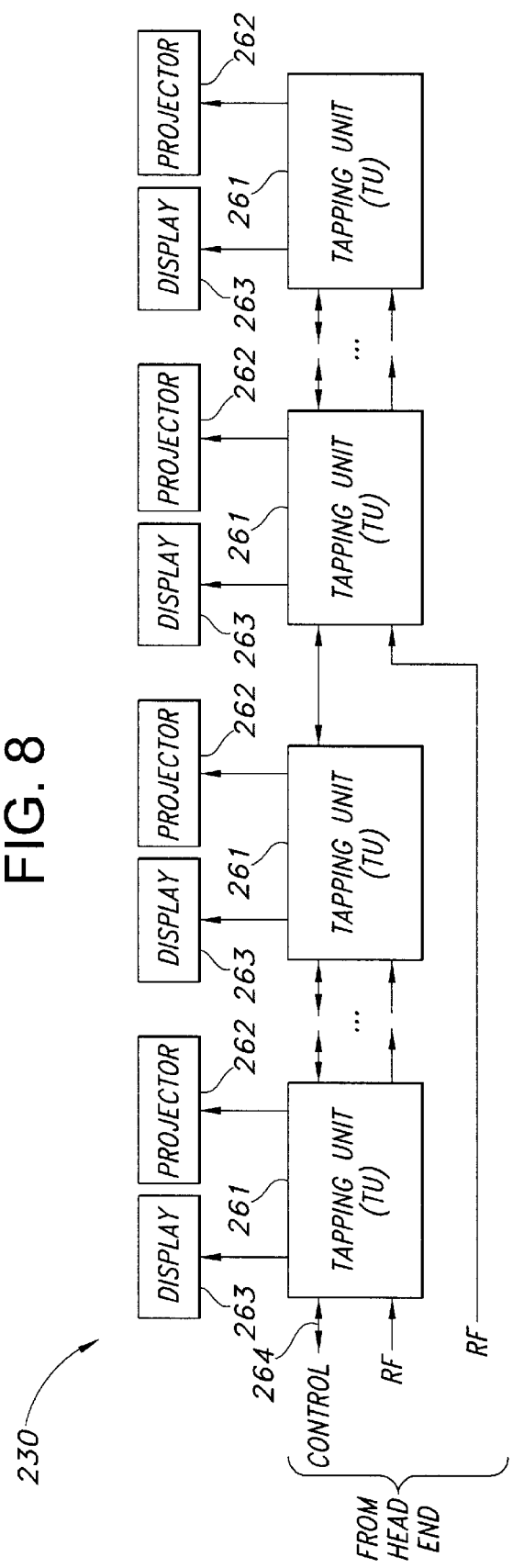
FIG. 8 is a block diagram of overhead equipment in accordance with a preferred embodiment.

FIG. 8 is a block diagram of exemplary overhead equipment 230 in accordance with a preferred embodiment. The overhead equipment 230 comprises a plurality of tapping units 261 coupled to the overhead and bulkhead displays 263 and video projectors 262. The overhead equipment 230 uses RF video distribution, wherein the RF signal is distributed from the head end equipment 200 to the overhead equipment 230 via the plurality of tapping units 261 which are connected in series. The tapping units 261 contain tuners 235 to select and demodulate the RF signal providing video for the monitors 263 and projectors 262 coupled thereto. Control is provided to the overhead equipment 230 using an RS-485 interface 264 coupled to the first passenger entertainment system controller (PESC-A) 224*a*. The information on the RS-485 interface 218 between the first passenger entertainment system controller (PESC-A) 224*a* and the tapping units 261 is controlled via operator input and protocol software running on the cabin file server 268.

In order to efficiently implement video teleconferencing, the use of a higher speed, larger bandwidth communication network may be provided to permit many simultaneous uses. This is achieved using a high speed network, such as the 100 Base-T Ethernet network 228 that is currently employed in the head end equipment 200. Interconnection of each of the audio-video seat distribution units 231 by way of a 100 Base-T Ethernet network 228 in addition to, or which replaces the lower bandwidth RS-485 network 218, provides substantial bandwidth to implement video teleconferencing.

Interconnection of the audio-video seat distribution units 231 using the 100 Base-T Ethernet network 228 also permits data communications between personal computers located at the seats 123 and remote computers 112. This is achieved by interfacing the 100 Base-T Ethernet network 228 to the satellite communications system 241. Inter-computer telecommunications may be readily achieved using a Web browser running on portable computers connected to the audio-video seat distribution units 231, or by integrating a Web browser into the audio-video seat distribution units 231. This is readily achieved by running the Web browser on the microprocessor 272 used in each audio-video seat distribution unit 231. Messages may be drafted using a keyboard 129*b* connected to the audio-video seat distribution units 231. Touchscreen seat displays 122 may be also readily programmed to initiate actions necessary to initiate videoconferencing, initiate communications, transfer messages, and other required actions.

Certain line replaceable unit types require the assignment of a unique address within the system 100. This is referred to as line replaceable unit addressing. Line replaceable units that require unique addresses are the PESC-A primary/secondary 224*a*, PESC-V 224*b*, video reproducers 227, area distribution box 217, tapping unit 261, and primary access terminal 225. Each of these line replaceable unit types is assigned a unique address during system installation.

Referring again to FIG. 2, it depicts the architecture of the system 100, and its operation will now be described with reference to this figure. The architecture of the system 100 is centered on RF signal distribution of video, audio, and data from the head end equipment 200 to the seat group equipment 220. Video and audio information is modulated onto an RF carrier in the head end equipment 200 via the video modulator 212*a* and passenger entertainment system controllers 224*a*, 224*b* respectively prior to distribution throughout the aircraft 111. Referring again to FIG. 5, it shows a functional block diagram of the signal flow to and from the head end equipment 200.

The source of video may be from video cassette players 227, landscape cameras 213, and the TV video output by the media server 211, or the passenger video information system 214. The source of audio information may be from audio reproducers 223, audio from video cassette players 227, or audio from the passenger address system 222.

The system 100 uses the RF network 215 to distribute all audio and video programming from the head end equipment 200 to the seats 123. The RF network 215 is also used to support downloading of video games and other applications to the seats 123.

The RF network 215 operates over a nominal frequency range from 44 to 550 MHz. The system 100 provides up to 48 6-MHz wide channels for distribution of video information. One of these channels may be used for the distribution of video games and other application software to the seats 123. The video channels are allocated to a bandwidth from 61.25 through 242.6 MHz (nominal). The frequency range from 108 to 137 MHz (nominal) remains unused.

The frequency range from 300 to 550 MHz is used for distribution of audio information to the seats 123. One embodiment of the system 100 uses pulse code modulation to transmit the audio data over the allocated frequency range. This supports a maximum of 88 mono audio channels (83 entertainment and five PA). The allocation of these channels to audio reproducers 223 (entertainment audio), video reproducers 227 (movie audio tracks) and to passenger address lines (PA audio) is database configurable and may be defined by the user. It is also possible to read and set RF levels for the passenger entertainment system controllers 224*a*, 224*b* and area distribution box 217 by means of an off-line maintenance program.

The system 100 uses the ARCNET network 216 as the major data communications path between major components. The ARCNET network 216 interconnects the following components: cabin file server 268, primary access terminal 225, PESC-A (primary) 224a, PESC-A (secondary) 224a, PESC-V 224b, and all the area distribution boxes 217.

The ARCNET network 216 is implemented as two physical networks, with the primary PESC-A 224a serving as a bridge/router between the two. Any device on ARCNET 1 216 is addressable by any device on ARCNET 2 216 and vice versa. In addition to the primary PESC-A 224a, ARCNET 1 216 connects the following components: cabin file server 268, and a maximum of eight area distribution boxes 217. In addition to the primary PESC-A 224a, ARCNET 2 224b connects the following components: a maximum of one PESC-V 224b, primary access terminal 225, and the secondary PESC-A 224a. Both ARCNET subnetworks (ARCNET 1, ARCNET 2) 216 operate at a data transmission speed of 1.25 Mbps.

System Operation

A preferred embodiment of the in-flight entertainment system 100 operates in three possible states. These states include 1) a configuration state, 2) a ground maintenance state, and 3) an entertainment state. In the configuration state, aircraft-installation-unique parameters are initialized and modified. The configuration state is initiated by an operator. The configuration state is entered and exited without the use of additional or modified system hardware. In the ground maintenance state, the system 100 performs self-diagnostics to determine system failures. The ground maintenance state is initiated by an operator. The ground maintenance state is entered and exited without the use of additional or modified system hardware. The entertainment state is the primary state of the system 100 and is initiated by the operator. The system 100 provides several entertainment modes as defined below. The system 100 is modular in design so any one or all modes may exist simultaneously depending on the configuration of the system 100. The system 100 is configurable so that each zone (first class, business class, coach class, for example) of the aircraft 111 can operate in a different entertainment mode. In the entertainment state, the passenger address functions and passenger service functions are independent of the mode of operation.

The entertainment modes include an overhead video mode, a distributed video mode, and an interactive video mode. In the overhead video mode, video is displayed in the aircraft 111 on the overhead monitors 263. Different video entertainment is possible for different sections of the aircraft. In the distributed video mode, multiple video programs are distributed to the individual passengers of the aircraft at their seat. The passenger selects the video program to view. The quantity of programs available depends upon system configuration. In the interactive video mode, the system 100 provides a selection of features in a graphical user interface (GUI) presentation to the passenger. Depending on the system configuration, the features may include language selection, audio selection, movie selection, video game selection, surveys, and display settings.

The system 100 provides audio programming to the passengers. When in the interactive audio mode of operation, the system 100 displays a list of audio programs available to the passenger on the seat display 122. This list is configurable via an off-line database. The system 100 may be configured to allow selection of an audio program using either the seat display 122 or controls on the passenger control unit 121 depending on the system 100 requirements. The selected audio program is routed to the corresponding passenger headphone 132.

The system 100 provides video programming to all passengers 117. When in the interactive video mode of operation, the system 100 displays a list of video programs available to the passenger on the screen of the seat display unit 122a. This list is specified via an off-line database. The system 100 may be configured to allow selection of a video program using either the seat display 122 or controls on the passenger control unit 121 depending on the system requirements. The selected video program is routed to the corresponding seat display unit 122.

When in the interactive mode of operation, the system 100 provides video games to the passengers 117. The system 100 displays a list of up to 10 video games available to the passenger on the seat display 122. This list is specified via an off-line database. The system 100 may be configured to allow selection of a video game using either the seat display unit 122a or controls on the passenger control unit 121 depending on the system requirements. The selected video game is downloaded to the corresponding passenger seat 123 for viewing on the seat display 122.

The system 100 supports entertainment packaging. An entertainment package is a predetermined set of one or more movie titles and/or game titles with a predetermined amount of game play time. The content of each entertainment package is specified via an off-line database. The system 100 requires payment for entertainment packages according to a unit price and a price policy. The system 100 displays a list of available packages on the screen the seat display unit 122a. Each package in this list must have an associated date range that specifies when the package is available. Up to four packages per date range are specified via an off-line database. The displayed list only contains those packages where the date of the current flight falls within the date range specified for that particular package.

As is shown in FIG. 7, for example, if configured with a personal video player 128 that interfaces to the audio-video unit 231 by way of a personal video player interface 128a, the system 100 controls the personal video player 128 via controls at the seat display 122. The system 100 provides commands to the personal video player 128 to play, rewind, fast forward, pause, stop and eject a tape.

The system 100 provides the ability to place telephone calls from each passenger seat 123. In certain configurations, the telephone handset is integrated into the passenger control unit 121. The handset includes a telephone button pad, a microphone, and a speaker. The system 100 prompts for payment when using the telephone service. Payment must be made via a credit card. The system 100 provides the capability to enter the phone number via controls on the passenger control unit 121. The system 100 also displays phone call status on the screen of the seat display 122.

The system 100 provides the ability for passengers 117 to select items from an electronic catalog displayed on the screen of the seat display 122. The catalog may be divided into categories. The system 100 provides the capability to configure the categories and the items via an off-line database tool.

The system 100 provides the capability to display on the screen of the seat display 122 a running tabulation of all expenses, excluding telephone charges, incurred at a seat during the current flight.

The system 100 is configured to allow the flight attendants to display flight information at the primary access terminal 225 from the off-line database or retrieved from other equipment on-board the aircraft 111. If this information is not available, the system 100 is configured to allow information to be entered manually at the operator console as detailed below. Flight information may include the following: aircraft registration number, flight number, departure airport, arrival airport, flight duration, and route type.

System Software

The system 100 employs a software architecture that integrates processing performed by each of the subsystems. The software and firmware comprising the software architecture controls the system, manages the flow of analog and digital audio and video data to passenger consoles and displays, manages the flow of communications data, and manages service and order processing. Various subsystems also have their own software architectures that are integrated into the overall system software architecture.

The system software is designed in a layered fashion, and an application programming interface (API) layer is defined and documented for the primary access terminal 225 and seat display 122. These application programming interfaces are used as the foundation upon which to implement the graphical user interfaces (GUIs). The GUIs are thus implemented in a manner that facilitates rapid prototyping and GUI modification within the constraints of the services provided by the application programming interfaces. The system 100 has a flight attendant GUI at the primary access terminal 225 and passenger GUIs at the seat 123 (seat display unit 122a). Each of these GUIs have the following properties: graphic orientation, clear and directly selectable functions (no "hidden" functions), consistency in screen layout and flow (look and feel), and "lexical" feedback (i.e., visible change on the display) for every user action.

Many of the line replaceable units in the system 100 are software loadable in that the contents of the line replaceable unit's memory can be overwritten from a source external to the line replaceable unit. The system 100 provides a facility for loading software into all line replaceable units. The software loading facility ensures that any attempt to load software into a line replaceable unit is appropriate for that type of line replaceable unit. The software loading function indicates when a line replaceable unit can and can not be loaded, the status of software load attempts as either successful or unsuccessful, and an estimate of the time required to load the software into the line replaceable unit. The software load facility employs a high speed download link to the line replaceable units, when appropriate, in order to minimize the time required to load software into a line replaceable unit. The software loading facility precludes load attempts when the aircraft 111 is in flight.

Software and firmware employed in the present invention permits credit card processing, data collection processing, Internet processing for each passenger, gambling for each passenger, duty free ordering, intra-cabin audio communication between passengers, and display of flight information. The system software includes parallel telephone system software, landscape camera management software, PESC system software, passenger address override software, passenger address emergency software, monetary transaction processing software, language support software, built-in-test software, user request processing software, database management software using a distributed configuration database, software for implementing interactive access, software for processing passenger orders, software for updating inventories, application software, media file encryption software, area distribution box software, audio-video unit programming software, telephone operation software, gatelink node and software, product service pricing software, passenger survey software, transaction reporting software, automatic seat availability reporting software, and video conferencing and data communications software.

Object oriented programming (OOP) is employed in the software and firmware used in the system 100. A preferred embodiment of the software used in the system 100 is written using JAVA, C, or the C++ language and utilizes object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be,applied to a passenger entertainment system such that a set of OOP classes and objects for the messaging interface can be provided.

The system 100 is constructed in a modular framework, and is designed to expand to support various aircraft 111 configurations. System configuration information is defined in an off-line configurable database. System configuration support tools provide the capability to generate database information, which is downloaded to the appropriate system line replaceable units. The line replaceable units store database information in non-volatile memory, and revert to default database information when they detect newly downloaded data inconsistent with the physical aircraft configuration, or when a database download is unsuccessful.

Aircraft configuration data requires modification only when the aircraft configuration changes, or when the line replaceable unit in which it resides has been replaced or corrupted. Aircraft configuration data at a minimum includes the following fields: Aircraft type, ACS database configuration ID, Overhead system type, Seat configuration, tapping unit and Overhead monitor assignments, Reading/Call light assignment, Master call lamps/attendant chimes data, RF level gain values, Internal ARCNET termination, PA/VA headphone, APAX-140-to-TES interface assignments, PESC audio channel assignments, VMOD video channel assignments, ADB phone capability, ADB discretes, PA zone, display controller, configuration of passenger entertainment system controllers 224, interactive/distributed video only (DVO), PAT/CFS options, and movie preview.

The entertainment system data define specific parameters for the available system features. It is necessary to reload the database whenever it is determined the associated features are to be changed. Entertainment system data, at a minimum, includes the following fields: Entertainment system data configuration ID, Video games, Movies, Pay/Free entertainment per zone, Passenger surveys per zone, General service/Duty free zones, seat display unit entertainment titles per route type, Currency exchange rates, primary access terminal display currency, Airline name, flight number, arrival/departure city, flight duration, and route type, Movie cycle attributes, Video announcements, video reproducer entertainment assignments, Product data, Credit card data, and Entertainment package details.

Figure 9:
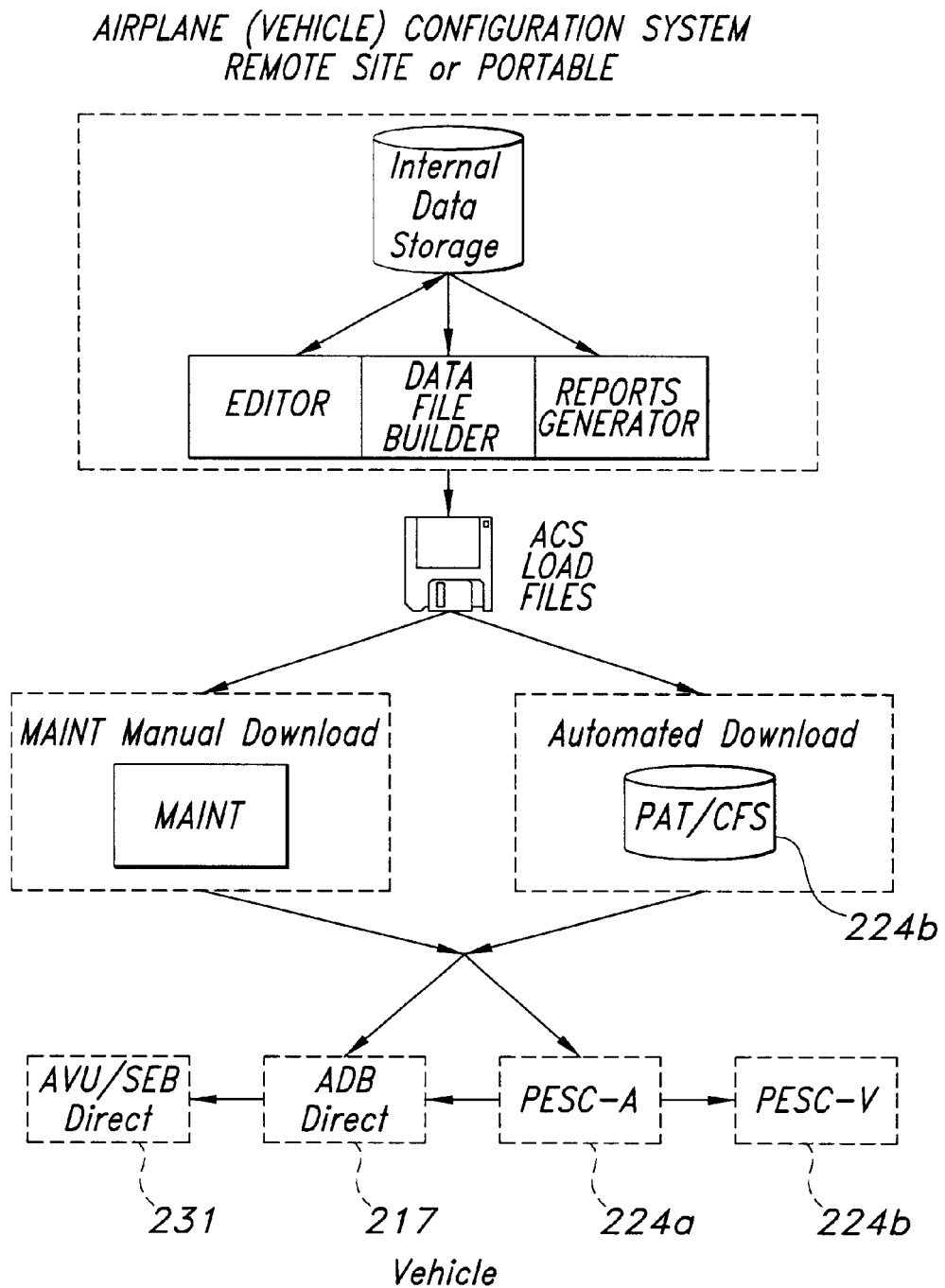
FIG. 9 is a block diagram of an Airplane Configuration System (ACS) tool used in accordance with a preferred embodiment.

FIG. 9 is a block diagram of the ACS tool and shows its functionality. The ACS tool provides hardware, user, software, and database interfaces as described below. The ACS tool supports the following hardware interfaces. The ACS tool supports a standard 101 key PC keyboard for the PC application and the primary access terminal standard keyboard. The ACS tool supports a standard Microsoft mouse, or equivalent, for the PC application. The off-line configuration database tools support generation of all downloadable configuration data. Airplane Configuration System (ACS) tools are used to generate aircraft configuration system data. The ACS tool is executable on an IBMcompatible 486 PC running Microsoft Windows 3.1 or a later version. The ACS tool produces downloadable data file on media that may be directly input via the primary access terminal 225 or a maintenance PC connected to a test port.

The ACS tool provides the following user interfaces. In general, the graphical user interface includes a series of screens with buttons and other controls and indicators. Screens, buttons, other controls, and indicators follow the general conventions for Windows screens as described in The Windows Interface Guidelines for Software Design. The GUI provides user access to the ACS tool's functions via keyboard and mouse inputs.

The ACS tool provides the functionality to maintain multiple configurations for all the aircraft types the TES 100 and APAX-150 systems support. The ACS tool is a single executable, regardless of aircraft type. This single executable utilizes a configuration file for pre-initialization of aircraft configuration data (.CFG). It also utilizes a Windows .INI file for ACS tool-specific parameter definition.

The ACS tool generates configuration data files that can be distributed to the TES line replaceable units. The applicable data files may be downloaded upon operator request via the MAINT Utility.

The ACS tool provides the ability to create and change an aircraft configuration by the use of menus, list boxes, data entry screens, utilities, error messages and help functions. An aircraft configuration defines what TES devices are installed on the aircraft, where those devices are located and what functions those devices perform. The PESC-A 224a, PESC-V 224b, area distribution box 217, ADB local area controller (ALAC) (not shown), AVU/SEB 231, and overhead electronic box (not shown) line replaceable units, as well as the primary access terminal 225 and cabin file server 268, the MAINT and Config/Status utilities all require knowledge of the aircraft configuration. The database created by the ACS tool that can be downloaded into the PESC-A 224a and contains the configuration data needed by the PESC-A 224a, PESC-V 224b, area distribution boxes 217, ALACs, AVUs/SEBs 231, tapping units 261, and overhead electronics boxes. The ACS tool has the capability to create separate configuration data files for the primary access terminal 225 and cabin file server 268 and the MAINT and Config/Status Utilities.

The ACS tool also has the capability to create downloadable data files that can be loaded directly into the area distribution boxes 217. The data files that the ACS tool creates for the primary access terminal 225 and cabin file server 268 are able to be imported by the primary access terminal 225 and cabin file server 268 into its database. These files provide information about the aircraft 111 so that interactive services can be provided to the passengers.

The ACS tool creates a downloadable data file (.INT File) that is able to be used by the MAINT and Config/Status Utilities to determine system-wide LRU status, software configuration, and diagnostic information. These utilities require system configuration definition data.

The ACS tool provides a configuration editor function that allows the user to modify an existing aircraft configuration or generate a new aircraft configuration by entering values into displayed data fields or by selecting values from drop-down menus, if applicable. The configuration editor allows the user to import, or copy, selected aircraft configuration data from one configuration to another. "cut" and "paste" operations are provided so that similar or identical configuration entries may be copied from one configuration to another. The configuration editor validates the value entered for each data field. The ACS tool generates error messages when the user enters invalid data in dialog boxes. The configuration editor provides the capability to save a configuration to disk. The ACS tool provides the capability to initiate a configuration validation test. If the validation test finds errors with the data, a detailed error report is displayed. The ACS tool allows a configuration that is INVALID to be saved to disk (.CFG), but the ACS tool does not allow a downloadable database to be built from a configuration that is INVALID.

A configuration data builder function of the ACS tool System provides the capability to generate downloadable configuration data files for use with the system 100 and peripherals. When the user attempts to create the downloadable data files, the ACS tool performs a validation check and tests for limits.

A reports generator function of the ACS tool provides the capability to generate, for a specified configuration, a validation report and a configuration report. A validation report contains information defining the validity of a specified configuration, including appropriate messages for entries in the configuration which are currently invalid. A validation report may be generated upon user request or upon request to generate download files. The configuration report provides a detailed report which describes the current configuration. The configuration report is generated only when a request to generate download files is made and the current configuration is determined to be valid.

A create floppy disk function of the ACS tool provides the capability to generate a disk that contains all files generated by the ACS tool. These downloadable configuration files are loaded to the various line replaceable units in the system. The diskette also contains a setup utility that can be run from the primary access terminal 225 to reinitialize the database on the cabin file server 268 with a new configuration.

Each line replaceable unit that uses the database contains electrically erasable programmable read-only memory (EEPROM) which are "downloaded" with the database. This means that the database which contains information about the airplane configuration can be passed to each controller (i.e., downloaded). These controllers include the PESC-A 224a, PESC-V 224b, area distribution boxes 217, ALACs, SEBs (AVUs) and overhead electronic boxes.

Many different configurations can be stored for an aircraft 111. Each contains slightly different options, such as the seating configuration. The ACS tool enables the different configurations, after established, to be recalled season after season by allowing the user to select an existing configuration to edit when a change is made to the aircraft 111 during re-configuration. The ACS tool allows the user to create a new configuration that can subsequently be saved.

Figure 10:
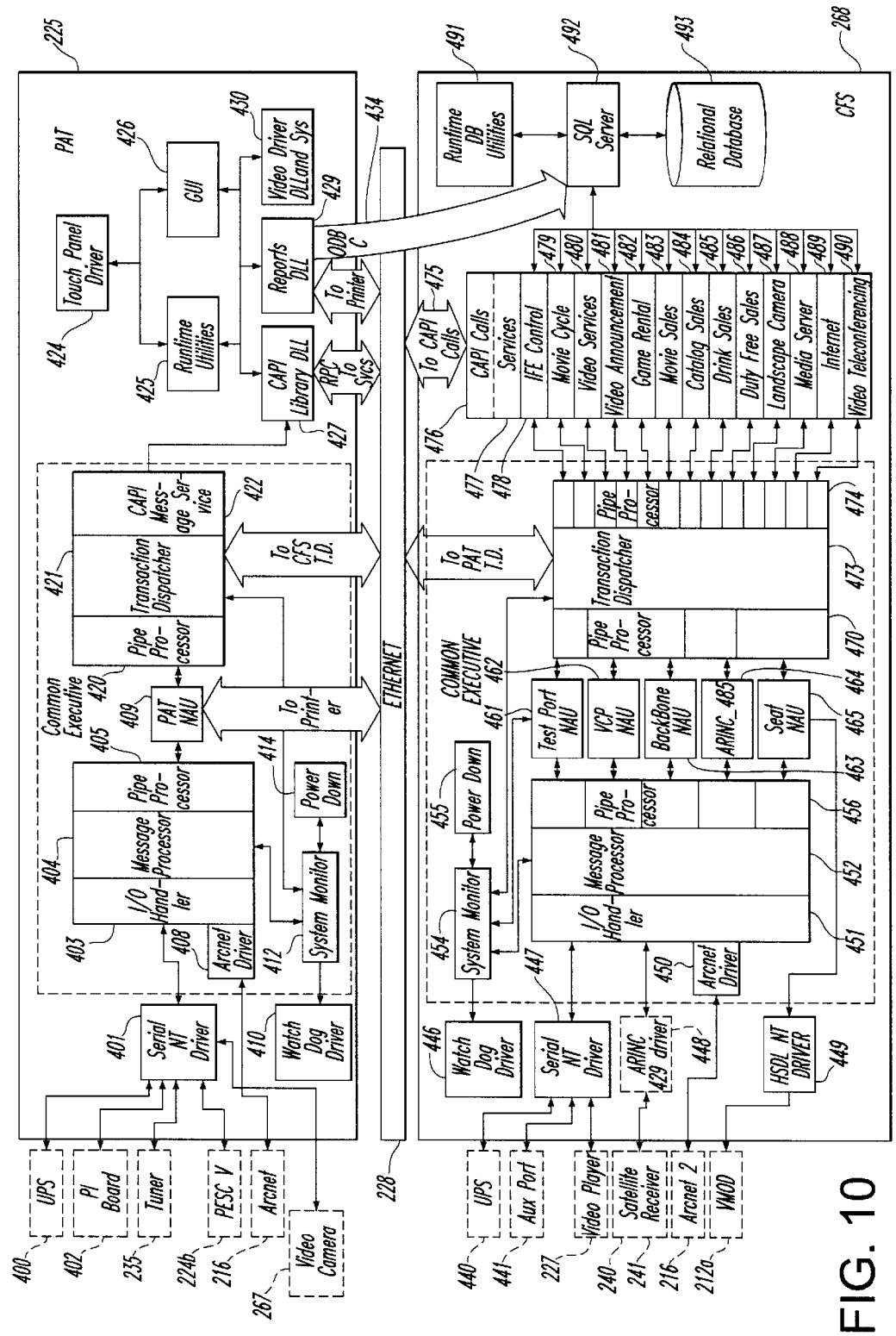
FIG. 10 is a block diagram of the software architecture in accordance with a preferred embodiment.

Presented below is software design information for a set of programs common to the cabin file server 268 and primary access terminal 225 LRUs of the system 100. The software forms the fundamental mechanism of moving application information through the system 100. The following description will be readily understood to those familiar with C++ and the Windows NT development environment. Reference is made to FIG. 10, which illustrates a block diagram of the software architecture in accordance with a preferred embodiment. The architecture facilitates a control center runtime that is implemented in C++ for the primary access terminal 225 and the cabin file server 268 of an in-flight entertainment system 100.

As for the primary access terminal 225, an uninterruptable power supply 400 is used to provide power to the primary access terminal 225 and is in communication with the programs in the software architecture using a serial NT driver 401. A PI board 402 provides a communication port for the magnetic card reader and video tuner and interfaces to the serial NT driver 401. The tuner 235 in the audio-video unit 231 also interfaces to the serial NT driver 401. The video camera 267 coupled to the audio-video unit 231 is also coupled to the serial NT driver 401. The serial NT driver 401 also interfaces with the PESC-V 224*b*. An ARCNET driver 408 interfaces to the ARCNET network 216.

The serial NT driver 401 and ARCNET driver 408 interface to an I/O handler 403 to provide selective communications between a message processor 404 and the various communications devices (400, 402, 235, and 267). The message processor 404 is responsible for processing messages and putting them into a common format for use by a transaction dispatcher 421. A pipe processor 405 is utilized to move common format messages from the message processor 404 through a primary access terminal network addressing unit (NAU) program 409 and through another pipe processor 420 into the transaction dispatcher 421. The message processor 404 also interfaces to a system monitor 412 that is coupled to a watch dog driver 410 that is used to automatically reset the primary access terminal 225 if no activity is detected in a given time interval, and a power down module 414 that performs graceful power down of the primary access terminal 225. The transaction dispatcher 421 interfaces with a cabin application programming interface (CAPI) library DLL 427 by means of a CAPI message service handler 422.

A touch panel NT driver 424 interfaces with runtime utilities 425 and a graphical user interface (GUI) 426 to provide operator control over the software. The runtime utilities 425 and graphical user interface 426 interface to the CAPI library DLL 427, a Reports DLL 429 and a video driver DLL and system (SYS) 430.

The Ethernet network 228 is used for messaging between the primary access terminal 225 and the cabin file server 268. The Ethernet network 228 interfaces to the primary access terminal network addressing unit 409, the transaction dispatcher 421, the CAPI Library DLL 427, and the Reports DLL 429.

As for the cabin file server 268, an uninterruptible power supply 440 is used to provide power to the cabin file server 268 and is in communication with the programs in the software architecture using a serial NT driver 447. The serial NT driver 447 is also coupled to an auxiliary port 441 and the video reproducers 227. An ARINC-429 NT driver 448 is coupled to the satellite broadcast receiver 240 and the satellite communication system 241. An ARCNET driver 450 interfaces to the ARCNET network 216. A high-speed data link (HSDL) NT driver 449 interfaces to the video modulator 212*a*.

The serial NT driver 447, ARCNET driver 450 and ARINC-429 NT driver 448 interface to an I/O handler 451 to provide selective communications between a message processor 452 and the various communications devices (440, 441, 227, 216, 212*a*). The message processor 452 is responsible for processing messages and putting them into a common format for use by a transaction dispatcher 473. A pipe processor 456 is utilized to move common format messages from the message processor 452 through various network addressing units 461–465 and through another pipe processor 470 into the transaction dispatcher 473. The network addressing units 461–465 include a test port NAU program 461, a.VCP NAU program 462, a backbone NAU program 463, an ARINC-485 NAU program 464 and a seat NAU program 465.

The message processor 452 also interfaces to a system monitor 454 that is coupled to a watch dog driver 446 that is used to automatically reset the cabin file server 268 if no activity is detected in a given time interval, and a power down module 455 that performs graceful power down of the cabin file server 268. Each of the network addressing units 461–465 is coupled to the system monitor 454. The system monitor 454 is also coupled to the transaction dispatcher 473. The transaction dispatcher 473 interfaces with CAPI services 477 that are called from the CAPI message service handler 422 in the primary access terminal 225. The transaction dispatcher 473 also interfaces to the primary access terminal 225 by way of the Ethernet network 228.

Cabin Application Programming Interface (CAPI) calls 476 are used to communicate information (as shown by arrow 475) between various cabin services 477 and the primary access terminal 225 via the Ethernet network 228 and various service interfaces. The separate communication link for the crystal reports DLL 429 is enabled through object oriented data base calls 434 to the Standard Query Language (SQL) server 492. The cabin services 477 include CAPI calls 476 with predefined formats for various services. The services include in-flight entertainment (IFE) control 478, movie cycle 479,video services 480, video announcement 481, game rental 482, movie sales 483, catalog sales 484, drink sales 485, duty-free sales 486, landscape camera 487, media server 488, Internet 489 and teleconferencing 490. Each of these services are controlled by way of the SQL server 492 which is coupled to a relational database 493 and are configured by means of runtime database utilities 491. The various services 478–490 are routed by way of the pipe processor 474 to the transaction dispatcher 473, through the associated NAU program 461–465, the message processor 452, and the relevant driver 447, 448, 449, 450, to the appropriate device 440, 441, 227, 240, 241, 216, 212*b*.

More specifically, the cabin file server 268 and primary access terminal 225 software comprises a control center common executive that includes the message processors 404 and 452, transaction dispatchers 421 and 473, and network addressable unit (NAU) programs 409, 461–465 that together manage communications flow among line replaceable units and applications, and record or log system irregularities for subsequent analysis. The control center common executive efficiently moves information from source to destination with a minimum of system resources, provides real-time expense or over-handling, provides a means to allow communications to originate at any source, including periodic status messages such as those to the primary access terminal 225 from the video players 227, and provides a consistent method of handling existing line replaceable units while allowing for additional line replaceable units. In addition, the common executive stores drivers that are not already part of the operating system. The system monitors 412 and 454 are provided to launch all application programs and shut them down as needed.

Each line replaceable unit type that communicates with the control center common executive has a corresponding network addressable unit (NAU) program 461–465. For example, any seat 123 that must communicate routes to the seat NAU program 465, any video cassette player 227 routes to the VCP NAU program 461, etc. Each time a line replaceable unit communicates with an NAU program 461–465, a virtual LRU is used to maintain cohesion between the application (service) and the device (driver). The virtual LRU is a state machine, one for each physical device associated to this NAU type. For example, if two seats "001A" and "021J" are communicating with the control center common executive, two virtual seat LRUs exist within the seat NAU program 465. It is within this state machine that the actual conversion between IFE-message and native messages takes place. Status and other information regarding each line replaceable unit are maintained in the VLRU.

In addition to the device-initiated VLRUs, several VLRUs are provided whose function is to maintain the status of related devices. For example, the primary access terminal 225 must constantly monitor the status of the printer, so a VLRU for the printer is used in primary access terminal NAU program 409. Similarly, the seats must be kept apprised of changes to the states of the system, so a VLRU for broadcasting this information is created in the seat NAU program 465.

Primary Access Terminal

The primary access terminal executive extension set of routines that, together with the common executive software, form the generic application for the primary access terminal 225.

Figure 11:
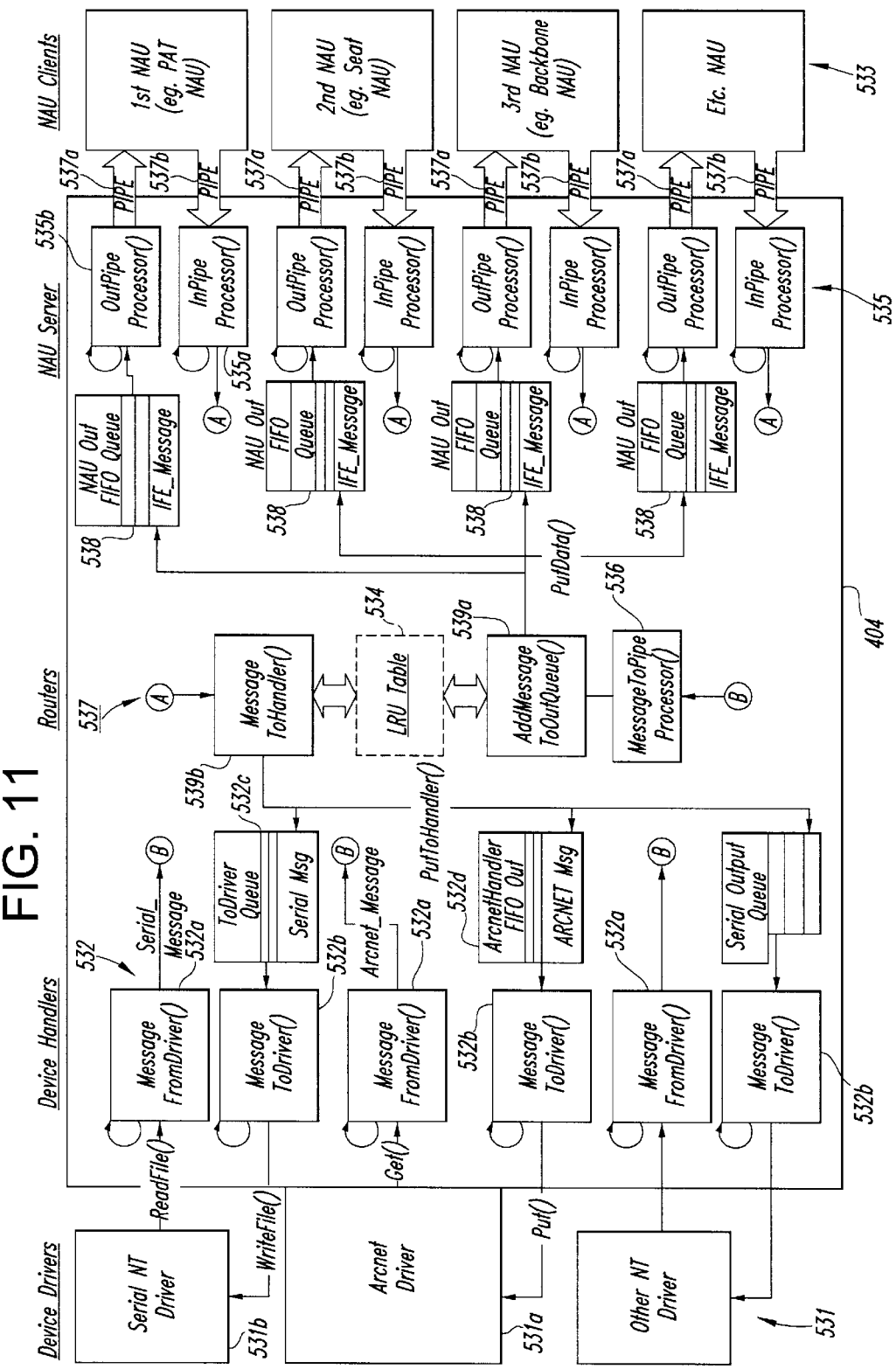
FIG. 11 illustrates message processor function and data paths.

The message processor 404 is shown in FIG. 11, which illustrates the message processor function and data paths. The message processor 404 interfaces a plurality of device drivers 531, including an ARCNET driver 531a and a serial NT driver 531b. The device drivers 531 are coupled to a plurality of device handlers 532. The device handlers 532 include MessageFromDrivers( ) 532a and MessageToDrivers( ) 532b. The MessageToDrivers( ) 532b associated with the serial NT driver 531b is coupled to a ToDriverQueue 532c, and the MessageToDrivers( ) 532b associated with the serial NT driver 531a is coupled to an ArcnetHandler FIFO 532d.

A NAU server 535 is provided that includes two named pipes (or communication lines) having a plurality of InPipeProcessors( ) 535a and OutPipeProcessors( ) 535b. The InPipeProcessors( ) 535a and OutPipeProcessors( ) 535b are coupled by way of a plurality of pipes 537a to NAU clients 533. The respective InPipeProcessors( ) 535a are coupled to a corresponding plurality of NAU out FIFO queues 538.

A plurality of routers 537 coupled the device handlers 532 to the NAU server 535. The plurality of routers 537 include the AddMessageToPipeProcessor( ) 536, an AddMessageToOutQueue( ) 539a, and a MessageToHander( ) 539b. The MessageFromDrivers( ) 532a of the device handlers 532 are coupled to the MessageToPipeProcessor( ) 536. The InPipeProcessors( ) 535a are coupled to the MessageToHander( ) 539b. The AddMessageToPipeProcessor( ) 536 and the MessageToHander( ) 539b are coupled to the LRU table 534.

The primary duty of the message processor 404 is to move communications between various I/O devices and their appropriate logical devices, the network addressable unit (NAU) 533. This duty is assigned to the message processor 404 instead of residing with the NAUs 533 because there is no one-to-one correspondence between the NAUs 533 and the device drivers 531. For example, several devices' communications may arrive via an ARCNET driver 531a (i.e., passenger entertainment system controller 224, seat 123, area distribution box 217, and AVU/SEB 231).

To support this duty, the message processor 404 includes the following sub-functions. Using an I/O handler 532, the message processor 404 receives messages from the device drivers 531. Each message, regardless of original format must contain a destination or network address for routing purposes. Using this network address coupled with the device type (i.e., ARCNET, RS-232, etc.) the network address determines the appropriate NAU via a look-up table 534 and routes the message to that NAU. Since communications from the devices employ a variety of protocols, they are bundled into an IFE-message upon receipt from the physical device, and unbundled after receipt from the application services (via the NAUs). In this way, the message processor 404 acts as a system translator. Using named pipes 535a and 535b, the message processor 404 receives messages from the NAUs. The message processor 404 determines the appropriate device driver 531 and network address and routes the message to the device. As NAUs demand, the message processor 404 creates two named pipes 535a (input) and 535b (output) for each NAU, maintaining the table 534 of pipe names (or handles) and their corresponding NAU IDs. The message processor 404 logs invalid destination address errors. The message processor 404 registers with the system monitor 412 for coordinated system operation.

The detailed design of the Message Processor 404 will now be discussed. MP.EXE is the Message Processor and comprises the following files:

| | |
|---|---|
| ARCNTCLS.CPP | The ARCNET interface Class |
| ARCSMCLS.CPP | The ARCNET Simulator Class for testing |
| DVCHNDLR.CPP | The Device Handler Class |
| MSSGPRCS.CPP | The Message Processor Class and Main( ) |
| PPPRCSSR.CPP | The Pipe Processor Class |
| SRLCLASS.CPP | The Serial Driver Class |
| WNRTTLCL.CPP | The WinRTUtil Class |
| ARCNTDRV.RT | The ARCNET User-side Driver |

A Main( ) function used in the message processor 404 initializes its processing threads using StartHandlers( ) and PipeProcessorClass::StartNAUThread( ) functions. These threads operate continuously to move data from source to destination. Main( ) also registers its existence with the system monitor 412 program (using MessageProcessorClass:Register( ) and waits for a shutdown signal from the system monitor 412, after which it performs an orderly shutdown of all its threads.

For each device driver 531, a Device Handler Class member is created. ArcnetClass defines Device Handler routines for the ARCNET driver 531a. The ARCNET driver 531a is a user side driver that performs the actual I/O with the ARCNET hardware. Because it is loaded along with the rest of the message processor 404, its interface is via Queue::Put( ) and Queue::Get( ) functions. SerialIOClass defines the Device Handler routines 532 for a serial device driver 531b. The serial driver 531b is a standard Windows NT Serial Device Driver. ReadFile( ) and WRiteFile( ) are the functions used to communicate with it. All Device Handlers 532 in the Message Processor 404 provide the following capability. Two Input-Driven threads are provided to control I/O. The names vary from handler to handler, but these functions launch the infinitely looping threads that constantly wait for data to move between the device (or queue) and the Message Processor 404.

| Handler | Launch Function Name | Thread Function |
|---|---|---|
| Serial Device | SerialInputInterface( ) | MessageFromDriver( ) |
| | SerialOutputInterface( ) | MessageToDriver( ) |
| ARCNET | MessageToHandlerThreadProc( ) | MessageFromDriver( ) |
| Device | MessageFromHandlerThreadProc( ) | MessageToDriver( ) |

To receive data from the device drivers 531, MessageFromDriver( ) 532a reads a message from its associated driver 531a or 531b using Get( ) or ReadFile( ) functions. It converts the input to a valid IFE Message using functions from the IFE_Message Class or ARCNET_Message Classes. It then calls MessageProcessorClass::MessageToPipeProcessor( ) to add the message to the NAU Output Queue 538.

To put data to an Output Queue 538, PutToHandler( ) puts a valid message at the end of the output queue 538 of its associated driver. It does not perform any data conversion.

To output queued qata to a device driver 531, MessageToDriver( ) 532b reads the output FIFO queue 538 and issues the appropriate driver output command. It does not perform any data conversion.

To start the handler to open communications to I/O ports, StartHandler( ) performs the necessary initialization to get queues, pointers and driver connections ready. It then starts-up the two I/O threads (InPipeProcessor( ) 535a and OutPipeProcessor( ) 535b).

The term NAU Server means the set of routines that comprise a "server" for the Network Addressable Unit processes. They are kept in the PipeProcessorClass. Two threads, NAUInThread( ) and NAUOutThread( ) are used to launch the set of I/O threads (InPipeProcessor( ) 535a and OutPipeProcessor( ) 535b) for an as yet unknown NAU process. The first message received from any NAU registers it to this set of threads, causing NAUInThread( ) and NAUOutThread( ) to launch another set, getting ready for the next NAU to speak. In this way, the Message Processor 404 is dynamic and can support different numbers of NAUs as needed.

As for incoming messages, NAUInThread( ) launches the InPipeProcessor( ) thread 535a which continuously receives a message from its input pipe 537b. If the message is meant to be routed to a driver 531, it gets sent to MessageToHandler( ) 539b which places it on the appropriate driver's output queue 532c. If the message is meant to be routed back to an NAU, it is sent instead to AddMessageToOutQueue( ) 539a which performs this routing.

As for outgoing messages, NAUOutThread( ) launches the OutPipeProcessor( ) thread 535b which continuously reads a message from the NAU Out Queue 538 and sends it to its associated NAU process via its named pipe 537a.

Routers 537 are routines that use the LRU table 534 to determine which processing thread needs to process the message. One router 537 is a From-NAU Router. Upon demand, MessageProcessorClass::MessageToHandler( ) 539b moves the message to the appropriate handler. If necessary, it converts the message to the appropriate 'native' syntax using functions from IFE_Message Class or ARCNET_Message Class. It calls appropriate PutToHandler( ) function to move the converted message to the handler's output queue 532c. Another router 537 is a From-Device Router. Upon demand, PipeProcessorClass::AddMessageToOutQueue( ) 539a calls the appropriate PutData( ) function to move the message to the NAU's output queue 538.

The LRU table 534 is an internal memory structure which contains an entry for each device in the system 100. It contains sufficient information to translate message addresses from NAU-to-Driver and Driver-to-NAU. Specifically, it contains a physical name, which is the name of each device (e.g., 001A for seat 1A); NAU Type, which is the NAU that processes message (e.g., 7 corresponds to SeatNAU); Network Address (e.g., 4F040552 for seat 1A's seat display unit 122); and Device Handler that indicates which device driver 531 to use (e.g., 0 for ARCNET). This information is kept in a SQL database table which is read during the Message Processor Main( ) initialization via CreateLRUTable( ).

As NAU processes register with the Message Processor 404, their identities are updated in this table via PipeProcessorClass::AddQueueInfoToLookUpTable( ), PipeProcessorClass::AddThreadPointerToLookUpTable( ) and PipeProcessorClass::AddPipeHandleToLookUpTable( ) functions, which include Pipe Handle, Thread Class, Registeree, Queue Class, and Queue Semaphore.

ARCNET is the token-passing network that provides the primary communication link between the Control Center and the backbone of the system 100. The ARCNET driver 408 and 450 is software that provides the interface between the message processor 404 and 452 and the physical ARCNET device interface in the cabin file server 268 or the primary access terminal 225. The desription below is for the primary access terminal 225.

For development efficiency, the ARCNET driver 408 has been attached to the message processor 404. The ARCNET driver 408 performs the following. The ARCNET driver 408 obtains a network address of this line replaceable unit. The ARCNET driver 408 understands network addresses for up to 8 cabin file servers 268 and up to 8 primary access terminals 225, to provide for future growth. The ARCNET driver 408 initializes the ARCNET device to proper configuration. The ARCNET driver 408 signs-on to the network. The ARCNET driver 408 handles network reconfigurations and builds up network map to obtain information for routing messages across multiple ARCNET networks. The ARCNET driver 408 deals with transmit handshaking exceptions that may occur.

The ARCNET device is an SMC COM20020 Universal Local Area Network Controller, the same device as used in all backbone line replaceable units. The network speed is 1.25 Mbps. The 256-byte ARCNET packet (short packet format) is employed. A 2KB internal device RAM is divided into two 256-byte pages: 1 receive buffer and 1 transmit buffer. The rest is currently not used. The line replaceable units are arranged in 2 ARCNET networks 216, one each supported by the primary access terminal 225 and the cabin file servers 268. The ARCNET driver 408 supports this variability.

Figure 12:
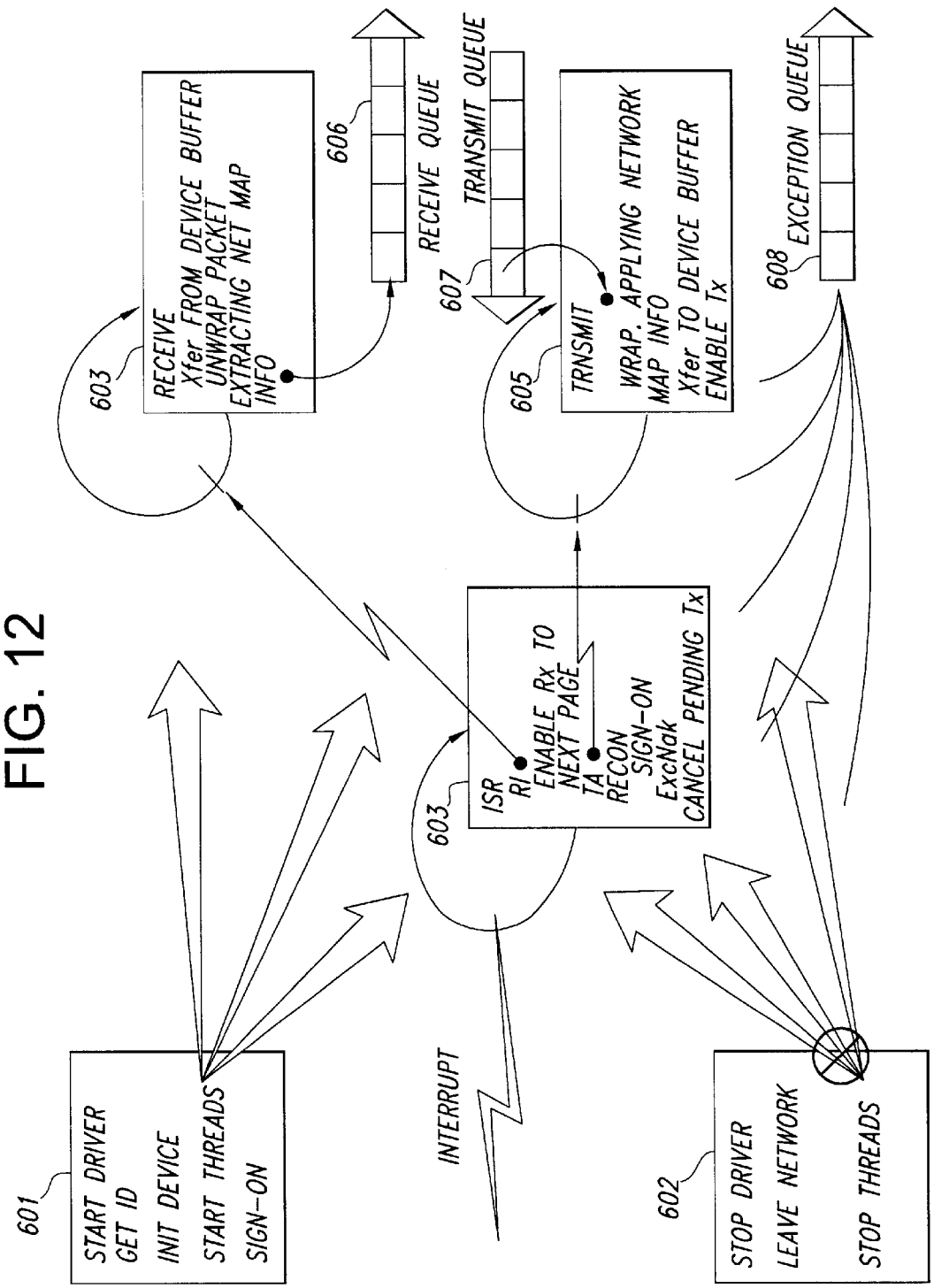
FIG. 12 illustrates operational flow of an ARCNET driver.

FIG. 12 illustrates the operational flow of the ARCNET Driver 408. The ARCNET driver 408 is part of MP.EXE and comprises the following source file: ARCNTDRV.RT the ARCNET Driver Source. This file is pre-processed using WinRT (see the make file) to incorporate the necessary additional functionality.

To use the ARCNET driver 408, a user first calls ArcnetDriverClass::StartDriver( ) 601 to initialize this driver and its device and establish queues 607, 606 to be used to transmit and receive data.

FIG. 12 illustrates the operational flow of the ARCNET Driver 408, where StartDriver( ) 601 launches I/O (receive, transmit) threads 604, 605 and an interrupt handler 603, and StopDriver( ) 602 shuts them all down.

Figure 13:
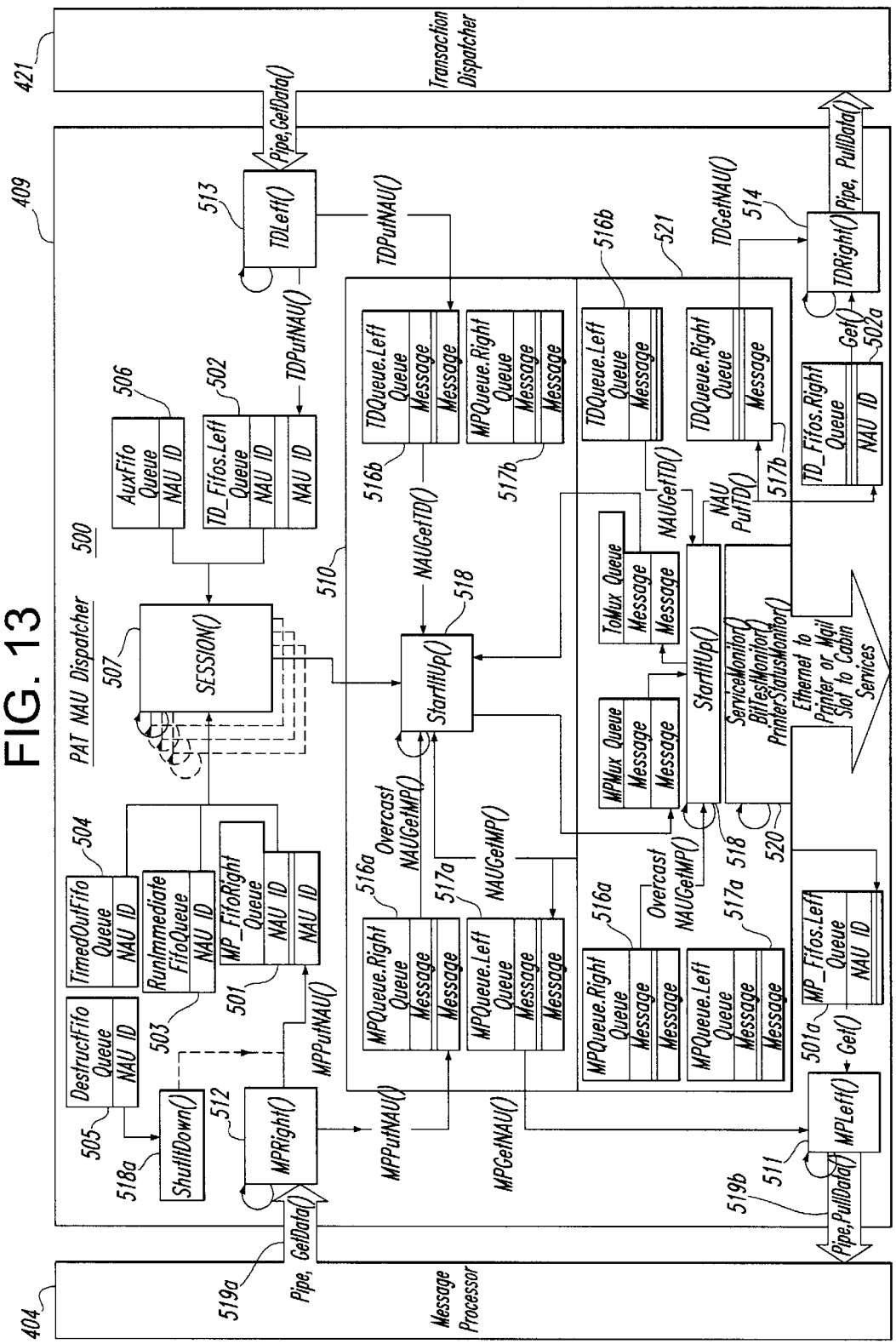
FIG. 13 illustrates primary access terminal network addressable unit function and data paths.

A discussion follows regarding the Network Addressable Units (NAU) that reside on the primary access terminal 225. The primary access terminal 225 Network Addressable Unit program 409 function and data paths are shown in FIG. 13. The primary access terminal NAU 409 provides the interface between the PAT GUI 426 or the Application Services and the unique devices attached to the Primary Access Terminal 225. Each of these devices is controlled via its own Virtual LRU (VLRU) set of functions. In addition, most of these devices communicate via the same I/O channel, the PI Mux 402. The VLRUs are listed below.

| | |
|---|---|
| Audio Tuner VLRU | The Audio Tuner VLRU allows control of audio channel selections for flight attendant previewing via the PAT GUI. |
| Card Reader VLRU | The Card Reader VLRU collects and forwards data from the card reader, to be used by the Access Functions and Sales Services' Functions. |
| GUI Monitor VLRU | No LRU is actually associated with this VLRU. The GUI Monitor VLRU's duty is to start the GUI and end the GUI as appropriate. |
| PAT VLRU | The PAT VLRU responds to loopback messages from the CFS TestPort NAU via Ethernet for BIT functionality. It logs communication failures between the PAT and the CFS. It controls the BITE and COMM LEDs on the front of the PAT, lighting them to indicate failures. |
| Printer VLRU | The Printer VLRU periodically queries the Control Center Printer for its status and provide this status as an unsolicited message to the PAT GUI. |

PAT.EXE contains the primary access terminal NAU program 409. In general, a network addressable unit program must first construct a NAUDispatch object and then construct one or more NAU objects, one for each virtual LRU (VLRU) that it supports. Certain VLRU-specific functions (such as NAU::StartItUp( )) must be created for each VLRU type. The primary access terminal NAU program 409 includes the following primary components:

| | |
|---|---|
| PAT.CPP | The Main( ) Program |
| PDSPATCH.CPP | The NAU Dispatcher |
| GUMNITOR.CPP | The GUI Monitor VLRU Class |
| CRDRDRVL.CPP | The Card Reader VLRU Class |
| TUNRVLRU.CPP | The Audio Tuner VLRU Class |
| PATVLRU.CPP | The PAT main VLRU Class |
| PRNTRVLR.CPP | The Printer VLRU Class |
| PRNTRSTT.CPP | The Printer VLRU's Status Sub-Class |
| PIMUX.CPP | The PI MUX VLRU Class |
| PINTRFCE.CPP | The base class for the Tuner VLRU, Card Reader VLRU and PAT VLRUs |

Main( ) registers with the System Monitor 412 and launches a PIDispatch object to open up communications between the message processor 404 and the transaction dispatcher 421. It calls PIDispatch::startItUp( ) 518 to initialize the VLRUs, one each. It also launches the Session( ) threads 507. Main( ) waits to die, either by receiving a ProcessStop command from System Monitor 412, or else it sleeps forever until interrupted. It calls shutItDown( ) 518a to close all the VLRUs down with a SubProcessStop command and exit gracefully.

Referring to FIG. 13, the message processor (MP) 404 and the transaction dispatcher (TD) 421 communicate by way of a Network Addressable Unit (NAU) dispatcher 500 that comprises NAUDispatch. NAUDispatch is a base class that contains the code necessary to open a framework for a new Network Addressable Unit. It contains the following global objects:

Qpair MP_Fifos Qpair MP_Fifos keep track of traffic between the NAU and the Message Processor. The NAU Object Ids are stored in these two queues.

Qpair TD_Fifos Qpair TD_Fifos keep track of traffic between the NAU and the Transaction Dispatcher. The NAU Object Ids are stored in these two queues.

Queue RunImmediateFifo The Queue RunImmediateFifo keeps track of NAUs which require immediate attention, regardless of outside messages.

Queue TimedOutFifo The Queue TimedOutFifo allows an NAU VLRU to time out, thus giving processing over to others until the time out occurs.

Queue DestructFifo The Queue DestructFifo is used by shutItDown( ) to cause each VLRU to shut down.

Queue AuxFifo The Queue AuxFifo is used in Session-.cpp of Seat.exe only.

Only the first constructor call per program uses InitNAUDispatch( ) to start all session threads 507 (one for each VLRU plus 2 up to a maximum of 14) for the NAU. It opens Named Pipes 519a and 519b between the message processor 404 and the transaction dispatcher 421 Fifos 501, 502 and the session threads 507 to manage I/O between them. It then initiates threads 511–514 that manage input and output between the message processor 404 and the transaction dispatcher 421 (MPLeft( ) 511, MPRight( ) 512, TDLeft( ) 513 and TDRight( ) 514). Once these initialization steps have been accomplished, the main program constructs NAU state machine objects 510 (also called VLRUs).

In addition, this class contains the following utility functions:

AddNAU( ) This routine adds a VLRU object ID to an array for later lookup (to send it a message or shut it down, for example).

AddNAUMap( ) This routine adds a VLRU object ID and its text name to an array for later lookup.

FindNAU( ) Returns the VLRU object ID based on the text name passed to it.

GetNthNAU( ) Returns the VLRU object ID in the 'nth' position in the array.

GetNumberOfNAUs( ) Returns the number of VLRU object Ids in the array.

RemoveNAUFromMap( ) This routine removes a VLRU object ID and its text name from the array.

SendToAllVLRUs( ) This routine sends the same message to all VLRUs via their MPRight.queue, as if it was sent via the MP. It uses MP logic as a short-cut, rather than developing more routines for intra-process communication.

SendToOneVLRU( ) This routine sends a message to a single VLRU via its MPRight.queue, as if it was sent via the MP. It uses MP logic as a short-cut, rather than developing more routines for intra-process communication.

shutItdown( ) This routine is used to turn off all VLRUs, typically called because a message was sent by the System Monitor to the main( ) routine to do so.

startItUp( ) The startItUp( ) routine is used to start up all VLRUs.

The MPRight( ) Thread routine 512 continuously waits for incoming messages from the Message Processor 404 via the Named Pipe 519a. The term 'right' indicates that the data moves from left-to-right in FIG. 13.

The MPRight( ) Thread 512 uses the IFE Message Class routines to deal with the data received. Once a message is received using IFE_Message::GetData( ), it looks up the appropriate VLRU name (IFE_Message::GetAddress( )) and uses it to look up the appropriate NAU object ID (FindNAU( )). Then it stores the incoming message in that NAU's MPQueue.Right queue 516a and places the NAU's ID into the Dispatcher's MP_Fifos.Right queue (MPPutNAU( )) 501. This ID is then used by the Session threads 507 that are constantly running to decide which VLRU needs to be processed.

A "hook" function pointer is provided with this thread to allow applications to pre-process the message prior to MPRight( )'s storage. If no hook function is defined, this is ignored.

The MPLeft( ) Thread routine 511 continuously waits for outgoing messages for the Message Processor 404. The term "left" indicates that the data moves from right-to-left in FIG. 13. It uses the IFE Message Class routines to deal with received data.

Using Queue::Get( ) it reads the NAU ID from the MP_Fifos.Left queue 501 then uses that NAU's MPGetNAU( ) function to read the data from its MPQueue.Left 517a, and uses IFE_message::PutData( ) to output the message via the Named Pipe 519b.

The TDLeft( ) Thread 513 behaves like MPRight( ) 512, except that the input comes from the transaction dispatcher 421. The TDRight( ) Thread 514 behaves like MPLeft( ) 511, except that the output goes to the transaction dispatcher 421.

It is sometimes impractical for all VLRUs to be running at once (for example, the seat NAU can contain more than 500 VLRUs), so a maximum number of processing threads has been established as 14. These threads 511–514 each execute a Session( ) function 507 which waits for an event such as input from any source (message processor 404, transaction dispatcher 421, TimeOut, etc.), then determines which VLRU state machine needs to be run to process the message and executes it via the VLRU's StartItUp( ) function 518 called by NAU::EntryPt( ). When EntryPt( ) returns, the message is fully processed, and Session( ) 507 loops to get another one.

The NAU class contains foundation routines and data for any VLRU. It is derived from the timed Callback class and Cobject class (from a C++ Foundation Class Library). The NAU constructor makes an object that has TDQueue and MPQueue, two Qpair objects. These queues are used to store the actual data or IFE_Message needed by the VLRU state machine. The NAU constructor also creates three Event Semaphores, including a RunImmediateEvent semaphore, a TimeOutEvent semaphore and an AuxEvent semaphore, which allow it to control processing via the related Queues in the NAU dispatcher 500. Finally, the NAU constructor creates one mutex, DispatchMutex which coordinates which Session thread can access the data for a given VLRU (in case two threads try to handle messages for the same VLRU).

The StartItUp( ) function 518 (not the same as NAUDispatch:startItUp( )) is called by NAUDispatch::Session( ) when a message is ready to be processed by the VLRU. The StartItUp( ) function 518 typically varies per VLRU, but it's job is to fully process one message received from any source. That may simply mean passing the message on, say from message processor 404 to transaction dispatcher 421 or vice-versa.

Data Movement Functions will now be discussed. The NAU class contains the following members used to move data to and from the message processor 404 and the transaction dispatcher 421:

MPGetNAU( ) Moves data from MPQueue.Left for output to the MP.

MPPutNAU( ) Moves data from input from MP to MPQueue.Right.

NAUGetMP( ) Moves data from MPQueue.Right into StartItUp( ) for processing.

NAUGetTD( ) Moves data from TDQueue.Left into StartItUp( ) for processing.

NAUPutMP( ) Moves data from StartItUp( ) into MPQueue.Left for later output.

NAUPutTD( ) Moves data from StartItUp( ) into TDQueue.Right for later output.

TDGetNAU( ) Moves data from TDQueue.Right for output to the TD.

TDPutNAU( ) Moves data from input from the TD to TDQueue.Left.

Other generic NAU functions include:

bOKToRun( ) Reports to NAU Dispatch whether a VLRU is ready to run. The base version of this always returns TRUE.

EntryPt( ) This launches the VLRU's own StartItUp( ) function.

get_hTimeOutEvent( ) Returns the value of the Time Out Event handle.

get_hVLRUEvents( ) Returns a pointer to all the Event Handles used by this session to get Input.

get_NAUState( ) Returns the current state of the VLRU. If "Active", the VLRU is capable of processing information. If "Inactive", it can't take any messages. For example, if the system is not currently allowing game play, the HSDL VLRU would be "Inactive".

GetBITEStatus( ) This function varies from VLRU to VLRU and is only a placeholder in the base class.

GetMPQPair( ) Returns a pointer to the MP Queues—lets the user bypass the entire message traffic philosophy.

GetName( ) Returns the text name of the current NAU VLRU.

GetTDQPair( ) Returns a pointer to the TD Queues—lets the user bypass the entire message traffic philosophy.

GetUseMessageCounter( ) Retrieves a flag set with SetUseMessageCounter( ).

set_NAUState( ) Used to control the state of the VLRU state machine. Currently, the two states used are "Active" and "Inactive".

SetUseMessageCounter( ) Sets a flag used by NAUDispatch::Session( ). If TRUE, Session( )counts messages for the VLRU.

As discussed above, each of the devices (402, 235, 224, 216) attached to the primary access terminal 225 is controlled via its own virtual LRU (VLRU) or NAU state machine objects 510 functions discussed in conjunction with FIG. 13. Most of these devices communicate via the same I/O channel, a PI Mux.

The tuner VLRU allows control of audio channel selections for flight attendant previewing via the PAT GUI 426. The TunerVLRU class is also a PIInterface class child. Its StartItUp( ) routine handles the SubProcessStart and SubProcessStop commands the same as the others, and then waits for I/O from either the PI Mux or the transaction dispatcher 421. If a message is received from the PI Mux, it forwards it to the transaction dispatcher 421 using NAU::NAUPutTD( ). If a message is received from the message processor 404, it forwards it to the PI Mux using ToMuxPut( ).

The card reader VLRU collects and forwards data from the card reader 121d, to be used by the access functions and sales services' functions. Based on the PIInterface class, the CardReaderVLRU class is the first actual VLRU created for this NAU. It creates an event called StartEvent which is used by PIMux to coordinate all the other PIInterface VLRUs. Its StartItUp( ) 518 routine loops forever retaining its Session( ) thread. It looks for a SubProcessStart command from the message processor 404 (which is issued by NAUDispatch::startItUp( )) and then waits for StartEvent to trigger before processing any other messages. Once StartEvent has occurred, it can continue processing. If it receives a SubProcessStop message, it terminates. It reads and ignores all other messages from the message processor 404 and the transaction dispatcher 421. Instead, it looks for input via its FromMux semaphore event, which tells when it has received data from the PI Mux. If the PI Mux sends a CardRead command, this VLRU calls MagCardData( ) to process this message. All other messages are returned to the Mux via the ToMux queue. MagCardData( ) converts the data into ASCII and forwards it to the primary access terminal application via the transaction dispatcher 421. Optionally for testing, the Register can be set with the value "DisplayMagCardData" to cause all the card data to be printed to a window at the primary access terminal 225 via stdout.

The GUI Monitor VLRU starts the GUI and ends the GUI as appropriate. No LRU is actually associated with this VLRU. When the GUI_Monitor object is created, it creates an extra event called ServiceAlive. This event is set via ServiceMonitor( ) and tested in StartItUp( ) 518 to know whether Cabin Service is communicating to this NAU. The StartItUp( ) routine is called as soon as all the VLRUs are created via the PIDispatch::startItUp( ) it launches another thread called ServiceMonitor( ) which continuously tries to receive messages from the Cabin Services program via a mail slot. It then uses this as a 'heart beat' to know if the application is still alive. If this heart beat fails to occur after having been established, the GUI Monitor terminates the GUI process. If this heart beat is never established, ServiceMonitor( ) simulates one, for test purposes. StartItUp( ) 518 continuously loops and waits for the SubProcessStart command from the message processor 404 (from the PIDispatch::startItUp( ) routine), and then it waits for PIDispatch( ) to tell whether it connected to the database successfully by triggering the ConnectedToService event. Then it attempts to start the CGUI.EXE program. If StartItUp( ) detects that the GUI terminated, it attempts to restart it. StartItUp( ) ignores messages from the transaction dispatcher 421, and only processes the SubProcessStart and Stop commands from the message processor 404.

The Card Reader, Tuner, PI Mux, primary access terminal and Printer VLRUs are all based on the PIInterface class. Essentially, this provides support for one more source of I/O, from the PI Mux (or multiplexed I/O port) via the PIMux VLRU. The PIMux VLRU provides the following member routines:

ToMuxPut( ) Converts a PAT_Message into appropriate syntax for either Audio Tuner or PI 'Board' message and sends the data to the ToMux queue.

FromMuxPut( ) Places a message on the FromMux queue.

FromMuxGet( ) Reads a PI_Message from the FromMux queue and converts it to a PAT_Message.

ToMuxGet( ) Reads and encodes for transmission a PI_Message from the ToMux queue.

FromMuxSemaphoreHandle( ) Returns the handle for this queue

FromMuxSemaphoreHandle( ) Returns the handle for this queue.

The PIMux class is the VLRU which communicates via the message processor 404 and the transaction dispatcher 421 for all I/O with the PI Board, for card reader, tuning, etc. The PIMux class points to each of these VLRU classes for data transfers through their FromMux and ToMux queues. A StartItUp( ) routine loops forever retaining its Session( ) thread. It looks for a SubProcessStart command from the message processor 404 (which is issued by the NAUDispatch::startItUp( ) routine) and triggers the StartEvent to activate its associated VLRUs (Card Reader, etc.).

Once StartEvent has occurred, it proceeds to receive I/O from the message processor 404 and the transaction dispatcher 421. It determines which sub-VLRU should process the message and forwards it to their FromMux queue for handling, and then it responds an Ack or Nak to the PI board, as applicable to satisfy its communications protocol needs.

Messages from the VLRUs intended for the PI Mux are sent to this VLRU as well via their ToMux queues. It encodes the messages as needed, forwards them and handles the Ack/Nak protocol. It has its own version of NAUGetMP( ) in order to use the PI_Message data handling routines.

The primary access terminal VLRU responds to loopback messages from the CFS TestPort NAU via Ethernet for BIT functionality. It logs communication failures between the primary access terminal (PAT) 225 and the cabin file server (CFS) 268. It controls the BITE and COMM LEDs on the front of the PAT, lighting them to indicate failures. The PatVLRU class is also a PIInterface class child only so it can synchronize operation via the StartEvent trigger. Its constructor reads the registry "VerbosePATVLRU" settings (for test purposes) and the "BITTestInterval" value for BIT testing timeouts. StartItUp( ) launches a thread called BitTestMonitor( ) and then loops continuously to process messages. First, it waits to receive a SubProcessStart message, then it waits for the StartEvent to know that PIMux is alive and ready to go. SubProcessStop causes it to kill the BitTestMonitor( ) thread and then die. All other messages from the message processor 404 are ignored. If an Ethernet Loopback message is received from Test Port NAU via the transaction dispatcher 421, it uses EthernetLoopback( ) to return a message via NAU::NAUPutTD( ), and then tell the BitTestMonitor that the loopback occurred. All messages from the PIMux are returned to it via PIInterface::ToMuxPut( ) and otherwise ignored as an error. The BitTestMonitor( ) turns both BITE and COMM LEDs on at the primary access terminal 225 to show that they are both working. Then it turns off the BITE light and waits. If it receives notification from StartItUp( ) that a loopback occurred, it turns off the BITE LED. If it times out waiting for a loopback, it turns the LED back on. If it gets several successive failures (timeouts) it logs it to the event log. If it gets told to exit by StartItUp( ), it turns the BITE LED on and dies.

The Printer VLRU periodically queries the control center printer for its status and provides this status as an unsolicited message to the PAT GUI 426. The PrinterVLRU object is a PIInterface class child only so that it can sync up with PI Mux to start processing. Its constructor retrieves "PrinterPollInterval" and "PrinterStatusTimeout" from the Registry and then creates hEventPrinterStatusChange and hEventStop to communicate to the monitor thread that is created in StartItUp( ). This class also has a PrinterStatus class object called Printer which does all the actual communication with the printer over the Ethernet network 228. StartItUp( ) launches the PrinterStatusMonitor( ) thread, and then loops forever. The only message processor messages it processes are:

SubProcessStart After receipt it waits for the StartEvent signal to continue

SubProcessStop Kills the Monitor thread and dies

StartItUp( ) ignores all messages from the transaction dispatcher 421. It echoes any messages back to the PI Mux and otherwise ignores them. If StartItUp( ) receives a PrinterStatus event (from the monitor), it calls SendPrinterStatus( ) to build the status message and then sends it to the CAPI Message Service via NAU::NAUPutTD( ). PrinterStatusMonitor( ) uses the PrinterStatus object of this VLRU to talk to the printer. If it cannot talk to the printer via PrinterStatus::InitializePrinterSNMP( ), it logs the error to the event log. If changes in the printer status occur, it tells StartItUp( ) via hEventPrinterStatusChange. It logs the following other events to the event log: Out of Paper, Has Paper Again, any other errors, and 1st Status after any error.

SendPrinterStatus( ) uses PAT_Message routines to convert the PrinterStatus info to ASCII. It then sends it on to the CAPI Message Service via NAU::NAUPutTD( ). The PrinterStatus class constructor connects to the Printer via the Ethernet network 228 using InitalizePrinterSNMP( ), requests the status via RequestRawPrinterStatus( ), Interprets (with StatusDescription( )) and displays the printer status info using DisplayPrinterStatus( ), among other private routines.

Transaction Dispatcher

Figure 14:
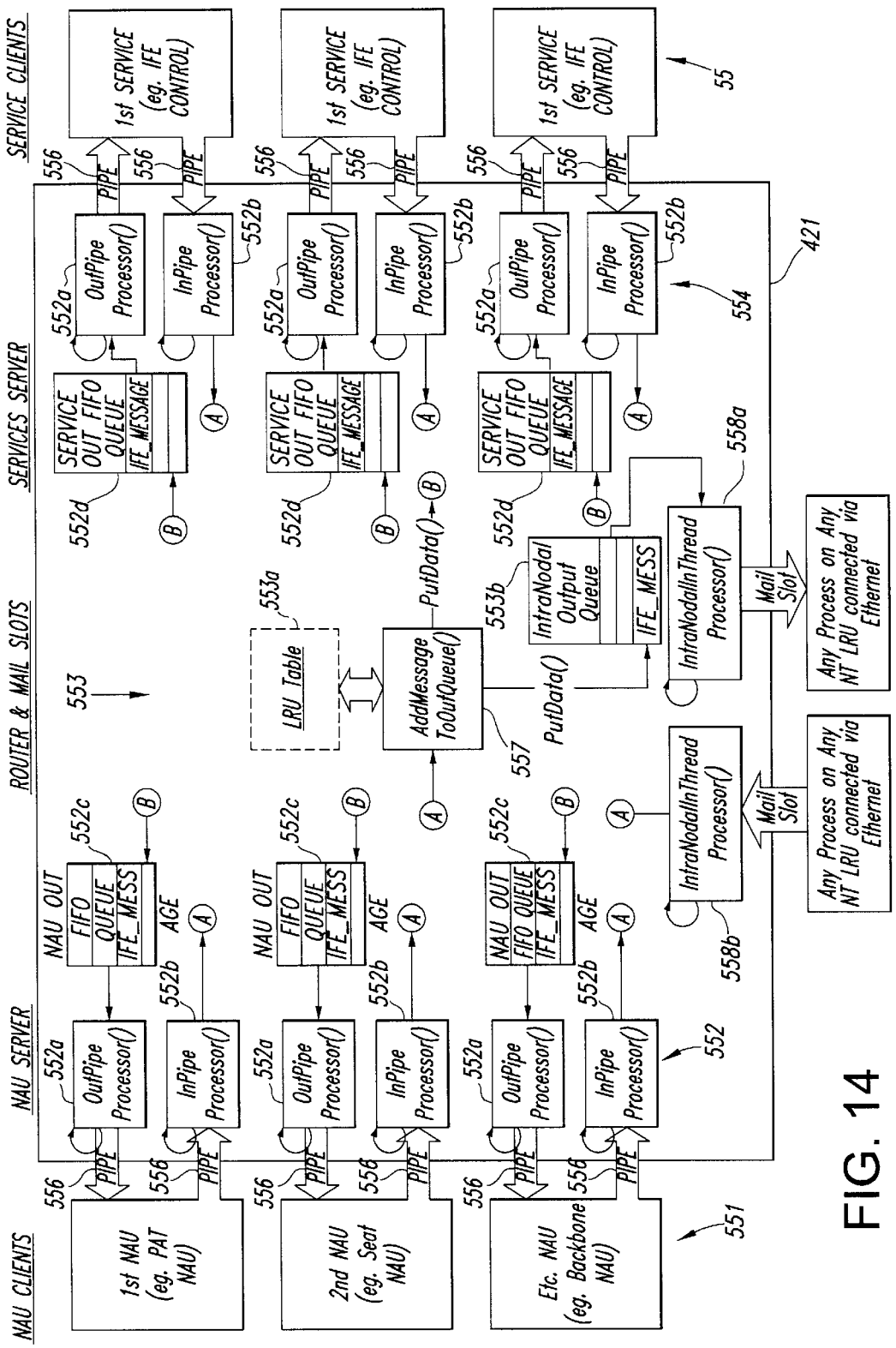
FIG. 14 illustrates transaction dispatcher function and data paths.

The transaction dispatcher 421 will now be discussed with reference to FIG. 14. The transaction dispatcher 421 comprises NAU Clients 551, a NAU Server 552, a Router and Mail Slots 553, a Services Server 554, and Service Clients 555. The NAU Server 552 comprises a plurality of OutPipeProcessors( ) 552a, a plurality of InPipeProcessors( ) 552b, and a plurality of NAU Out FIFO Queues 552c. A plurality of Name Pipes 556 couple the NAU Clients 551 to the InPipeProcessors( ) 552b and OutPipeProcessors( ) 552a and InPipeProcessors( ) 552b. The NAU Out FIFO Queues 552c are respectively coupled to the OutPipeProcessors( ) 552a. The Services Server 554 comprises a plurality of OutPipeProcessors( ) 552a, a plurality of InPipeProcessors( ) 552b, and a plurality of Service Out FIFO Queues 552d. The Service Out FIFO Queues 552d are respectively coupled to the to the OutPipeProcessors( ) 552a. A plurality of Name Pipes 556 couple the Service Clients 555 to the OutPipeProcessors( ) 552a and InPipeProcessors( ) 552b.

The Router and Mail Slots 553 comprises the LRU table 553a, which is coupled to an AddMessageToOutQueue( ) 557. The InPipeProcessors( ) 552b of the NAU Server 552 are coupled to the AddMessageToOutQueue( ) 557. Also, the InPipeProcessors( ) 552b of the Services Server 554 are coupled to the AddMessageToOutQueue( ) 557. The AddMessageToOutQueue( ) 557 is coupled by way of a IntraNodal Output Queue 553b to an IntraNodalOutThreadProcessor( ) 558a. The IntraNodalOutThreadProcessor( ) 558a is coupled to any process on any NT line replaceable unit connected by way of the Ethernet network 228. Similarly any process on any NT line replaceable unit connected by way of the Ethernet network 228 to an IntraNodalInThreadProcessor( ) 558b is coupled to the AddMessageToOutQueue( ) 557.

The primary duty of the Transaction Dispatcher 421 is to move information between the logical devices (or NAU clients 551) and the Application Services(or service clients 555). By using a Transaction Dispatcher 421, the NAUs and the Services do not have to control I/O traffic. In addition, the number of Named Pipes (or communication lines) between processes is greatly reduced because each Service and NAU need only communicate with one process, rather than each other. This simplifies the software design and efficiently uses a finite number of available Named Pipes.

To support this, the transaction dispatcher 421 includes the following sub-functions. Upon demand, the transaction dispatcher 421 creates two Named Pipes (input and output) for each NAU and Service, maintaining the lookup table 553a of pipe names (or handles) and their corresponding NAU or Service IDs.

The transaction dispatcher 421 uses Blocking I/O to await a message from any incoming Named Pipe. Once it receives an IFE-structured Message, it examines only the message destination (NAU or Service ID) portion of the message to identify the appropriate Named Pipe to use by cross-referencing the lookup table 553a. It then routes the complete message to an output queue 552c and 552d for that Named Pipe.

The transaction dispatcher 421 uses Mail Slots to send and receive messages from processes that are resident on remote Windows NT line replaceable units, routing them to the appropriate destination. Using this technique, any Service or NAU can communicate with any other Service, NAU or program on this line replaceable unit or any line replaceable unit that also runs a transaction dispatcher 421.

The detailed design of the transaction dispatcher 421 will now be discussed. FIG. 14 illustrates the transaction dispatcher function and data paths. TD.EXE is the transaction dispatcher 421 and is comprised of the following file:

TRNSCTND.CPP—the Main Program and Transaction-DispatcherClass

The Main( ) function of the transaction dispatcher 421 is responsible for initializing all its processing threads using CreateMainServiceThreads( ), CreateMainNAUThreads( ) and CreateMainIntraNodalThreads( ) functions. These threads operate continuously to move data from source to destination.

Main( ) also registers its existence with the system monitor program 412 (using Register( )) and waits for a shutdown signal from the system monitor 412, after which it performs an orderly shutdown of all its threads via its destructor. The relationships of the transaction dispatcher functions are shown in FIG. 14.

The term NAU Server means a set of routines that comprise a "Server" for the Network Addressable Unit processes. Two threads, NAUInThreadProcessor( ) and NAUOutThreadProcessor( ) are used to launch a set of I/O threads (InPipeProcessor( ) 552b and OutPipeProcessor( ) 552a) for an as yet unknown NAU process. The first message received from any NAU registers it to this set of threads, causing NAUInThreadProcessor( ) and NAUOutThreadProcessor( ) to launch another set, getting ready for the next NAU to speak. In this way, the transaction dispatcher 421 is dynamic and can support different NAUs as needed.

With regard to Incoming Messages, InPipeProcessor( ) 552b continuously receives an IFE Message from its Input Pipe and sends it to AddMessageToOutQueue( ) 557 which routes it to the appropriate output queue. With regard to Outgoing Messages, OutPipeProcessor( ) 552a continuously reads an IFE Message from the NAU Out Queue 552c and sends it to its associated NAU process via its named pipe 556.

The term Services Server 554 means the set of routines that comprise a "Server" for Cabin and Sales Services. Two threads, ServiceInThread( ) and ServiceOutThread( ) are used to launch a set of I/O threads (InPipeProcessor( ) 552b and OutPipeProcessor( ) 552a) for an as yet unknown Service process. The first message received from any Service registers it to this set of threads, causing ServiceInThread( ) and ServticeOutThread( ) to launch another set, getting ready for the next Service to speak. In this way, the transaction dispatcher 421 is dynamic and can support different Services as needed.

With regard to Incoming Messages, InPipeProcessor( ) 552b continuously receives a message from its Input Pipe and sends it to AddMessageToOutQueue( ) 557 which routes it to the desired output queue. As for Outgoing Messages, OutPipeProcessor( ) 552a continuously reads a message from the Service Out Queue 552d and sends it to its associated Service process via its named pipe.

The router 553 comprises routines that use the lookup table 553a to determine which processing thread needs to process the message. With regard to the From Any Source Router, upon demand, AddMessageToOutQueue( ) 557 calls the appropriate PutData( ) function to move the message to the NAU or Service output queue.

The LRU Lookup Table 553a is an internal memory structure that contains an entry for each device in the system 100. It contains sufficient information to translate message addresses for any piped destination. Specifically, it contains: Pipe Handle, Registeree, Queue Pointer, Queue Semaphore, and Thread Pointer. This information is kept in an SQL database table which is read during the Main( ) initialization via CreateLRUTable( ). Then as piped processes register with the transaction dispatcher 421, their identities are updated in this table 553a via AddQueueInfoToLookUpTable( ), AddThreadPointerToLookUpTable( ) and AddPipeHandleToLookUpTable( ) functions.

The term Intra Nodal Server means the set of routines that permit communications between two Windows NT line replaceable units connected via the Ethernet network 228. This differs from the Named Pipe communications in that a set of communication pipes is not created and maintained for each process. Instead, a single mail slot is maintained for incoming messages, and an appropriate outgoing mail slot is created for each outgoing message as needed.

With regard to Incoming Messages, IntraNodalInThreadProcessor( ) 558b continuously receives a message from its Mail Slot and sends it to AddMessageToOutQueue( ) 557, which routes the message to the appropriate destination. The destination may be an NAU, a Service or even back out to another process via a mail slot. With regard to Outgoing Messages, IntraNodalOutThreadProcessor( ) 558a continuously reads a message from its Out Queue and sends it to its associated process via the Mail Slot. This mail slot is created for just this message, and then is closed after the message is sent.

Figure 15:
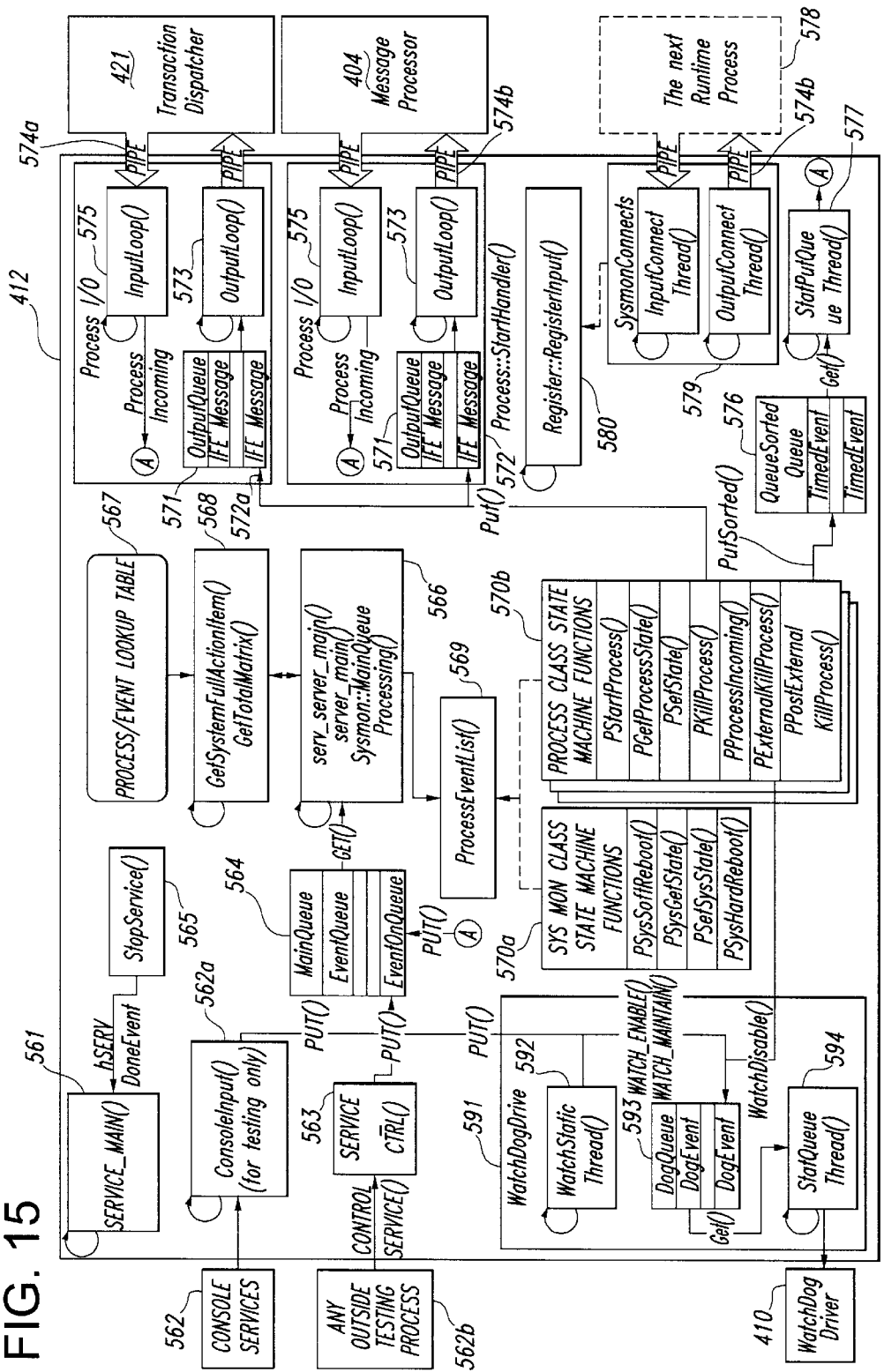
FIG. 15 illustrates system monitor function and data paths.

The System Monitor program 412 is automatically invoked by the operating system when the line replaceable unit boots. The system monitor function and data paths are shown in FIG. 15. The System Monitor program 412 comprises a service_main( ) 561 that is coupled to a StopServices( ) 565. The System Monitor program 412 is coupled to console services 562 by way of a ConsoleInput( ) 562a. Other outside testing processes 562b are coupled to a service cntrl( ) 563. A WatchDogDrive 591 along with the service_cntrl( ) 563 and the ConsoleInput( ) 562a are coupled to a MainQueue 564.

A Process/Event Lookup table 567 is coupled to a GetSystemFullActionItemn( ) 568 that interact with a serv__server__main( ) and server__main( ) 566. The MainQueue 564 is coupled to the server__main( ) 566. The MainQueue 564 is coupled to a ProcessEventList( ) 569. The ProcessEventList( ) 569 is driven by a plurality of Sysmon Class and Process Class State Machine Functions 570a, 570b. Output of the Process Class State Machine Functions 570b are coupled to OutputQueues 571 of various Process and Process I/O functions 572, 572a. The Process and Process I/O functions 572, 572a are coupled by way of OutputLoop( ) 573 and Name Pipes 574 to the transaction dispatcher 421 and message processor 404. The transaction dispatcher 421 and message processor 404 are coupled by way of Name Pipes 574 to respective InputLoop( ) 575. The respective InputLoop( ) 575 are coupled to the MainQueue 564.

Sorted functions of the Process Class State Machine Functions 570b are coupled by way of a QueueSorted Queue 576 and a StatPutQueueThread( ) 577 to the MainQueue 564. Additional runtime processes 578 are also coupled by way of Name Pipes 574 to SysmonConnectThreads( ) 579. The SysmonConnectThreads( ) 579 are coupled by way of a Register::RegisterInput( ) 580 to the Process functions 572.

A WatchDogDrive 591 is provided that comprises a WatchStaticThread 592, a DogQueue 593 and a StatQueueThread 594. The WatchStaticThread 592 outputs to the DogQueue 593 and a PExternalKillProcess( ) from the Process Class State Machine Functions 570b are coupled to the DogQueue 593. The DogQueue 593 outputs to the StatQueueThread 594 which in turn drives the WatchDog Driver 410.

The System Monitor program 412 operates in the background during the life of the control center applications and has the following four basic duties:

Start-Up The Start-up function starts the Executive and Application programs after any system boot.

Shutdown The Shutdown function provides an orderly shutdown, flushing working data from memory to hard disk as appropriate. Then it terminates the execution of the Executive and Application programs.

Power Down This function works in conjunction with the Uninterruptable Power Supply (UPS) 400 which is connected via one of the serial ports on each of the Control Center LRUs. The operating system is notified by the UPS when power has been lost, causing it to start this function (POWERDWN.EXE, POWERDWN.CPP). The Power Down program notifies the System Monitor that power has been lost to invoke an orderly shutdown using a 'ProcessStop' IFE Message. POWERDWN.EXE is listed in the NT Register as the program to start when power failure is detected.

Restart The Restart function scans for failed Executive and Application programs, and restarts them.

The detailed design of The System Monitor 412 will now be discussed. SYSMON.EXE includes the following primary components:

SYSMON.CPP The Main( ) Program and Sysmon Class

DLYSCHDL.CPP The DelayScheduler Class

PROCESS.CPP The Process Class to manage the external programs

QUEESORT.CPP The QueueSort Class—Used to manage sorted queues

RGSTRBJC.CPP The Register Class used to register external processes

SMSCRIPT.CPP The SysmonScript Class to manage the state tables

SYSGLOBA.CPP Global routines to map to state-machine functions

SYSMNCNN.CPP The SysmonConnect Class used to communicate externally

SYSMNSPC.CPP SysmonSpecial Class

UTL150.CPP RandomPack and Liner Classes plus other utilities

WTCHDGDR.CPP The WatchDogDrive Class

Referring to FIG. 15, the System Monitor 412 is a Windows NT Service Process, which means it runs in the background and is controlled by the following functions in the Win32 SDK Library: StartServiceCtrlDispatcher( ), ControlService( ), Handler( ), RegisterSreviceCtrlHandler( ), and ServiceMain( ).

The System Monitor 412 was designed as a state machine, but, it's actual code is more of an in-line design with state flags used to keep track of processing. For example, a single function calls another function which calls yet another function, and all three are only used once. For clarity, these are grouped together herein.

The main( ) function updates its revision history information in the Windows NT Register, determines where to find the other programs to be started, launches itself as a Windows Service by connecting to the Windows Service Control Manager via StartServiceCtrlDispatcher( ), identifying service_main( ) 561 as the main function for this service. The main( ) function is identified in advance of runtime during software installation, which calls the NT CreateService( ) to set up the System Monitor 412 as a Windows NT Service. Main( )also alters its behavior depending on whether a console service 562 (i.e., a display monitor) is available for testing. Main( )uses SetConsoleCtrlHandler( ) to allow someone to abort the programs by pressing Ctrl-C at any time.

Service_main( ) 561 is the main program that continually runs when the system monitor service is running. It calls RegisterServiceCtrlHandler( ) to identify service_ctrl( ) 563 to NT as the function to execute when other outside programs want to alter the execution of this service. It maintains a combination state-checkpoint to identify to the outside world (i.e., test programs) what it is doing:

| State | Check-point(s) | Service Control Code to get there |
|---|---|---|
| SERVICE_START_PENDING | 1, 2 | (none) |
| SERVICE_RUNNING | 0 | Service_Control_Continue |
| SERVICE_PAUSED | 0 | Service_Control_Pause |
| SERVICE_STOP_PENDING | 0, 1 | Service_Control_Stop |
| SERVICE_STOPPED | 0 | (none) |

When service_main( ) 561 starts, it is in SERVICE_START_PENDING state, checkpoint #1. If it successfully creates all its event handles, it moves to checkpoint #2. It then sets up a Security Descriptor and launches a serv_server_main( ) thread, moving its state to SERVICE_RUNNING.

The outside world can alter its state by calling service_ctrl( ) 563 and providing a Service Control Code. The table above shows which state service_main( ) 561 moves to based on the control code received. If the SERVICE_STOPPED state is reached, a hServDoneEvent is triggered, causing this function to exit, terminating the System Monitor 412.

The service_ctrl( ) 563 routine is called via an NT Service utility ControlService( ) by any outside program that wishes to control the System Monitor service in some way. Service_ctrl( ) 563 uses a MainQueue 564 to issue commands to various Process Class objects that are running.

The server_main( ) 566 routine creates the Sysmon object MainSysmon and executes its Sysmon::StartHandler( ) to get the other processes running. If running in test mode, server_main( ) 566 is called directly by main( ). If running in runtime mode, server_main( ) is called by serv_server_main( ) 566 which is a thread launched by service_main( ) 561 (the main program initiated by the Windows NT Service Manager). Finally, server_main( ) 566 calls Sysmon::MainQueueProcessing( ) which loops until it is time to shutdown. Once MainQueueProcessing( ) returns, this thread ends.

The stopService( ) function 565 can be used by any thread to report an error and stop the Sysmon Service. It logs the reason that it was called via ReportEvent( ), and tells service_main( ) to abort via hServDoneEvent. Derived from Process, the Sysmon Class contains all the software needed to drive all the Process Class state machines. It uses MainQueue 564 as its primary input.

Sysmon::StartHandler( ) is responsible for launching all the external programs and providing a means to monitor them. First, it compiles the file SYSMON.ASC. Then, it queries the NT Registry to determine which type of line replaceable unit it is running on (PAT, CFS or test unit) to know which processes to initiate. It creates a SmScript object to establish system-level state machine tables using SmScript::InitiateTables( ). It sets up communications with the UPS 400 via a communication port, and determines whether the UPS 400 is working, whether the line replaceable unit has power and whether it should continue processing as a result. Finally, it creates the following objects and runs a starter function for each of them:

| Object | Class | Starter Function |
|---|---|---|
| ConnectTask | SysmonConnects | StartHandleConn( ) |
| MyWatchDog | WatchDogDriver | StartHandler( ) |
| ProcessItem[i] (one for each process for this LRU) | Process | Initialize( ) (StartHandler( ) is called later, after Process Registration) |
| SelfHeartBeatTask | SysmonSpecial | StartHandlerSpecial( ) |

-continued

| Object | Class | Starter Function |
|---|---|---|
| SelfMonitorTask | SysmonSpecial | StartHandlerSpecial( ) |
| DelayTask | DelayScheduler | StartHandlerDelay( ) |
| QueueSorted | QueueSort | None, used to schedule events (i.e., Process::PPostExternalKillProcess( )) |

It creates an EventOnQueue object with an UpSystem event in it and places it in the MainQueue queue 564 to start the external processes (beginning with the Transaction Dispatcher 421). Finally, it calls Sysmon::MainQueueProcessing( ) which loops forever, using Sysmon::MainProcess( ) to handle all processing requests which get placed on the MainQueue queue by this and the other classes' threads.

The basic flow of startup events is:
UpSystem Event from Sysmon::StartHandler start Transaction Dispatcher
Registration received from Transaction Dispatcher start Message Processor
Registration received from Message Processor start Service
Registration received from Service start NAUs
In this way, the system comes up in a sequential, orderly fashion.

MainQueueProcessing( ) loops forever waiting for Events to appear on the MainQueue queue. Once found, it calls MainProcess( ) which uses the information from the EventOnQueue object to lookup the 'real' action(s) to perform using the SmScript::GetSystemFullActionItem( ) and Process::GetTotalMatrix( ) functions. It processes these actions using Sysmon::ProcessEventList( ) 569.

ProcessEventList( ) 569 is only called by MainProcess( ) to look up and process the desired actions from a table of actions, which are maintained in the SmScript Class.

The above processes loosely form a state machine. In fact, a series of flags denoting the state of the Sysmon system is used to decide what to do next. The following routines are used to support this state machine. There is only one system level Action List to do:
UpSystem[ ] or UpPAT[ ]. They each have several Actions which point to SYSGLOBAL functions. These functions in turn determine whether they should call a Process class function or a Sysmon class function. The Sysmon Class functions are:
PSysSoftReboot( ) Calls softboot( ) which uses the ExitWindowsEx( ) command to reboot the LRU. Called via the global PSoftReboot( ) function.
PSysHardReboot( ) Reboot via WatchDogDriver::Watch_Reboot( ) which causes the hardware to reset. Called via the global PHardReboot( ) function.
PSysGetState( ) Retrieves the state of the system state machine. Called via the global PGetProcessState( ) function. This is not used: The variable 'selfstate' is used directly.
PSetSysState( ) Sets the state of the system state machine, which is used in GetSystemFullActionItem( ) along with the current event to know what action to do to the system. Generally called via the global PSetState( ) function.
The SysmonConnects class contains code necessary to communicate to the other processes in the line replaceable unit, for example the Transaction Dispatcher 421. It establishes a Named Pipe set to communicate with each of them. It works very closely with the RegisterObject Class to provide pipes to each of the Process Class handlers. This method of creating a generic Named Pipe set and assigning it to the first process to register was taken from the Transaction Dispatcher 421, however, because this program directs which external process is executed, and therefore which one is registered.

The StartHandlerConn( ) routine simply launches two threads, one for Named Pipe Input and one for Named Pipe Output.

InputConnectThread( ) is launched by StartHandlerConn( ). It calls DynInput( ) which loops forever, opening a Named Pipe for input, then waiting for an outside process to connect to it. It then creates a temporary RegisterObject class object to tie this Named Pipe to the connecting outside process, and loops to create another named pipe.

OutputConnectThread( ) is launched by StartHandlerConn( ). It calls DynOutput( ) which loops forever, opening a Named Pipe 574 for output, then waiting for an outside process to connect to it. It then creates a temporary RegisterObject class object to tie this Named Pipe to the connecting outside process, and loops to create another named pipe.

When the DynInput( ) and DynOutput( ) routines of SysmonConnect receive input from an outside process to claim a Named Pipe, they create a temporary RegisterObject class object to receive Registration information from the calling process and tie the current Named Pipe to the Sysmon Process object associated with that process. In this way, each Process object has its own set of I/O to its corresponding external process.

This launches RegisterInput( ) as a new thread. It is called by both SysmonConnects::DynInput( ) and DynOutput( ). The RegisterInput( ) code calls DynRegisterInput( ) and kills itself and its SELF (its own object) when DynRegisterInput( ) is done. The DynRegisterInput( ) routine tries to read from the Named Pipe to get a Registration message from the outside process. It attempts this 100 times before it gives up and exits. If successful, it calls Process::StartHandler( ) to get its Input or Output thread started with this Named Pipe.

The SmScript Class contains the tables of events and actions that are used to move each Process object state machine from one state to the next. FullActionItem arrays read like pseudo code, each entry containing the following set of information: Function-Name, Process ID, Additional Data for the named Function. Thus, for example, "{PHardReboot,systemflag, 150}" means to run global function PHardReboot(150), which in turn runs the system function Sysmon::PSysHardReboot(150).

The InitiateTables( ) routine is called once per power-up to prepare the event/action table SysMatrix as appropriate for the runtime LRU system monitor. It fills this array with a pointer to the UpSystem or UpPAT FullActionList array.

The InitProcess( ) routine is called by Process::Initialize( ) for each process object created to complete the tables for the Process to use. It moves the appropriate event/actions into this Process object's TotalMatrix array. This permits the use only one System Monitor executable program, even though its specific duties vary from line replaceable unit to line replaceable unit. For example, the primary access terminal LRU does not have the Service process and the File Server LRU does not have the primary access terminal NAU process.

The GetSystemFullActionItem( ) routine returns the appropriate value from the SysMatrix table. The is used only in Sysmon::MainProcess( ).

The Process Class Initialize( ) initializes the TotalMatrix table via SmScript::InitProcess( ).

The Process Class StartHandler( ) is called by RegisterObject::DynRegisterInput( ) after an external process has successfully registered with Sysmon. It calls StartInputThread( ) or StartOutputThread( ) depending on the Named Pipe which was registered.

StartInputThread( ) is called by StartHandler( ) and simply launches a new thread, InputLoop( ). InputLoop( ) in turn simply calls DynInputLoop( ) for this process. DynInputLoop( ) continuously loops, collecting any IFE Message from its Named Pipe (using the IFE_Message::GetData( ) function), and processing it using ProcessIncoming( ). Errors are reported using ProblemReport( ) and the MainQueue is updated to control either a shutdown or retry, depending on the severity of the error. If it's error is severe enough, it exits the loop and the thread dies.

StartOutputThread( ) is called by StartHandler( ) and simply launches a new thread, OutputLoop( ). OutputLoop( ) in turn calls DynOutputLoop( ) for this process. DynOutputLoop( ) continuously loops, collecting any IFE Message from its OutputQueue and sending it out its Named Pipe (using the IFE_Message::PutData( ) function). Errors are reported using ProblemReport( ) and the MainQueue is updated to control either a shutdown or retry, depending on the severity of the error. If it's error is severe enough, it exits the loop and the thread dies.

GetTotalMatrix( )returns the corresponding Action List from TotalMatrix for the current event and state of this process. It is called only by Sysmon::MainProcess( ).

The following State Machine routines are stored in the SmScript State Machine Tables (called FullActionItems) and are activated as a result of certain event/state combinations via ProcessEventList( ):

PExternalKillProcess( ) Kills its associated external process with the TerminateProcess( ) function. Called from the global PExternalKillProcess( ) function.

PGetProcessState( ) Returns the current state of this state-machine. Called from global PGetProcessState( ).

PKillProcess( ) Issues IFE message to external process to commit suicide. Currently not supported by most external processes. Called from global PKillProcess( ).

PPostExternalKillProcess( ) Uses the QueueSorted::PutSorted( ) function to schedule a Kill command to go into the MainQueue later. Called from global PPostExternalKillProcess( ).

PSetState( ) Updates the current state of this state-machine. Called from global PSetState( ).

PStartProcess( ) Gets the full pathname of the associated external process and starts executing it. Called from global PStartProcess( ).

The WatchDogDriver class contains code necessary to manage watchdog driver messages. The watchdog is a hardware component that is responsible for re-starting the line replaceable unit if it fails to receive input in regular intervals. Using this class ensures that the watchdog receives that input from the System Monitor 412 regularly, unless some system or software error prevents it. Commands available for use by Sysmon and Process objects are: Watch_Enable( ), Watch_Disable( ), Watch_Maintain( ) and Watch_Reboot( ). These functions all put the corresponding watchdog action command onto a DogQueue 593 for processing by DynQueueThread( ), which is the only function allowed to actually talk to the driver directly.

The Watchdog Driver 410 controls a watchdog device supplied by Octagon (called the Octagon PC-450) which, when activated by the System Monitor 412, reboots the system unless it is accessed no less than every 1.6 seconds by the watchdog driver 410. The driver 410 can receive a command to force a reboot of the system, which stops it from updating the watchdog driver 410. The watchdog driver 410 then times-out and a reboot occurs. Use of the watchdog driver 410 helps improve system availability in the event of a software or hardware anomaly that causes unpredictable results in system operation. Sysmon::StartHandler( ) creates the WatchDogDriver object and calls its StartHandler( ) routine, which is responsible for launching two threads. One thread manages the I/O with the watchdog hardware, and the other thread maintains the regular output commands to it.

WatchStaticThread( ) calls WatchDynamicThread( ) which places a request for a 'strobe' to the watchdog onto the DogQueue 593 (via Watch_Maintain( )). It then sleeps for 1,000 seconds and loops again.

StatQueueThread( ) calls DynQueueThread( ) which performs the actual output to the watchdog hardware, "\wdog". It reads a command request from the DogQueue queue 593 and calls either Watch_Enable_DO( ), Watch_Disable_DO( ), Watch_Maintain_DO( ) or Watch_Reboot_DO( ) to perform the requested command using the Windows DeviceIoControl( ) function.

The QueueSorted Class coordinates activity in the MainQueue 564. For example, it is sometimes necessary to schedule tasks to occur in the future (such as shutdown due to loss of power). To do this, QueueSorted provides the following functions. The QueueSorted( ) constructor creates its own queue and launches a thread, StatPutQueueThread( ) to monitor the queue periodically. The PutSorted( ) function allows users to add elements to the queue along with a timestamp indicating the time at which this element should be dealt with. The PutSorted( ) function puts them on the queue sorted by the timestamp so that they are dealt with in the proper order.

StatPutQueueThread( ) calls DynPutQueueThread( ) which loops forever, trying to process the elements on its queue. If the current time is less than or equal to the time of the element's timestamp, the element is moved to the MainQueue for processing by Sysmon::MainQueueProcessing( ). Even though it is scheduled, it is only placed at the end of MainQueue 564, not at the front. Therefore, it does not supercede any existing MainQueue elements.

The following common software libraries of functions and utilities are used throughout the primary access terminal 225 and cabin file server 268 applications.

Figure 16:
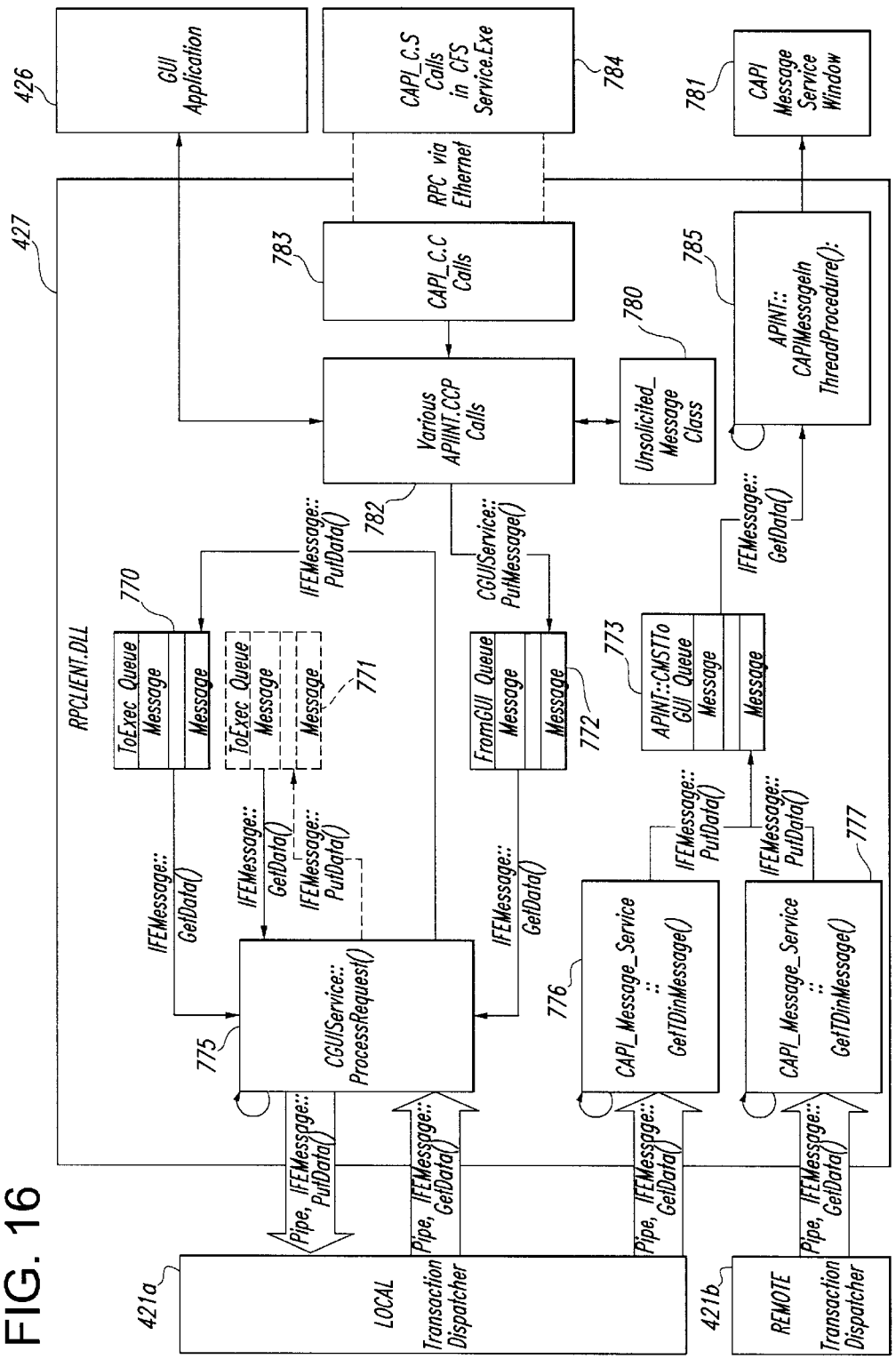
FIG. 16 illustrates primary access terminal RPC client-.DLL function and data paths

The CAPI (RPC Client) Library 427, or RPCLIENT.DLL 427, provides a means of communication between the graphical user interface 426 and the rest of the system 100 through the primary access terminal NAU 409. The RPC Client Library 427 is shown in FIG. 16. The RPC Client Library 427, or RPCLIENT.DLL 427, comprises a ToExec Queue 770, a FromExec Queue 771, a FromGUI Queue 772, and an APIINT::CMSToGui Queue 773. The ToExec Queue 770 and FromExec Queue 771 are coupled to transmit and receive CGUIService::ProcessRequest( ) threads 775. The FromGUI Queue 772 is coupled to transmit various API-INT.CCP calls 782 to the CGUIService::ProcessRequest( ) threads 775. The APIINT.CCP calls 782 are derived from CAPI_C.C Calls 783 that are routed by way of the Ethernet network 228 from CAPI_S.C calls 784 in the Services.exe program 477 running in the cabin file server 268. The CGUIService::ProcessRequest( ) threads 775 route messages to and from a local transaction dispatcher 421a. The APIINT::CMSToGui Queue 773 receives messages from the local transaction dispatcher 421a and from a remote transaction dispatcher 421b. Messages sent from the transaction dispatchers 421a, 421b, are forwarded to an APIINT::CAPIMessageInThreadProcedure( ): 785 which routes the messages to the CAPI Message Service Window 781.

The PAT GUI 426 cannot be communicated to via Named Pipes because it is a Windows application, and must therefore communicate using standard Windows messages. The CAPI Message Handler is a set of routines within the CAPI Library 427 which provides a bridge between the IFE messages and the GUI Windows application. Instead of communicating via Named Pipes directly with the GUI, Unsolicited Messages 780 utilize Named Pipes into a Message Service Window 781. In order for the GUI 426 to be able to receive them, it must have already opened or started a Window capable of receiving this type of message in the background using the appropriate CAPI Library calls.

Any Windows User Interface that needs to communicate with the transaction dispatcher(s) 421 of the primary access terminal 225 and/or cabin file server 268, or who needs to access the CAPI calls in the SERVICE.EXE program of the cabin file server 268 needs to link in and use the RPCLIENT.DLL library 427 which contains the following files:

APIINT.CPP Dllmain( ) and Visual Basic Application Interface Routines
CAPI_C.C The CAPI's RPC Client Support Routines
HOOKSDLL.C 'Canned' Dynamic Link Library 'glue' from Microsoft
CGUSRVCE.CPP Core Gui (CGUIService) Class (connects to TD)
CPMSSGSR.CPP CAPI_Message_Service Class
UNSLCTDM.CPP Unsolicited_Message Class APPIINT.CPP is the interface between the graphical user interface 426 (GUI or Main Application) and the rest of the system 100. In order to connect to the rest of the system 100, InihalizeInterfaceVB( ) must be called to establish communications with the transaction dispatcher(s) 421 and start CAPI_Messag_Service::GetTDInMessage( ) threads, which receive all unsolicited messages from the transaction dispatcher(s) 421.

A call to StartMessageServiceVB( ) launches a thread, CAPIMessageInThreadProcedure( ) to continuously read and process unsolicited messages obtained from the CMSToGui Queue, supported by the CAPI_Message_Service class object.

The cabin file server 268 and the primary access terminal 225 have many similar functions such as message processors 404 and 452, transaction dispatchers 421 and 473, system monitors 412 and 454, and ARCNET drivers 412 and 450. The discussion of these functions in conjunction with the primary access terminal 225 presented above also applies to the cabin file server 268 with differences as noted. The cabin file server executive extension is discussed with reference to FIG. 10.

The cabin file server Executive Extension set of routines together with the Common Executive Software forms the generic application for the cabin file server 268. It includes the following components: Backbone NAU 463, Seat NAU 465, VCP NAU 462, Test Port NAU 461, High-Speed Download Driver 449, Services 477 including Cabin Services 478–482, 487–490 and Sales Services 483–486, CAPI calls 476, and the database 493, as shown in FIG. 10. The function and data paths of the many of the NAUs 461–465 have a structure substantially identical to the primary access terminal 225 structure shown and described with reference to FIG. 10 regarding the basic network addressable units function and data paths. The changes generally relate to the structure of the state machine objects that are used in the respective NAUs 461–465.

Figure 17:
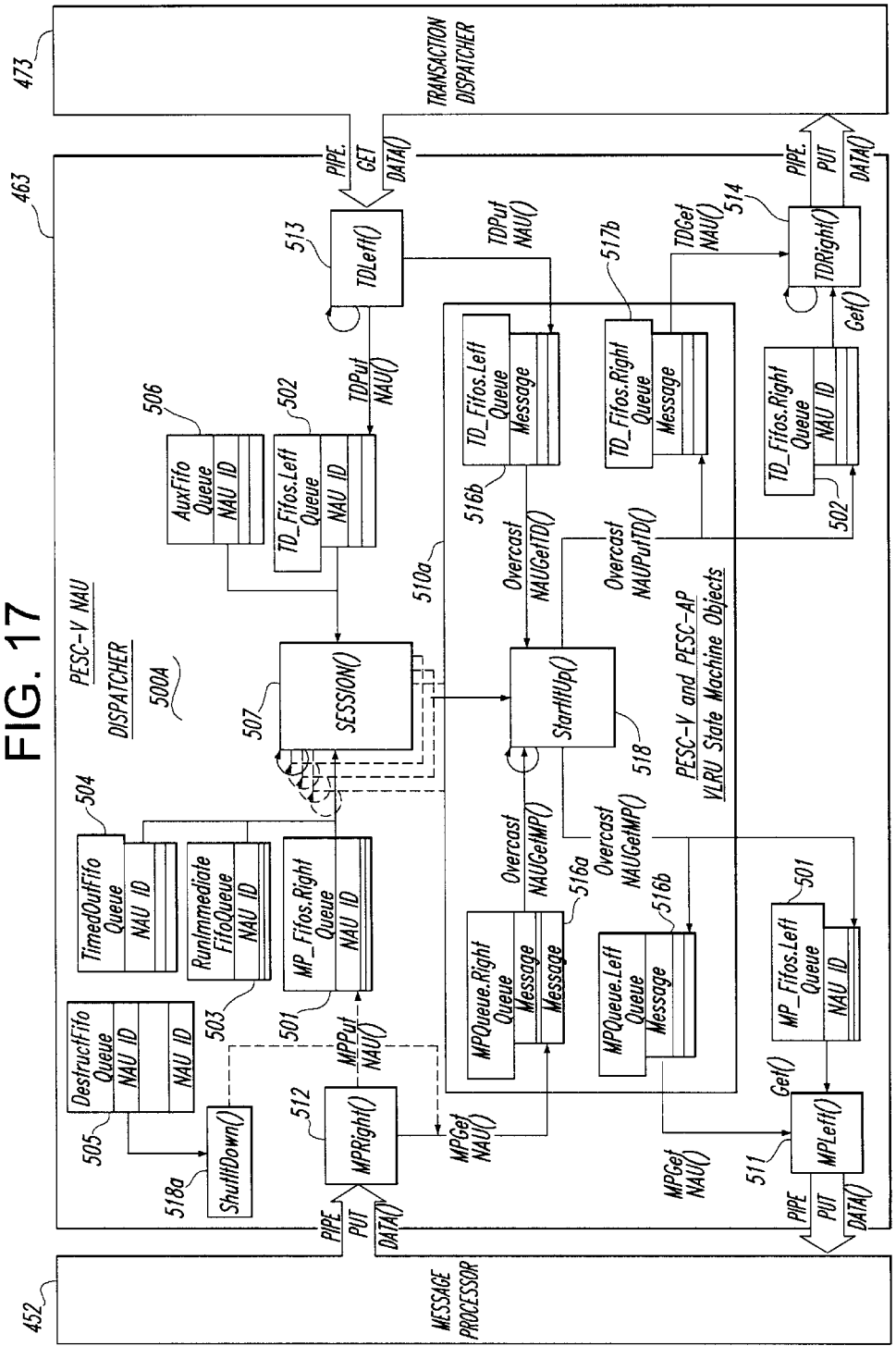
FIG. 17 illustrates backbone network addressable unit function and data paths.

The detailed design of the cabin file server executive extension will now be discussed. The BACKBONE.EXE routine contains the backbone NAU program 463. FIG. 17 illustrates the backbone NAU program 463 function and data paths. The backbone NAU 463 is responsible for receiving and processing messages that originate from the audio-video units 231, area distribution boxes 217, passenger entertainment system controllers PESC-A 224a and the PESC-V 224b, and any other communications backbone line replaceable unit. The structure of the backbone NAU 463 is substantially the same as the network addressable unit 409 function in the primary access terminal 225 and data paths discussed with reference to FIG. 13. The backbone NAU 463 comprises a PESC-V NAU dispatcher 500a and PESC-V and PESC-AP VLRU state machine objects 510a shown in FIG. 17. The backbone NAU program 463 includes the following primary components:

BACKBONE.CPP The Main( ) Program
PSCPDSPT.CPP The NAU Dispatcher for the PESC-A
PSCVDSPT.CPP The NAU Dispatcher for the PESC-V
PSCPVLRU.CPP The VLRU Class for the PESC-A
PSCVVLRU.CPP The VLRU Class for the PESC-V The Main( ) program is a standard NAU starter that registers the Backbone NAU 463 with the system monitor 454 using a SysMonInterfaceClass::Register( ) routine.

The Main( ) program launches a PescV_Dispatch object to open up PESC-V VLRU communications between the message processor 452 and the transaction dispatcher 473, and a PescAp_Dispatch object as well to launch the PESC-A 224a. It calls PescV_Dispatch::startItUp( ) to initialize both of the VLRUs.

The Main( ) program launches 14 Session( ) threads, although only three are actually in use. It sends a SubProcessStart command to the VLRUs which causes the first Session( ) threads in to connect to each VLRU permanently. Only the PescV_Dispatch object maintains a set of MPRight( ), MPLeft( ), TDRight( ) and TDLeft( ) threads.

Finally, the Main( ) program sleeps forever until interrupted. It does not call shutItDown( ) to close all the VLRUs down and exit gracefully. Instead, it simply deletes the PescV_Dispatch object and dies.

The VLRUs in this NAU contain their own set of NAUPutTD( ), NAUPutMP( ), NAUGetTD( ) and NAUGetMP( ) routines because they use I/O routines from the PESCA_Message class and PESCV_Message class instead of the IFE_Message class.

The PescAp_VLRU object attaches directly to the first Session( ) possible via its StartItUp( ) function. Then it continuously loops waiting for data to appear in its message processor and transaction dispatcher input queues. It processes the following commands:

FlightInfoRequest IFE Function from the PESC-A 224a. This VLRU creates its own IFE message to the IFE Control Service asking for Flight Information.

FlightInfoUpdate IFE Function from the IFE Control Service, after the PESC-A 224a issues it a FlightInfoRequest. This VLRU creates its own IFE message to forward this to the PESC-A 224a via the message processor 452.

PES_CONTROL command from the PESC-A 224a. This VLRU examines the state of the WeightOnWheels using PESCA_Message::IsGearCompressed( ). If the state of the wheels has changed, it forwards this new information to the database using NotifyNewFightState( ), and to the CAPI Message Service via its own NAUPutTD( ). All other messages are ignored.

The PescV_VLRU object attaches directly to the first Session( ) possible via its StartItUp( ) function. Then, it continuously loops waiting for data to appear in its message processor 452 and transaction dispatcher 473 input queues. It processes the following commands:

VideoControl command from IFE Control Services is formatted and forwarded to PESC-V 224b. Any other message from PESC-V 224b is routed directly to the IFE Control Services.

Figure 18:
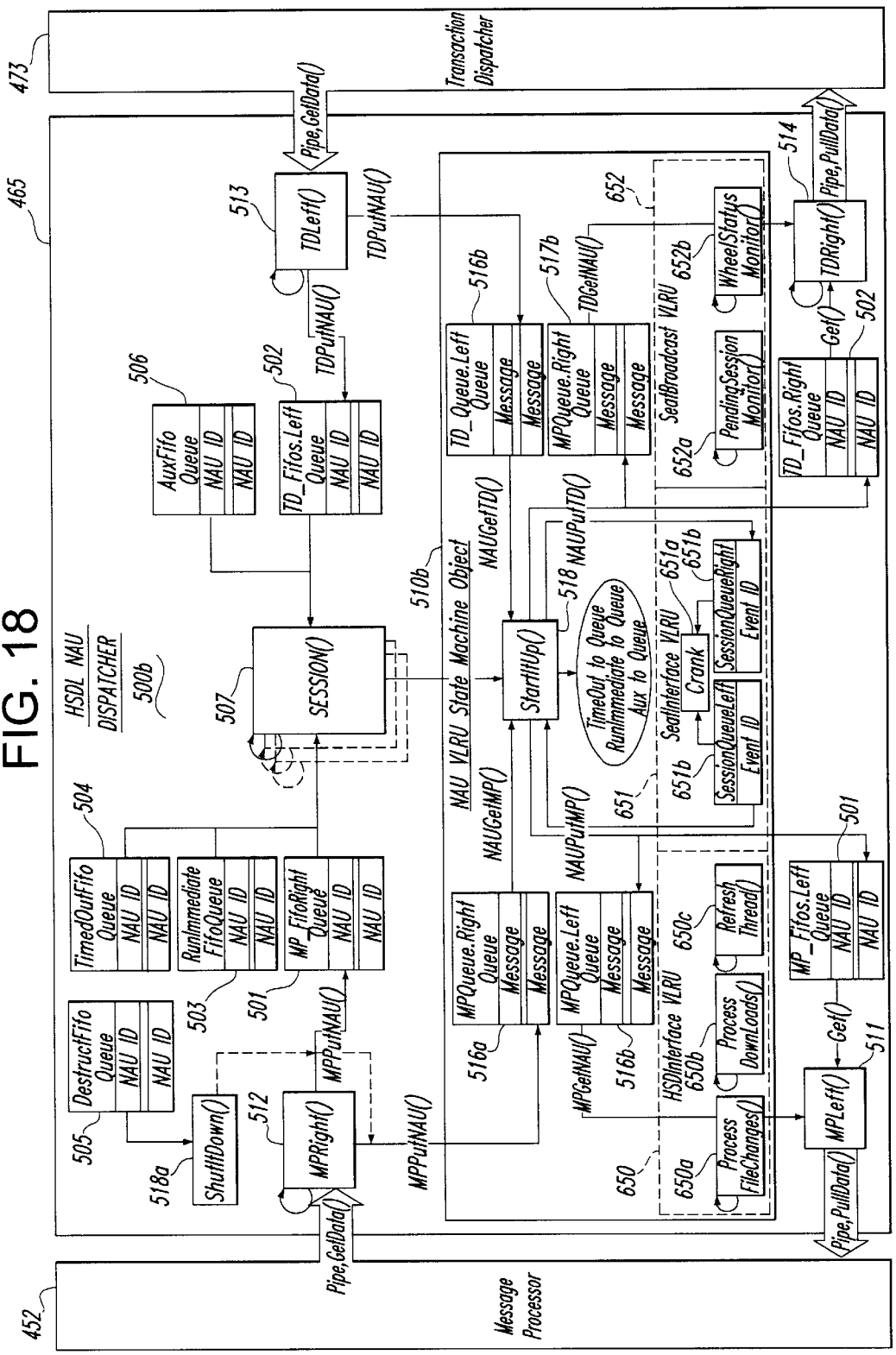
FIG. 18 illustrates seat network addressable unit function and data paths.

The Seat NAU program 465 function and data paths are depicted in FIG. 18. The Seat NAU 465 controls communication with the seats in the aircraft 111. It maintains three kinds of VLRUs: one that controls high speed download of games and programs to the seats 123; one that periodically broadcasts status messages to the seats 123, and one for each seat 123 to communicate during the flight for sales and other requests.

The structure of the Seat NAU 465 is substantially the same as the Network Addressable Units function and data paths discussed with reference to FIG. 13. However, the Seat NAU 465 also includes VLRU state machine objects 510b comprising an HSDLInterface VLRU 650, a SeatInterface VLRU 651, and a SeatBroadcast VLRU 652.

The HSDLInterface VLRU 650 comprises a ProcessFileChanges( ) 650a, ProcessDownloads( ) 650b, and a RefreshThread( ) 650c. The SeatInterface VLRU 651 comprises a Crank( ) 651a, a SessionQueueLeft 651b, and a SessionQueueRight 651c. The SeatBroadcast VLRU 652 comprises a PendingSessionMonitor( ) 652a and a WheelStatusMonitor( ) 652b.

SEAT.EXE contains the Seat NAU program 465. This program includes the following primary components:

NAUMAIN.CPP The Main( ) Program
HSDLDSPT.CPP The High Speed Download NAU Dispatcher
STDSPTCH.CPP The Seat NAU Dispatcher
STNTRFCE.CPP The Seat-VLRU Class
SESSION.CPP The Service Session Class
STBRDCST.CPP The Seat Broadcast VLRU Class
HSDLNTRF.CPP The HSDL VLRU Class
DWNLDFLN.CPP For HSDL, the DownLoadFileInfo Class
FILEMAP.CPP For HSDL, The FileMap Class A VLRU Session is characterized by the NAU::Session( ) threads, one for each VLRU that may be active concurrently. A Service Session is characterized by the Session class that controls a stream of communications between a single seat and a Service (such as a Sales Service). This stream may include several messages back and forth before a Service Session is complete.

The Main Program is a standard NAU starter. Main( ) registers this program with the System Monitor 454 using the SysMonInterfaceClass::Register( ) routine. For test purposes only, if any parameter is passed to this program, it bypasses this step.

The Main Program creates a HDSLDispatch object to open up communications between the message processor 452 and the transaction dispatcher 473 and create the High Speed Download VLRU 650. Then the Main Program creates the SeatDispatch object to create all the SeatInterface VLRUs 651 and the SeatBroadcaster VLRU 652. The Main Program launches 14 Session( ) threads 507 that are shared by all the VLRUs. A typical number of Sessions is 14 including 10 seats' Service Sessions, plus HSDL, plus Broadcast, plus two more to control seats that are waiting for a Service Session to free up (pending seats). The Main Program calls NAUDispatch::startItUp( ) 518 to initialize the VLRUs with a SubProcessStart command.

The HSDLDispatch file defines a MPRightHook( ) function to be called within the NAUDispatch:MPRight( ) thread prior to processing the incoming message from the message processor 452. It uses this hook function to intercept the High Speed Download Request messages and route them to the HSDL VLRU 650 instead of to the Seat VLRU 651, where its LRU address would normally send it. This reduces traffic to the 10 Sessions( ) 507 reserved for the seats.

Finally, Main( ) sleeps forever until interrupted. It does not call shutItDown( ) to close all the VLRUs down and exit gracefully. Instead, it simply deletes the NAU Dispatch and dies.

The SeatInterface VLRU 651 is responsible for processing requests from the seats 123 such as ordering a movie or a game. It routes these requests to the applicable Service via the Transaction Dispatcher 473. One VLRU for each seat 123 in the system exists; however, only 10 VLRUs at a time may actively be engaged in a communication session between seat 123 and Service.

Each SeatInterface VLRU 651 has a Session object that it uses as its state machine. Its StartItUp( ) function loops continuously as long as it is actively engaged within a session (that is, the session state is not idle), looking for one of the following events: Data from the message processor 452, Data from the transaction dispatcher 473, an NAU TIMEOUT, an NAU RUN IMMEDIATE, a NAU AUX, a SessionQueue.Right or SessionQueue.Left events. It passes any TD messages on to the seat display unit 122 provided they do not affect the State of the VLRU. StartItUp( ) then calls Session::Crank( ) to process one event from the SessionQueue.Right queue. Once it has been processed, StartItUp( ) forwards any message that may be waiting in SessionQueue.Left (sending it out to the message processor 452 or transaction dispatcher 473), then determines what to do with the input event that got it going (from the message processor 452, transaction dispatcher 473, Timeout etc.). Usually, it simply puts it in SessionQueue.Right, which re-triggers StartItUp( ) to again call Session::Crank( ) until all events and/or messages are processed. Once the processing is complete for this VLRU's Session, StartItUp( ) exits, to give the session thread to another seat. It uses MessageToEvent( ) to convert a Seat_Message into its corresponding Event value, and it uses EventToMessage( ) to develop an appropriate outgoing message based on the current VLRU Event.

StartItUp( ) also processes the following control messages:

| IFE Message | Action |
|---|---|
| StartStatisticsCapture | Sent by the SeatBroadcast thread when WeightOnWheels is detected, uses timedCallback::queue( ) to set a timer to a random value to cause the Statistics request to go to the seat after the timeout. This prevents all seats from processing the request at the same time (as it would from a broadcast), to keep the traffic on the network less congested. |
| SubProcessReinit | Re-Initializes tables via Initialize( ). |
| SubProcessStart | Starts the State Machine for this VLRU, putting it into the Start state. |
| SubProcessStop | Exits. |

At a minimum, a seat transaction requires sending a message to a service 477 and receiving an answer back. However, if it is a complex transaction (for example, a multiple-product merchandise order), several messages are routed before the entire transaction is complete. Because 500 seats 123 may be all communicating at the same time, the basic design of communications flow from the seat 123 to the services 477 and back can get highly fragmented when these complex transactions are involved. To minimize this fragmentation (and thus create the appearance of faster response at the seats), the Service Session protocol has been developed.

Supported by the Session class and the SDU interface, this protocol requires a seat 123 to open a session (or tap dibs) with the Seat NAU 465 before a transaction can take place. Only 10 Sessions 507 are supported simultaneously (controlled in the Session constructor by hSessionSemaphore), so if they are all busy, a Pending message is returned to the seat 123 to tell it to wait, and the seat's ID is kept on the SeatInterface::PendingSeats queue. Once a seat has a Session 507 assigned to it, it can communicate freely with the Service 477 via the NAU 465 until it closes or releases the Session.

The following table illustrates a Sample Session Communication Flow.

| Seat | Seat NAU | Sales Service |
|---|---|---|
| Session Control - OPEN> | | |
| | <Session Status - Pending | |
| Session Control - SDU Pending> | | |
| | <Session Status - Opened | |
| Transaction Command - Order> | | |
| | Transaction Command - Order> | |
| | | <Transaction Status - Ordered |
| | <Transaction Status - Paid | |
| Transaction Command - Order> | | |
| | Transaction Command - Order> | |
| | | <Transaction Status - Ordered |
| | <Transaction Status - Paid | |
| Session Control - Close> | | |
| | <Session Status - Closed | |

Each SeatInterface VLRU 651 has a Session class, called the_Session to support this which uses an EventStateTable that keeps track of the action to perform for any given Event and/or State. Each action is maintained as a separate function whose name begins "Ac" (e.g., AcTerminateSelf( )). These Action functions are all static BOOL functions that need the current Session and Event pointers passed to them to operate. They are called by the function Crank( ) 651a after it looks them up in the EventStateTable.

The following state table, called "Action" in the software, shows the relationship between the States, Events, Actions and changed or new states, sorted by From-State. Using this table, one can see how a Seat's Session moves from one state to another, which events can trigger the change and what actions are performed to cause the change. In the software, the events are prefixed with "Ev" (such as "EvSelfBackOut"), actions with "Ac" (such as "AcBackOut") and states with "St" (such as "StBackOut"). These prefixes are omitted from the table below for easier reading.

| From-State (St . . .) | Event Trigger (Ev . . .) | Action Function (Ac . . .) | To-State (St . . .) |
|---|---|---|---|
| BackOut | SelfBackOut | BackOut | BackOut |
| BackOut | ServiceBackedOut | BackOut | BackOut |
| BackOut | SelfBackOutDone | BackOutDone | Opened |
| CancelPending | ServiceCanceled | ServiceGeneralAction | Opened |
| CancelPending | SelfTimeOut | GeneralTimeOut | Terminating |
| Closed | SelfClosed | SessionNormal-Terminate | Terminated |
| Closed | SelfTimeOut | GeneralTimeOut | Terminating |
| CompleteUpdateByCommand | SDUGetNext-Transaction | SendTransaction-Update | Complete-UpdatePending |
| Complete-UpdatePending | SDUGetNext-Transaction | SendTransaction-Update | CompleteUpdate-Pending |
| Complete-UpdatePending | SelfUpdateDone | TransactionUpdate-Complete | Opened |

-continued

| From-State (St . . .) | Event Trigger (Ev . . .) | Action Function (Ac . . .) | To-State (St . . .) |
| --- | --- | --- | --- |
| Complete-UpdatePending | SelfTimeOut | GeneralTimeOut | Terminating |
| DeliveryPending | ServiceDelivered | ServiceGeneralAction | Opened |
| DeliveryPending | SelfTimeOut | GeneralTimeOut | Terminating |
| End | SelfTimeOut | GeneralTimeOut | Terminating |
| Foo | SDUPending | SessionNotAvailable | Paused |
| Incremental-Update-ByCommand | SDUGetNext-Transaction | SendTransaction-Update | Incremental-UpdatePending |
| Incremental-UpdatePending | SDUGetNext-Transaction | SendTransaction-Update | Incremental-UpdatePending |
| Incremental-UpdatePending | SelfUpdateDone | Transaction-UpdateComplete | Opened |
| Incremental-UpdatePending | SelfTimeOut | GeneralTimeOut | Terminating |
| Opened | SDUCancel | SDUGeneralAction | CancelPending |
| Opened | SDUClose | SessionClose | Closed |
| Opened | SDUDeliver | SDUGeneralAction | DeliveryPending |
| Opened | SDUOpen | DoNothing | Opened |
| Opened | SDUStatisticsData | Statistics | Opened |
| Opened | SDUSurveyData | Survey | Opened |
| Opened | SDUOrder | SDUOrder | OrderPending |
| Opened | SDURefund | SDUGeneralAction | RefundPending |
| Opened | SelfTimeOut | GeneralTimeOut | Terminating |
| Opened | SDUCompleteUpdate | DetermineUpdate-TypeNeeded | UpdateType-Pending |
| Opened | SDUIncremental-Update | DetermineUpdate-TypeNeeded | UpdateType-Pending |
| Opened | SDUUpdateRequest | DetermineUpdate-TypeNeeded | UpdateType-Pending |
| Ordered | SelfDeliverOnOrder | ServicePaid | Opened |
| Ordered | SDUPayment | SDUPayment | PaidPending |
| Ordered | SelfTimeOut | GeneralTimeOut | Terminating |
| OrderPending | ServiceOrdered | ServiceOrdered | Ordered |
| OrderPending | SelfTimeOut | GeneralTimeOut | Terminating |
| PaidPending | ServiceNotPaid-ForReason | ServiceNotPaid | BackOut |
| PaidPending | ServicePaid | ServicePaid | Opened |
| PaidPending | SelfTimeOut | GeneralTimeOut | Terminating |
| Paused | SDUOpen | SessionOpenNow | Waiting |
| Pending | SelfSystem-NotAvailable | SystemNotAvailable | Closed |
| Pending | SelfSession-NotAvailable | SessionNotAvailable | Foo |
| Pending | SelfSession-Available | SessionAvailable | Opened |
| Pending | SDUOpen | SessionTryToOpen | Pending |
| Pending | SelfTimeOut | GeneralTimeOut | Terminating |
| RefundPending | ServiceRefunded | ServiceGeneralAction | Opened |
| RefundPending | SelfTimeOut | GeneralTimeOut | Terminating |
| SessionInit | SDUClose | SessionNormal-Terminate | Closed |
| SessionInit | SDUOpen | SessionTryToOpen | Pending |
| SessionInit | Terminate-Immediatly | SessionInit | SessionInit |
| SessionInit | SDUTerminate | SessionAbnormal-Terminate | Terminating |
| SessionInit | SelfTimeOut | GeneralTimeOut | Terminating |
| SessionInit | SelfStatisticsNotify | SendUpdate-NotifyToSDU | UpdateNotify-AckPending |
| SessionInit | ServiceComplete-UpdateNotify | SendUpdate-NotifyToSDU | UpdateNotify-AckPending |
| SessionInit | ServiceInc-UpdateNotify | SendUpdate-NotifyToSDU | UpdateNotify-AckPending |
| SessionInit | ServiceIncUpdate-NotifyWithRevoke | SendUpdate-NotifyToSDU | UpdateNotify-WithRevoke-AckPending |
| Start | Start | SessionInit | SessionInit |
| Start | SelfTimeOut | GeneralTimeOut | Terminating |
| Terminated | SelfReinitialize | SessionInit | SessionInit |
| Terminated | SelfTimeOut | GeneralTimeOut | Terminating |
| Terminating | SelfTerminated | Terminated | Terminated |
| Terminating | SelfTimeOut | GeneralTimeOut | Terminating |
| TVOffAck-Pending | SelfTimeOut | UpdateNotifyTimeOut | DontChangeState |
| TVOffAck- | SDUTVOffAck | ServiceUpdate- | SessionInit |

-continued

| From-State (St . . .) | Event Trigger (Ev . . .) | Action Function (Ac . . .) | To-State (St . . .) |
|---|---|---|---|
| Pending TVOffAck-Pending | SelfCancel-UpdateNotify | NotifyComplete DoNothing | SessionInit |
| UpdateNotify-AckPending | SelfTimeOut | UpdateNotifyTimeOut | DontChangeState |
| UpdateNotify-AckPending | SDUUpdateNotify-AckFromSDU | ServiceUpdate-NotifyComplete | SessionInit |
| UpdateNotify-AckPending | SDUUpdateNotify-AckFromSI | ServiceUpdate-NotifyComplete | SessionInit |
| UpdateNotify-AckPending | SelfCancel-UpdateNotify | DoNothing | SessionInit |
| UpdateNotify-WithRevoke-AckPending | SelfTimeOut | UpdateNotifyTimeOut | DontChangeState |
| UpdateNotify-WithRevoke-AckPending | SDUUpdateNotify-AckFromSI | SendTVOff | TVOffAckPending |
| Update-TypePending | SelfCompleteType | SendUpdateType | CompleteUpdate-ByCommand |
| UpdateType-Pending | SelfIncrementalType | SendUpdateType | Incremental-UpdateBy-Command |
| Waiting | SelfSessionAvailable | SessionAvailable | Opened |
| Waiting | SelfSession-NotAvailable | SessionNotAvailable | Waiting |

All possible From-State/Event Trigger combinations are not represented in the Action table. Many do-nothing or illogical combinations need to default. For that reason, the Action table is used to fill in a larger, more comprehensive table called the EventStateTable. This two-dimensional table uses the values of From-State and Event Trigger as indexes, and defaults the illogical values to either do nothing or to terminate.

A typical session flow (with no errors) to place an order would start and end in the SessionInit state as shown below:

| From-State (St . . .) | Event Trigger (Ev . . .) | Action Function (Ac . . .) | To-State (St . . .) |
|---|---|---|---|
| Start | Start | SessionInit | SessionInit |
| SessionInit | SDUOpen | SessionTryToOpen | Pending |
| Pending | SelfSessionAvailabe | SessionAvailable | Opened |
| Opened | SDUOrder | SDUOrder | OrderPending |
| OrderPending | ServiceOrdered | ServiceOrdered | Ordered |
| Ordered | SDUPayment | SDUPayment | PaidPending |
| PaidPending | ServicePaid | ServicePaid | Opened |
| Opened | SDUClose | SessionClose | Closed |
| Closed | SelfClosed | SessionNormalTerminate | Terminated |
| Terminating | SelfTerminated | Terminated | Terminated |
| Terminated | SelfReinitialize | SessionInit | SessionInit |

Each Session 507 has a SessionQueue queue pair that is used to store the Events to perform for this Session's State Machine. The SessionQueue's Right queue 651c stores incoming message/event pointers for Session::Crank( ) 651a to process, while its Left queue 651b stores outgoing event/message pointers for SeatInterface::StartItUp( ) 518 to forward to either the message processor 452 or the transaction dispatcher 473 or timeouts as appropriate.

The SeatBroadcast VLRU 652 is a child of the SeatInterface class so that it can help monitor the seat communication traffic for the other SeatInterface objects. It is responsible for sending messages to more than one seat or more than one SeatInterface VLRU 652. Only one message is actually sent in a broadcast to the seats with the destination set to "AllSeats". It uses the CalledTimeOut utilities to create a TimeOut Thread called SeatBroadcastTimeout( ) to force periodic, unsolicited broadcasts. It also launches the PendingSessionMonitor( ) 652a and WheelStatusMonitor( ) threads 652b.

It's StartItUp( ) 518 function loops forever, retaining possession of one of the Session( ) 507 threads. It continuously monitors messages and processes the following events or messages:

| Message or Event | Action |
| --- | --- |
| CPMS Message | Tells all SDU-SI boards the current status of the HSDL Queue. Retriggers the HSDLInterface::ProcessDownloadQ( ) event. |
| MovieTimesMessage | Tells the MP what the Movie Run Times are |
| NAU_TIMEOUT Event | Triggers every tenth of a second using the TimedCallback::queue( ) function. When received, this broadcasts a "Session Complete" message to all seats if a Service Session has just completed, so they can retry communications, if needed. |
| ProcessReinit Message | Tells all VLRUs to "SubProcessReinit". |
| SeatTransfer Message | Uses ProcessSeatTransfer( ) to parse and forward this message to the two SeatInterface VLRUs that are involved in the transfer. |
| SubProcessStart Message | Tells all VLRUs to "SubProcessReinit". |
| SubProcessStop Message | Stops the Timeout thread and ends the program. |
| Weight_On_Wheels Event | Tells all VLRUs to Start Statistics Capture, now that the aircraft has landed (ending flight). |

The PendingSessionMonitor( ) 652a has nothing to do with Seat Broadcasting: It is a supplement to the normal SeatInterface processing. This monitor continuously waits for a Seat 123 to be put onto the static SeatInterface::PendingSeats queue (by any of the other SeatInterface::StartItUp( ) threads), and then waits until one of the Seat Sessions is available for processing. Then it puts this Seat ID onto the AuxFifo queue to be taken by the next available Session( ) thread 507.

The WheelStatusMonitor( ) 652b is a High Priority thread that waits for a signal from the PESC-A VLRU in the Backbone NAU, which pulses the Weight On Wheels or the Weight Off Wheels events when their status changes. This monitor forwards this event information to the StartItUp( ) 518 to process when it next loops.

The HSDLInterface VLRU 650 is a standard NAU child dedicated to servicing all download requests for games or application programs by the seats. Its constructor connects to the driver, "HSDL1" to transmit data to the seats via the Digitized Video Multiplexer system. The constructor also prefills a CRC Table used for deriving the CRC values during downloads. It creates a Mutex to control access to the HSDL directory to ensure that the routines in COPYDNL.CPP and SDU_BLDR.CPP don't interfere with the download process by modifying the files in the download directory at the wrong time.

The StartItUp( ) 518 routine launches the following threads:

| Thread | Function |
| --- | --- |
| ProcessFileChanges( ) | Reacts to changes in the NT Registry as well as changes in the Download Files Directory. It then calls ProcessEntireDirectory( ) to read the directory that contains the files that can be downloaded, creating a DownLoadFileInfo object for each, and placing all download files in the ConvertQ for RefreshThread( ) to handle. This thread places all programs and database files ahead of games in the ConvertQ so that the Seats can be ready for use as soon as possible. |
| RefreshThread( ) | Looks for files in the ConvertQ queue to prepare for later downloading. Calls DownLoadFileInfo::Refresh( ) to block the data and add checksums and CRCs for Seat verification. It also saves the identity of the requesting seat for communication during the actual download. |
| ProcessDownLoads( ) | This thread is launched at a low priority, so that the others can prepare all the files beforehand. It calls ProcessDownLoadQ( ) to use SeatInterface::GetDownLoadInstruction( ) to handle this file properly. Calls DownLoadFileInfo::Download( ) for each file in the DownLoadQ to actually send them to the output driver. During the download, it redirects message handling away from the seat's SEB and toward its SDU I/F board because the seat display unit 122a can't receive messages without its application running, which is true whenever it is receiving a download. |

Then StartItUp( ) calls ProcessIOQueues( ) to continuously sample the message processor and transaction dispatcher input queues. It processes the following message processor messages:

| IFE Message | Action |
| --- | --- |
| HighSpeedDownload | Puts the download request onto the DownLoadQ. It moves a request to the top of the queue if the |

| IFE Message | Action |
|---|---|
| | request is for a program (high priority). |
| SubProcessStart | Simply recognizes this command, no further processing. |
| SubProcessStop | Pushes its MP and TD Input queues and tells the DestructFifo queue (one of the few VLRUs to use this) that it can be shut down. |

Figure 19:
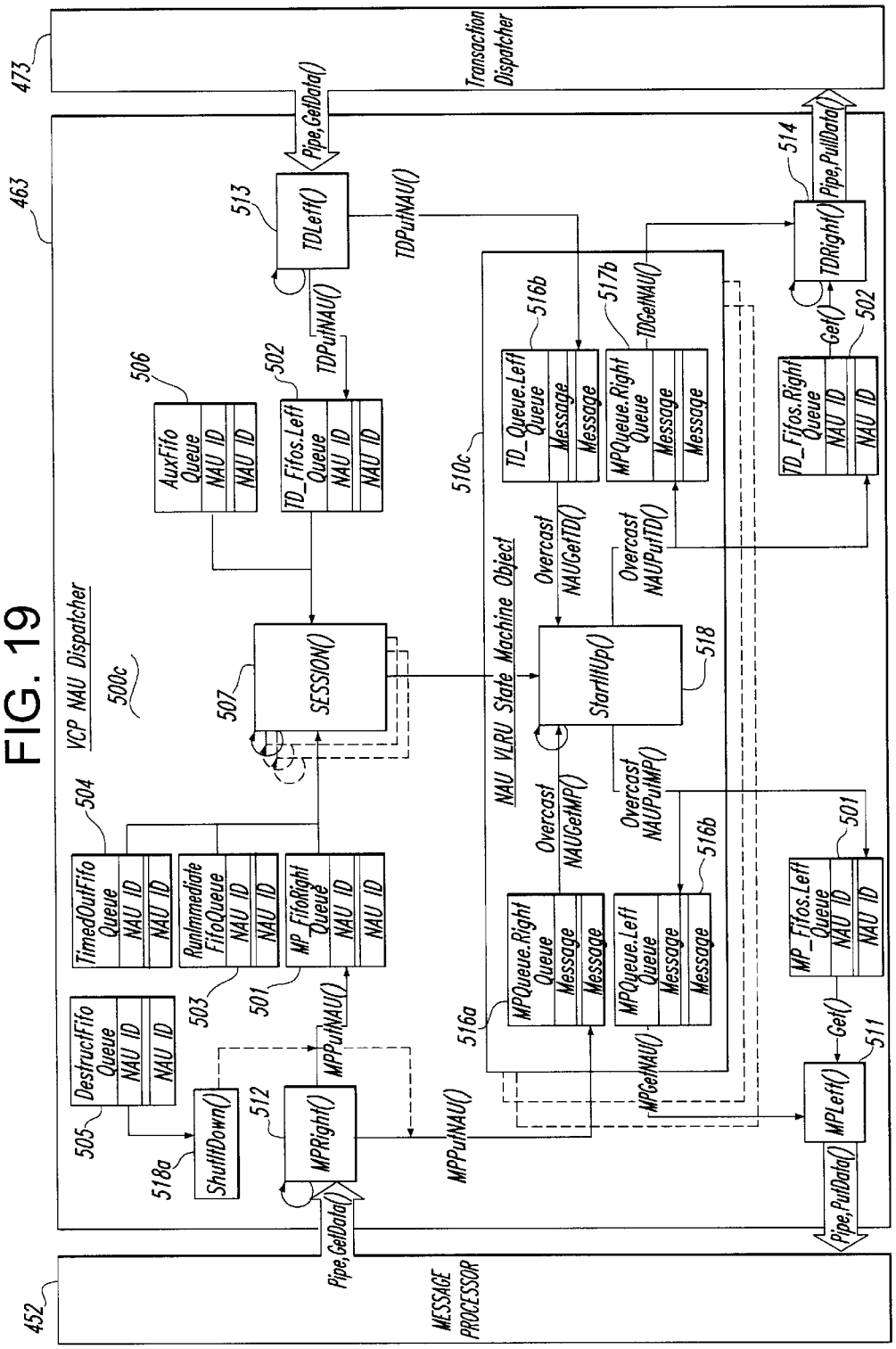
FIG. 19 illustrates VCP network addressable unit function and data paths.

The VCP NAU controls communications with the video players and other video sources. It maintains one VLRU for each video source, and constantly polls the players for their status. The VCP Network Addressable Unit program 462 function and data paths are shown in FIG. 19. The structure of the VCP NAU 462 is substantially the same as the Network Addressable Units function and data paths discussed with reference to FIG. 13.

VCP.EXE contains the VCP NAU program. This program includes the following primary components:
VNUMAIN.CPP The Main( ) Program
VCPDSPTCH.CPP The NAU Dispatcher
VCPNTRFC.CPP The VCP VLRU Interface Class
VCPSTSVL.CPP The VCP Status VLRU Class Main( ) issues a call to GetLruInfo( ) to read the database 493 for all the VCP names (e.g., "VCP01"). It then launches a VCPDispatch object to open up communications between the message processor 452 and the transaction dispatcher 473. It calls VCPDispatch::startItUp( ) to initialize the VLRUs, one for each video cassette player 227 plus one for periodic statusing of all video cassette players 227. It also launches the Session( ) threads 507.

Main( ) then calls ConsoleCmdO to process all console characters that may be in the input buffer. If "S" is encountered, a STOP command is issued to VCP01. If "P" is encountered, a PLAY command is issued to VCP01. This is for testing purposes only.

Finally, Main( ) sleeps forever until interrupted. It calls shutItDown( ) to close all the VLRUs down and exit gracefully.

A VCP VLRU is created for each video cassette player 227 in the database 493 using the VCPInterface Class. This class is derived from the Generic NAU Class; however, due to the communications protocol employed by the players, many of the generic functions are overcast or not used at all.

The VCPInterface( ) constructor creates two unique controllers: Static hIOSemaphore and bHasSemaphore. These are used to enforce single-threaded communications between a video cassette player 227 and the transaction dispatcher 473. Using these controllers, only one VLRU can be processing communications at a time. hIOSemaphore is a handle that acts as 'dibs': When this handle is owned by a thread, that thread can process communications. bHasSemaphore is a local flag that tells the thread whether it currently is the owner of the semaphore.

VCPInterface::StartItUp( ) is called immediately for each Session( ) to process a 'dummy' message from the message processor 452 for each of the video cassette players 227. This 'dummy' message was invoked at their creation to glue each video cassette player 227 to its own Session.

This function then loops forever to continuously process messages. The basic loop does the following:

If this session does not have dibs, it waits for input from the transaction dispatcher 473 and waits for the hIOSemaphore. Then it flushes all possible input from the message processor 452, reads the transaction dispatcher message and transmits it to the message processor 452. It retains ownership of the I/O handle, and loops again.

If this session already has dibs (from the previous paragraph), it waits for input from the message processor 404. Once received, it processes it and sends an acknowledgement back to the video cassette player 227 via the message processor 452. It then releases dibs for use by the other VLRUs.

A single VLRU of class VCPSts_VLRU is created to periodically poll the players for their status. Two lists of information are used to organize this: MessageMap, that contains a list of each video cassette player 227 and its network address; PendingStatus, that contains a list of video cassette players 227 that have just completed a communications event. MessageMap is maintained via AddVLRU( ) as each VCP VLRU is created by the dispatcher. PendingStatus is maintained by XmitResponse( ) each time the VCP VLRU completes a communications event.

VCPSts_VLRU contains a timeout function that is invoked approximately 10 times per second. The StartItUp( ) 518 function is immediately invoked and tied permanently to a Session( ) 507 thread. It then loops forever waiting for both a timeout to occur and the hIOSemaphore to be available. Once both events have occurred, it examines the contents of the PendingStatus string list and prompts the topmost video cassette player 227 on this list for its status. If none are on this list, it prompts the next video cassette player 227 in the MessageMap list. This is performed via SendStatuso. These status responses are formatted and forwarded to the Video Control Service via the transaction dispatcher 473. The I/O semaphore is released and the process cycle repeats.

Figure 20:
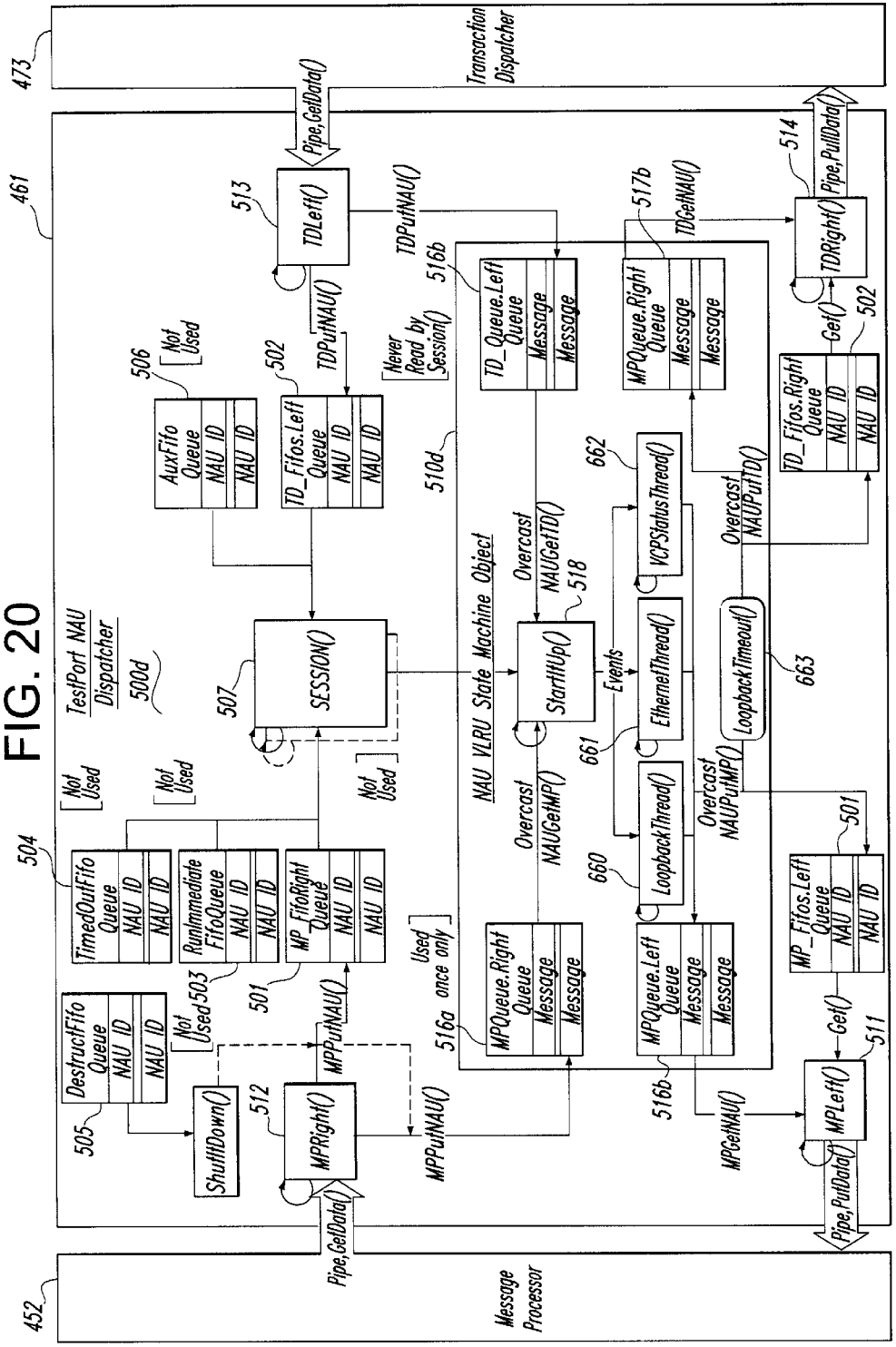
FIG. 20 illustrates Test Port network addressable unit function and data paths.

The Test Port NAU program 461 function and data paths is shown in FIG. 20. The Test Port NAU 461 controls communications to the serial test port for BIT/BITE and MAINT system access. The structure of the Test Port NAU 461 is substantially the same as the Network Addressable Units function and data paths discussed with reference to FIG. 13. However, the Test Port NAU 461 includes NAU VLRU state machine objects 510d comprising a LoopbackThread( ) 660, a EthernetThread( ) 661, a VCPStatusThread( ) 662, and a Loopback Timout( ) 663 that are initiated by StartItUp( ) 518.

The Test Port NAU program 461 has two exclusive behaviors: BIT test mode and BITE test mode. The Test Port NAU program 461 starts out in BIT mode, and upon receipt of a GO_BITE command (presumably from the PESC-A 224a), it attempts to switch to BITE mode. BITE test mode is only available while the aircraft 111 is on the ground (as indicated by weight-on-wheels).

A BITE test is a three-pass 'loopback' in which data is sent to one of the I/O devices (the primary access terminal 225 to test the Ethernet network 228, a PESC-A 224a to test the ARCNET 216, and VCP Status Service to test video cassette players 227) and an answer is expected back.

BIT tests are continuously occurring 'loopback' tests, however 3 consecutive failed communications are needed before a fault is recorded for any I/O device. A BIT test failure is only reported once per device per flight.

All BIT/BITE information is forwarded to a 'depository' or line replaceable unit that stores the information. In addition, BITE tests are initiated by an outside source or BITE Host. The default value for both of these is the primary PESC-A 224a, however, a SET_DEPOSITORY command executes SetBITEDepository( ) to alter these values.

TESTPORT.EXE contains the Test Port NAU program 461. The Test Port NAU program 461 includes the following primary components:

TESTPORT.CPP The Main( ) Program
TSTPRTDS.CPP The NAU Dispatcher
TSTPRTVL.CPP The VLRU Class The Main Program is a standard NAU starter. Main( ) registers the program with the System Monitor 412 using the SysMonInterfaceClass::Register( ) routine. Main( ) launches a TestPortDispatch object to open communication between the message processor 452 and the transaction dispatcher 473 and calls TestPortDispatch::startItUp( ) to initialize the VLRU. Main( ) launches two Session( ) threads 507, although only one is actually busy. Main( ) sends a SubProcessStart command to the TestPort VLRU which causes the first Session( ) thread to connect to the VLRU permanently. Finally, Main( ) sleeps forever until interrupted. Main( ) does not call shutItDown( ) to close all the VLRUs down and exit gracefully, it deletes the VLRU and dies.

A single Test Port VLRU is created using the TestPortVLRU Class. This class is derived from the Generic NAU Class, however it overcast the communications routines to support the TestPort_Message Class data routines. This constructor reads the database to develop a table of all Test Port LRUs, PESC LRUs, Process LRUs, ADB LRUs and ALAC LRUs. This table of LRU addresses is passed to the TestPort VLRU for reference in GetSourceAddress( ) and SetBITEDepository( ).

TestPortVlru::StartItUp( ) is called immediately for the first Session( ) to process a 'dummy' message from message processor 452. This 'dummy' message is invoked at their creation to glue the VLRU to a Session (a SubProcessStart message).

The VLRU then creates a set of 6 events used to communicate to 3 new threads:

| Thread Name | Event 1 | Event 2 |
| --- | --- | --- |
| ARCNET LoopbackThread | Message | Abort |
| EthernetThread | Message | Abort |
| VCPThread | Message | Abort |

This function loops forever to continuously process messages to-and-from the message processor 452. As a message is received, it is tested for validity, and then passed to the appropriate thread via a Message Event. Typically, the Message Events are used to determine what to do next, however to end BITE mode testing, the Abort Event is triggered for each thread to stop BITE testing, making BIT testing possible again.

StartItUp( ) 518 uses the TimedCallback Utility Class to periodically launch LoopbackTimeout( ) which is responsible for issuing a command to the ARCNET network 216, the primary access terminal 225 and the VCP Service to initiate a 'loopback' test, in that it causes these devices to respond. Failure to respond within a specified timeframe causes the associated thread to log that device as FAILED. The initiation is accomplished by calling PerformLoopback( ). It uses its own versions of NAUPutMP( ) and NAUPutTD( ) to communicate because it needs to use the TestPort_Message class instead of IFE_Message class routines to process the data.

When an event is received, the LoopbackThread( ) Thread process calls ProcessLoopback( ) to fully process the event. It tests ARCNET by communicating with the PESC-A 224a. If the PESC-A 224a fails to respond within a given timeframe, it times out, causing a failure to be noted.

In order to efficiently load programs, data and video games in the seats 123, the high-speed download driver 449 in FIG. 10 provides the ability to convert this information into a synchronous data link control (SDLC) data stream. This data stream is forwarded to the video modulator (VMOD) 212b to broadcast to all seats 123 via the RF distribution system. Any seat 123 that requires the download can then tune to the download channel and retrieve the information. HSDL.SYS is the high speed down load driver, written in C as a standard Windows NT driver. HSDL.SYS is the High Speed DownLoad driver, written in C as a standard Windows NT driver, and includes the following files:

CONFIG.C Code for the initialization phase of the HSDL device driver.

DISPATCH.C Code for the function dispatcher.

DMA.C Code for input and output which is non-hardware specific.

HARDWARE.C Code for communicating with the Zilog 85230 processor on the HSDL card.

HSDLLIB.C Common code for HSDL Kernel mode device drivers.

INIT.C Code for an initialization phase of the HSDL device driver.

ISR.C Code for an Interrupt Service Routine for the HSDLBlaster device driver.

REGISTRY.C Common code for Sound Kernel mode device drivers for accessing the registry.

The HSDL device is a Zilog 85230 Enhanced Serial Communications Controller (ESCC), which is an industry-standard serial controller. HSDL is a Synchronous Data Link Control (SDLC) data stream running at 409.6 Kbps with 514-byte frames using FM0 (biphase space) data encoding. To move the data as quickly as possible, DMA transfers are employed.

The driver is registered as "\\RSDL1" and the following NT driver commands are supported: CreateFile( ), WriteFile( ), DeviceIoControl( ) and CloseFile( ). The calling program writes to the device in 514-byte blocks. Currently, only CreateFile( ) and WriteFile( ) are used in the system 100.

The application functions are divided into Services 477 that are responsible for carrying out the requests that come from the various devices (Seats 123, PAT GUI 426, etc.). Requests come in two forms: IFE_Messages from the transaction dispatcher 473 and CAPI calls from the GUI 426. Service functions are the primary functions that interact with the database 493 during runtime. Each Service is connected to the transaction dispatcher 473 via its own Named Pipes, and as needed, it connects to the SQL Server 492 for database access.

SERVICE.EXE is organized into 4 basic components: Main, CAPI Calls 476, Cabin Services 478–482, 487–490 and Sales Services 483–486. The Cabin Services 478–482, 487–490 and Sales Services 483–486 are sets of Service classes whose objects each connect to the transaction dispatcher 473 via named pipes. They also each have a thread and subroutines to process all IFE messages received, and they all have sets of functions that are used by CAPI.CPP routines of the same name.

SERVICE.EXE is comprised of the following source files:

SRVCPRCS.CPP The Main Program and Service Class

CAPI_S.C The RPC Server Functions (See CAPI_C for its client companion functions)

Figure 21:
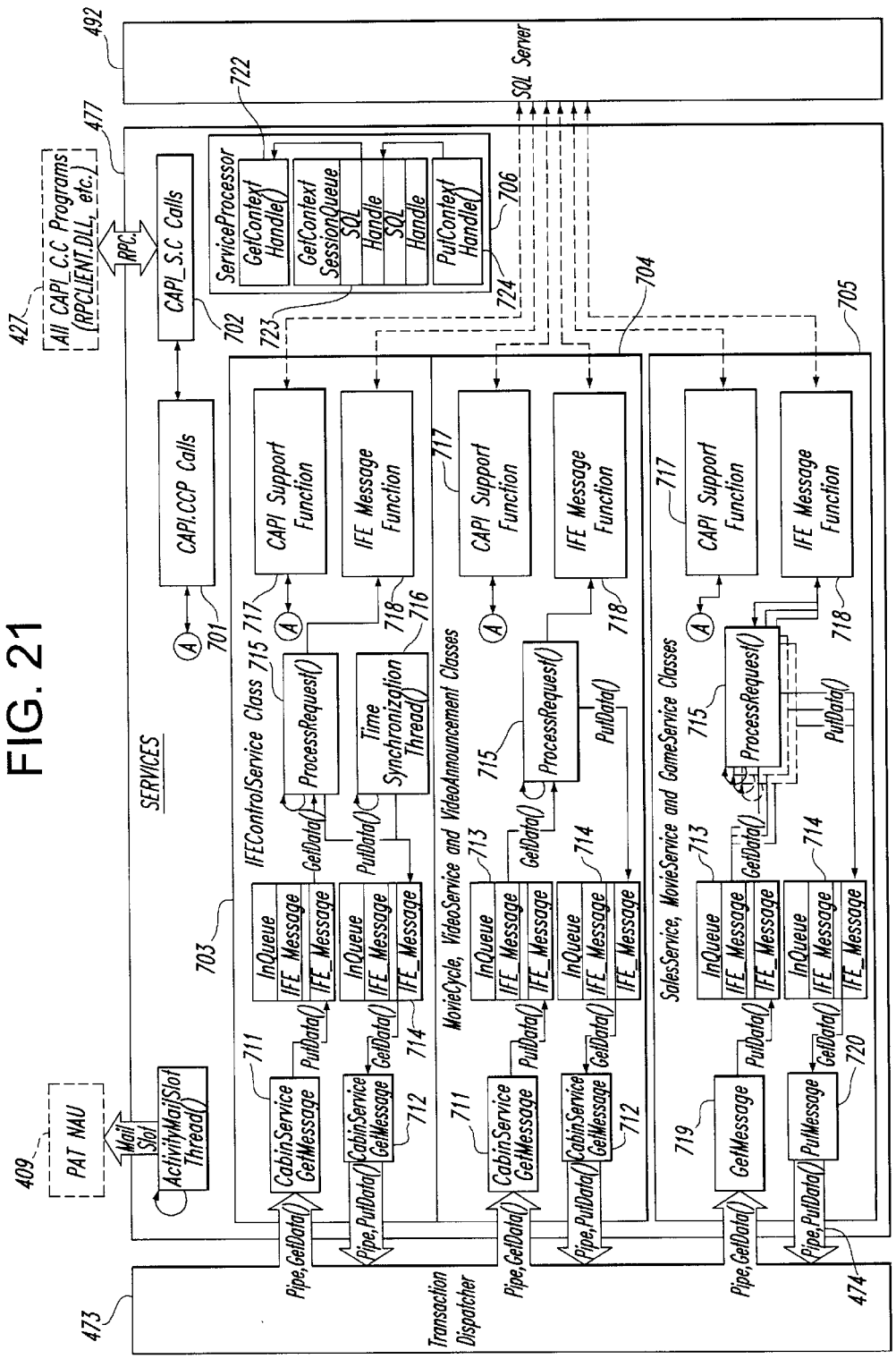
FIG. 21 illustrates Services function and data paths.

CAPI.CPP The actual CAPI Application Functions, called by CAPI_S.C, APIINT.CPP, and the Services.
CBNSRVCC.CPP The CabinService Base Class
CRDTCRDP.CPP The CreditCardProcessor Class
DTYFRSRV.CPP The DutyFreeService Class
GMSRVCCL.CPP The GamesService Class
IFCNTRLS.CPP The IFEControlService Class
MVCYCLCL.CPP The MovieCycle Class
MVSRVCCL.CPP The MovieService Class
OFFLOADR.CPP Database Offloader Functions
PCKGSRVC.CPP The PackageService Class
PLYRCNFG.CPP The PlayerConfiguration Class
SET.CPP The Set Class (to support the_Set table)
SLSSRVCE.CPP The SalesService Base Class
VCPMSSGE.CPP The VCP_Message Class (see MESSAGES.LIB for details)
VDNNNCMN.CPP The VideoAnnouncement Class
VDSRVCCL.CPP The VideoService Class The Services NAU program 477 function and data paths are shown in FIG. 21. Located in SRVCPRCS.CPP file, the main( ) program is responsible for launching each of the services. Once launched, they are each connected to the named pipes that communicate with the transaction dispatcher 473.

The services include CAPI.CPP calls 701 which access CAPI_S.C. calls 702 that access CAPI_C.C programs 427. The services include an IFEControlService Class 703, MovieCycle, VideoService and VideoAnnouncement Classes 704, and SalesService, MovieService and GameService Classes 705. The Services NAU program 477 includes a ServiceProcessor 706 that employs a GetContextHandle( ) 722 a ContextHandleSessionQueue 723, and a PutcontextHandle( ) 724.

The IFEControlService Class 703 employs a CabinService::Get Message( ) thread 711 and a CabinService::Put Message( ) thread 712 that are coupled to the transaction dispatcher 473 by way of name pipes 474. The CabinService::Get Message( ) thread 711 is routed to an InQueue 713 to a ProcessRequest( ) 715 which accesses IFE Message Support Functions 718. The ProcessRequest( ) 715 is coupled by way of an OutQueue 714 to a CabinService::Put Message( ) thread 712 which is coupled to the transaction dispatcher 473 by way of the name pipe 474. A TimeSynchronizationThread( ) 716 is also routed through the OutQueue 714 and CabinService::Put Message( ) thread 712. CAPI Support functions 717 are routed to the CAPI.CPP calls 701 and to the SQL server 492. The IFE Message Support Functions 718 access the SQL server 492.

The MovieCycle, VideoService and VideoAnnouncement Classes 704 employs a CabinService::Get Message( ) thread 711 and a CabinService::Put Message( ) thread 712 that are coupled to the transaction dispatcher 473 by way of name pipes 474. The CabinService::Get Message( ) thread 711 is routed to an InQueue 713 to a ProcessRequest( ) 715 which accesses IFE Message Support Functions 718. The ProcessRequest( ) 715 is coupled by way of an OutQueue 714 to a CabinService::Put Message( ) thread 712 which is coupled to the transaction dispatcher 473 by way of the name pipe. CAPI Support functions 717 are routed to the CAPI.CPP calls 701 and to the SQL server 492. The IFE Message Support Functions 718 access the SQL server 492.

The SalesService, MovieService and GameService Classes 705 employs GetMessage( ) 719 and PutMessage( ) threads 720 that interface to the transaction dispatcher 473 by way of name pipes 474. The GetMessage( ) thread 719 is routed by way of an InQueue 713 to a ProcessRequest( ) 715 which accesses IFE Message Support Functions 718. ProcessRequest( ) 715 are routed by way of an OutQueue 714 to the Put Message( ) thread 720 which is coupled to the transaction dispatcher 473 by way of the name pipe 474. CAPI Support functions 717 are routed to the CAPI.CPP calls 701 and to the SQL server 492. The IFE Message Support Functions 718 access the SQL server 492.

The main( ) program establishes a logon to the SQL Server 492 for database access using the standard SQL library commands in NTWDBLIB.LIB library. The main( ) program establishes 10 SQL Sessions, for example, with Context Handles to be used by the Services 477 to talk to the database 493. The main( ) program establishes multiple handles to the database 493 for all the services and CAPI functions to use, then starts Pipe Threads and Process Threads for each service to run independently.

The main( ) program establishes itself as an RPC Server to communicate with the PAT GUI 426 and any other RPC Clients with the NT RPC utilities. Any program that has CAPI_C.C linked into it is an RPC Client in the system 100. The main( ) program registers itself with the system monitor 454 for subsequent Shutdown support with SystemMonitor::Register( ). The main( ) program issues a call to ServiceProcessor::StartActvityMailSlotThread( ) to hook up to the primary access terminal NAU's GUI Monitor process, periodically sending it a message to let it know that Service is alive and well. Finally, the main( ) program waits forever listening to the RPC Server that it set up (via RpcServerListen( )) until System Monitor's Shutdown( ) kills the process.

The ServiceProcessor class is used by main( ) and the Services 477 to control the access to the database 493 using the finite number of Context Handles available. This program has more Service SQL functions than Context Handles. It is conceivable that as many as 25 SQL requests may be present at one time (10 games, 10 movies, 1 CAPI, 1 IFE Control, 1 Movie Cycle, 1 Video Service and 1 Video Announcement). As a result, this code provides for optimum processing efficiency by queueing up the available Context Handles and issuing them on a first-come first served basis.

| ServiceProcessor Public Functions | Purpose |
| --- | --- |
| CONTEXTHANDLESTRUCT * GetContextHandle( ) | Returns the handle to the next available context structure for access to the database. |
| int GetContextHandleCount( ) | Returns the number of available Context Handles. |
| HANDLE GetContextHandleSemaphore( ) | Returns the semaphore for the context handle Queue. |

-continued

| ServiceProcessor Public Functions | Purpose |
| --- | --- |
| DWORD<br>GetLastError(<br>PCONTEXT_HANDLE_TYPE phContext) | Retrieves the error code associated with the specified context handle (phContext) that was most recently set by the SetLastError( ) member function. |
| void<br>PutContextDB(<br>int dContextLocation,<br>DBPROCESS*pDBProc) | Adds the DPROCESS handle to the context handle structure. |
| void<br>PutContextHandle(<br>CONTEXTHANDLESTRUCT*<br>pContextHandle) | Replaces the context structure into the context structure queue. Service Classes use this one. |
| void<br>PutContextHandle(<br>int dContextLocation) | Adds the context structure to the context structure queue. The main( ) program uses this one to initialize the queue. |
| void<br>SetLastError(<br>PCONTEXT_HANDLE_TYPE phContext,<br>DWORD dwErrorCode) | Associates the error code in dwErrorCord with the context handle pointer (phContext) storing them in the LastErrorMap structure. Values are retrieved from the structure via the GetLastError( ) member. This makes the errors available to all RPC Clients outside the Services. |
| bool<br>StartActivityMailSlotThread( ) | Starts the Mail Slot Thread used for transmitting an "I'm alive" signal to the PAT NAU GuiMonitor. Returns FALSE if fails to start the thread. |

Based on the DBAccess class, the Service class is a template for all the Services 477 to follow for proper operation. As a result, all its functions are virtual, and are defined in its children classes.

| Service Class Virtual Functions | Purpose |
| --- | --- |
| virtual bool<br>ConnectToTD( ) | Abstract definition to interface supports Service-to-TD named pipe connections. |
| virtual void<br>GenerateReport(<br>ReportType nReport) | Abstract definition to define the interface to launch a report.<br>(All of them are stubs for now, and not called by anyone.) |
| virtual void<br>GetMessage( ) | Abstract definition to receive data into the Service. |
| virtual PolicyType<br>GetPolicy( ) | Abstract definition to retrieve the access policy for the Service.<br>(All of them are stubs for now, and not called by anyone.) |
| virtual bool<br>IsAvailable( ) | Abstract definition that defines an interface to evaluate whether a Service is available and ready to process requests or commands.<br>(All of them are stubs for now, and not called by anyone.) |
| virtual void | Abstract definition that defines an interface to |

-continued

| Service Class Virtual Functions | Purpose |
| --- | --- |
| MakeAvailable(<br>SERVICESTATE<br>ServiceAction) | make a Service available.<br>(All of them are stubs for now, and not called by anyone.) |
| virtual void<br>ProcessRequest( ) | Abstract definition for an interface that handles IFE_Messages for the Service. In addition to specific messages designed for each Service, all ProcessRequest( ) functions should handle the SubProcessStart, SubProcessStop and SubProcessReinit messages to get themselves going and synchronized as needed by the rest of the system. |
| virtual void<br>PutMessage( ) | Abstract definition to send data out of the Service to TD and beyond. |

The Cabin Services 477 control all the functions of In-Flight Service except those in which individual passengers 117 are involved. Cabin Services 477 are divided into the following Services: IFE Control Service 703, Movie Cycle Service, Video Service and the Video Announcement Service 704. In addition to its overcast versions of the Service class functions, CabinServiceClass includes:

| CabinServiceClass Public Functions | Purpose |
| --- | --- |
| TIME<br>GetRemainingFlightTime<br>(PCONTEXT_HANDLE_TYPE<br>phContext) | Retrieves the remaining flight time using the CalcRemainingFlightTime stored procedure. |
| bool<br>RegisterPipe<br>(HANDLE hPipeHandle) | Registers this named pipe with the Transaction Dispatcher to make I/O possible. |
| bool<br>SetStatus | Transfers the data contained in pszData into the status message field identified by |

-continued

| CabinServiceClass Public Functions | Purpose |
|---|---|
| (STATUS_TYPE nStatusType, char *pszData) | nStatusType. |
| bool StartPipeThreads (ServiceProcessor *pServiceProcessor) | Called by main( ) to get a pair of named pipes to TD for this Service. |
| bool StartProcessThreads (ServiceProcessor *pServiceProcessor) | Called by main( ) to get the child's ProcessRequest( ) loop going by invoking ProcessRequestInterface( ). |
| static UINT GetMessageThreadInterface (LPVOID lpParam) | Shared by all the CabinServiceClass children, this launches the child's GetMessage( ) function to handle its input from TD. |
| static UINT ProcessRequestInterface (LPVOID lpParam) | Shared by all the CabinServiceClass children, this launches the local ProcessRequest( ) function that loops forever handling the messages that it receives. |
| static UINT GetMessageThreadInterface (LPVOID lpParam) | Shared by all the CabinServiceClass children, this launches the child's PutMessage( ) function to handle its output to TD. |
| void Wait( DWORD dwSeconds) | Initiates a delay for the number of seconds specified by the input parameter dwSeconds. |

The IFEControlService 703 class is derived from the CabinService class and contains several additional sets of functions that are used sporadically throughout the flight including:

| Function Set | Tables Used |
|---|---|
| IFE State Changes | Aircraft, Order_ |
| Flight Duration Management | |
| Statistics | Member, PassengerMap, PassengerStatistics, Set_ |
| Surveys | SurveyAnswer |
| Seat Transfers | |
| Database Backup | All Database Tables |

CAPI support 717 includes the following public functions accessed by CAPI.CPP 701 calls (having the same name):

| IFEControlService Class Public Functions | Purpose |
|---|---|
| bool CommandSeat (PCONTEXT_HANDLE_TYPE phContext, SEAT_COMMAND nCommand, PGENERIC_TEXT pszSeatName) | Formats an IFE Message as specified by nCommand and transmits the message to the seat specified by pszSeatName. |
| bool SeatTransferInit (PGENERIC_TEXT pszSeat1, PGENERIC_TEXT pszSeat2) | Due to a CAPI call, Formats and sends an IFE_Message to the Seat NAU, which is where the actual transfer takes place. The data in the message reflects the two seats that are to be transferred. |
| void SendStatusMessage (PCONTEXT_HANDLE_TYPE phContext) | Formats and transmits an unsolicited Status Window Message to the GUI. |

| IFEControlService Class Public Functions | Purpose |
|---|---|
| bool SetIFEState (PCONTEXT_HANDLE_TYPE phContext, IFESTATE IFEStateValue) | Calls the local SetState( ) to update the system state information. IFE State is a term that describes whether the IFE System is IDLE, STARTED, PAUSED, and more. This allows CAPI to alter these states to either free up services or disable them as appropriate for the current runtime state of the system. For example, when the system is IDLE or PAUSED, movies cannot be viewed which affects the Movie Cycle Service as well as the Movie Rental Service. |
| void SetRemainingFlightDuration (PCONTEXT_HANDLE_TYPE phContext) | Called to refresh the value contained in the tmRemainingFlightDuration which is defined statically in the CabinService class. This function is called periodically from the IFEControlService::TimeSynchronizationThread( ) thread to update the value as the flight |

| IFEControlService Class Public Functions | Purpose |
|---|---|
| | -continued |
| | progresses, and directly from the CAPI when a change to the flight duration occurs. |

In addition to the CAPI support functions 717, the IFE Message Support 718 also handles incoming IFE Messages using its overcast ProcessRequest( ) thread 715. In addition to the standard messages, this class handles the following messages: Statistics, Survey, SeatFault, FlightInfoRequest and DatabaseBackup.

| IFE Message | Function Called | Purpose | Tables Affected |
|---|---|---|---|
| DatabaseBackup | ProcessDatabaseBackup( ) | Generates a backup of the entire CFS database to recover after a possible CFS hard disk failure. | All database tables |
| FlightInfoRequest | ProcessFlightInfo( ) | Gathers flight information from the CFS database and uses the information to populate an IFE_Message. The IFE_Message is then returned to the requesting program | Aircraft FlightV |
| SeatFault | ProcessSeatFault( ) | Updates the database, clearing or setting a fault indication for the seat or range of seats in the IFE message | PassengerMap |
| Statistics | ProcessStatistics( ) | Stores statistical information from the seats to the database and prepares them for output to a text file. Statistics include information such as how many hours of which movie was viewed, which games were played and more. | Member Set_ PassengerMap PassengerStatistics |
| SubProcessStart | InitService( ) | Establish IFE State and tell it to all affected programs via IFE Messages. Calls StartTimeSynchronizationThread() to launch TimeSynchronizationThread( ) | Aircraft |
| Survey | ProcessSurvey( ) | Stores the answers given by passengers to survey questions available through the IFE system. These answers are stored in the database, as well as prepared for output to a text file | Survey SurveyAnswer SurveyAnswerKey SurveyQuestion |

The TimeSynchronizationThread( ) thread 716 in the IFEControlService class 703 is responsible for managing flight duration information, which changes all the time. It uses SetRemainingFlightDuration( ) to update values, and calls AutoEndRevenue( ) to send a Stop Revenue Unsolicited Message to the GUI 426 once there is no time for further revenue purchases.

The PlayerConfiguration class supports any Service that uses video players, such as the MovieCycle, VideoAnnouncement and Video Services 704. The PlayerConfiguration class contains all pertinent information necessary to describe information specific to a Movie Cycle or Video Announcement. The PlayerConfiguration class also contains the methods needed to issue all appropriate messages to start a specific Movie Cycle or Video Announcement.

| PlayerConfiguration Class Public Functions | Purpose |
| --- | --- |
| PlayerConfiguration (Queue *pParentQueue, CString csName, CString csAddress, TIME tmIntermission, TIME tmStart) | Creates a PlayerConfiguration object of specified Name, Intermission Time and Start time. In addition, a reference to the parent object's queue is stored in order for this PlayerConfiguration object to communicate with the parent object. |
| PlayerConfiguration (Queue *pParentQueue, CString csName, CString csAddress) | Same as above, except default values for Intermission Time and Start Tinie are assigned as Zero. |
| void AddPlayer (CString csPlayerName, BYTE bySegment, BYTE byRepeat, DWORD dwMediaId) | Adds the specified player to this Player Configuration. If the program to be played is a Video Segment, then a segment number is provided, otherwise a value of zero is passed in the bySegment argument. If the repeat flag is set TRUE then the associated player is placed into it's REPEAT state. |
| bool ChangeCabinAudioLevel (BYTE byAudioLevel, BYTE byZone) | Updates internal data structures for this PlayerConfiguration object with the audio level specified in the byAudioLevel argument. |
| void CommandCabinAudio (bool bAudioOn) | Transmits the necessary messages to the Backbone NAU which command the PESC-V to make the necessary cabin audio connections for the zones associated with this Player Configuration object. If the input argument bAudioOn is TRUE, the connections are enabled, if bAudioOn is FALSE, the connections are disabled. |
| void CommandCabinVideo (bool bVideoOn) | Sends messages to the PESC-V to activate or de-activate the Overhead Monitors and override the in-seat video displays associated with this Player Configuration object. A value of TRUE for the input argument bVideoOn causes cabin video connections to be enabled, a value of FALSE for bVideoOn causes cabin video connections to be disabled. |
| bool CommandPlayer (CString csPlayerName, PLAYERCOMMANDS nCommand, PGENERIC_TEXT pszExtra) | Transmits the player command specified by nCommand to the player specified by csPlayerName. Any additional data needed for the command must be passed in pszExtra. |
| bool CommandPlayers (PlayerCommands nPlayerCommand) | Issues the commands to start, stop or rewind the player. |
| bool CreateAssignmentMap (PCONTEXT_HANDLE_TYPE phContext) | Populates the static data structure AssignMap with a status record for each LRU of type VCP residing in the LRU table. |
| BYTE GetCabinAudioZoneMap( ) | Returns the Cabin Audio Zone BitMap. |
| BYTE GetCabinVideoZoneMap( ) | Returns the Cabin Video Zone BitMap. |
| CString GetConfigAddress( ) | Returns the Configuration Address. |
| PLAYERSTATE GetConfigState( ) | Returns the cumulative state of all players currently assigned in this PlayerConfiguration object. |
| PLAYERSTATE GetConfigState( ) | Returns the state of the Player's Configuration. |
| void GetConfigStatus (ULONG *ulCurrentViewing, long *tmElapsed, long *tmRemaining, long *tmNextShow) | Returns information pertinent to this PlayerConfiguration object. The information returned is: Number of configurations started Elapsed time current configuration has been playing Remaining play time for current configuration |

-continued

| PlayerConfiguration Class Public Functions | Purpose |
|---|---|
| | Number of minutes until the next Configuration starts. |
| ConfigState GetCurrState( ) | Returns the current configuration state. |
| TIME GetCycleTime( ) | Returns the sum of the Longest Program Time and the Intermission. |
| int GetCycleTimes (TIME tmFlightRemaining, CDWordArray *dwCycleTimeList) | Computes a list of start times for all movie cycles contained in this PlayerConfiguration object. Cycle time values are store in dwCycleTimeList and the number of elements added to the array is returned to the calling function. |
| long GetLongestProgramTime( ) | Returns the Longest Program duration in minutes. |
| CString GetLongestProgramVcp( ) | Returns the value of the Longest VCP Program name. |
| DWORD GetMediaId (CString csPlayerName) | Returns the MediaId associated with the Video Player specified in csPlayerName. A value of −1 is returned if an invalid player name is specified. |
| CString GetName( ) | Returns the configuration name. |
| int GetPlayerList (CStringArray &csList) | Populates a CStringArray with a list of the VCP Player Names currently associated with this PlayerConfigurationObject. |
| WORD GetPlayerStateCount (PLAYERSTATE nPlayerState) | Returns the number of players in this PlayerConfiguration object that are currently in the state specified by nPlayerState. |
| ConfigState GetPrevState( ) | Returns the previous configuration state. |
| BYTE GetSeatVideoZoneMap( ) | Returns the Seat Video Zone BitMap. |
| TIME GetStartTime( ) | Returns the Start Time. |
| bool GetTimeoutFlag( ) | Returns the value of the Timeout Flag. |
| PLAYERSTATE GetVCPState (CString csVCPName) | Returns the state currently stored in the assignment map for the player specified by csVCPName. |
| bool IsCabinAudioActive( ) | Returns a value of TRUE to the calling function if cabin audio is being used by any of the currently active assignments. A value of FALSE is returned otherwise. |
| bool IsLastViewing (TIME tmFlightRemaining) | Determines whether or not the cycle being played is the final cycle based on the remaining time in the flight. It returns a value of TRUE if the last cycle has started and returns a value of FALSE otherwise. |
| bool IsRunning( ) | Returns TRUE if the current state is IDLE. |
| bool IsTransitionActive( ) | Returns TRUE if Transition is marked as active. |
| bool IsValidVCP (CString csVCPName) | Returns a value of TRUE to the calling function if the player name specified by the csVCPName argument is found in the Assignment map. Otherwise a value of FALSE is returned. |
| void Purge( ) | Removes references to all video player names and configuration data associated with this PlayerConfiguration Object. |
| void RecoverCycle (IFE_Message *msgRecoveryInfo) | Extracts recovery information from the IFE_Message object referenced by msgRecoveryInfo, converts the data into Binary and uses the converted data to initialize timing information for this PlayerConfiguration object. |
| bool ReplacePlayer( CString &csOld, CString &csNew) | Removes the player identified by csOld from this PlayerConfiguration object and adds the player identified by csNew to this PlayerConfiguration object. |
| void ResetTransitionActive( ) | Sets Transition to InActive. |
| void SetAudioDistributionInfo (BYTE byAudioMap, BYTE byMapType, CByteArray *pbyVolume) | Stores the Audio distribution information for this Player Configuration. |
| bool SetConfigState (ConfigState nState) | Sets the state of this PlayerConfiguration object to the value specified by nState. Performs all initialization necessary to make the transition into the new state. Returns TRUE if the state was successfully entered, returns FALSE otherwise. |
| void SetIntermission (TIME tmIntermission) | Sets the Intermission Duration for this Player Configuration. |

-continued

| PlayerConfiguration Class Public Functions | Purpose |
|---|---|
| void SetLongestProgram (int nPlayTime, CString csPlayerName) | Identifies a VCP Name and Program Duration as the longest program in this PlayerConfiguration. |
| void SetStartTime (TIME tmStartTime) | Sets the player start time. |
| void SetTransitionActiue( ) | Sets Transition to Active. |
| int SetVCPAssignment (int nLockState) | Updates the pConfig entry in the PlayerMap data structure associated the player identified by csVCPName. If the value of nLockState is LOCK the pointer to this PlayerConfiguration object is written. If the value of nLockState is AVAILABLE and the player is currently assigned to this player configuration object, the pConfig field is set to NULL. Returns the number of players which were successfully assigned. |
| bool SetVCPState (Cstring csVCPName, PLAYERSTATE nVCPState, DWORD dwVCPTime) | Updates the entry in the PlayerMap data structure associated the player identified by csVCPName with the value contained in the nVCPState argument. |
| void SetVideoDistributionInfo (BYTE byRFChannel, BYTE bySeatMap, BYTE byOHMap, BYTE byMapType) | Stores the video distribution information for this Player Configuration. |
| void UpdateConfigState (VCP_Message *pMessage) | Updates the state of this PlayerConfiguration object based. The state may be changed based on the content of the input message or based on a timeout applied to the current state. |
| void UpdateConfigTimeout( ) | Sets the state of the bConfigTimeoutFlag variable TRUE if the elapsed time for the current state has been exceeded. Otherwise, the bConfigTimeoutFlag variable is set False. |
| void UpdateCycleStatus (TIME tmStatusUpdateRate, TIME tmRemainingCycleTime) | Used periodically to transmit the Movie Cycle Times (based on RemainingCycleTime) message to the Seat NAU. Also periodically transmits a RecoveryInfo message to the IFEControlService. |

Throughout the In-Flight operation, one or more movies continuously play, all starting together as a set, providing maximum viewing possibilities for the passengers 117. This is known as Movie Cycling. The Movie Cycle Service controls the synchronization of these cycles.

Derived from the CabinService class, MovieCycleClass is responsible for keeping track of the remaining time of the flight, as well as the longest movie duration. It starts a cycle, stops a cycle, pauses a cycle, and recovers a cycle. The following database tables are used to support the MovieCycle Class: Member, MovieCycle, Set_, VideoMedium, VideoPlayer, VideoSegment, and VideoUse.

The following table shows those functions that are used by CAPI.CPP calls 701:

| MovieCycle Class Public Functions | Purpose |
|---|---|
| bool AddPlayerToMovieCycle (PCONTEXT_HANDLE_TYPE phContext, PGENERIC_TEXT MovieCycleName, PGENERIC_TEXT PlayerName) | Adds a player to a movie cycle. |
| bool ChangeMovieCycleIntermissionTime (PCONTEXT_HANDLE_TYPE phContext, PGENERIC_TEXT MovieCycleName, TIME Intermission) | Modifies the movie cycle intermission time. |
| bool ChangeMovieCycleStartTime (PCONTEXT_HANDLE_TYPE phContext, PGENERIC_TEXT MovieCycleName, TIME StartDelay) | Update the start delay time for the PlayerConfiguration object specified by MovieCycleName. Updates the start delay locally: The value is written to the database as part of the StartMovieCycle processing. |
| APIResult GetFirstMovieCycleTime | Calculates the number of minutes until each of the remaining movie |

-continued

| MovieCycle Class Public Functions | Purpose |
|---|---|
| (PCONTEXT_HANDLE_TYPE phContext, PGENERIC_TEXT pszMovieCycleName, TIME *tmMinUntilStart) | cycles starts. Returns the first start time in tmMinUntilStart. The return value is APIOK if there are 2 or more entries in the list and APIEndOfList if there is only 1 entry in the list. |
| bool GetMovieConfigurationState (PCONTEXT_HANDLE_TYPE phContext, PGENERIC_TEXT pszMovieCycleName) | Returns TRUE if the movie cycle specified by pszMovieCycleName is running. |
| bool GetMovieCycleDuration (PCONTEXT_HANDLE_TYPE phContext, PGENERIC_TEXT pszMovieCycleName, TIME *tmDuration) | Returns the duration, in minutes, of the Movie Cycle specified by pszMovieCycleName. A return value of TRUE indicates that the specified movie cycle was found and the time is valid. |
| APIResult GetNextMovieCycleTime (PCONTEXT_HANDLE_TYPE phContext, TIME *tmMinUntilStart) | After GetFirstMovieCycleTime( ) has been called to calculate movie cycle times and return the first one, this can be called iteratively to retrieve the remaining movie cycle start times. Returns APIEndOfList for the last entry in the list. Returns APIOK for all other entries. |
| bool RemovePlayerFromMovieCycle (PCONTEXT_HANDLE_TYPE phContext, PGENERIC_TEXT MovieCycleName, PGENERIC_TEXT PlayerName) | Removes the PlayerName player from the movie cycle MovieCycleName. |
| bool ReplaceMovieCyclePlayer (PCONTEXT_HANDLE_TYPE phContext, PGENERIC_TEXT pszMovieCycleName, PGENERIC_TEXT pszPlayerToRemove, PGENERIC_TEXT pszPlayerToAdd) | Swaps players (usually because of a hardware failure, and movies must be moved to new devices). |
| bool SetMovieCycleUpdateRate (PCONTEXT_HANDLE_TYPE phContext, long lSeconds) | Sets the movie cycle update rate. The movie cycle update rate is the rate at which the system transmits movie cycle update information to the seats in seconds. |
| bool StartMovieCycle (PCONTEXT_HANDLE_TYPE phContext, PGENERIC_TEXT MovieCycleName, TIME tmStartTime) | Starts the specified MovieCycleName at the given tmStartTime. |
| bool StopMovieCycle (PCONTEXT_HANDLE_TYPE phContext, PGENERIC_TEXT MovieCycleName) | Stops the specified Movie Cycle. |
| void UpdateSystemState (PCONTEXT_HANDLE_TYPE phContext) | Notifies MovieCycleService that a change to the system state has occurred. The Service retrieves the system state from the database and updates the state of the active cycle(s) accordingly. |

IFE Message Support 718 handles incoming IFE Messages using its overcast ProcessRequest( ) thread 715. In addition to the standard IFE messages, this class handles the following messages: MovieTimes and MovieCycle.

Flight Attendants often need the ability to view and listen to videos to verify quality and accuracy (for example, to determine if the expected movie is installed in the proper player 227). The Video Service functions support this capa-

| IFE Message | Function Called | Purpose |
|---|---|---|
| MovieCycle | StopMovieCycle( ) or StartMovieCycle( ) | Starts or Stops the movie cycle as needed. |
| MovieTimes | UpdateMovieTimes( ) | Updates the duration of the movies that are playing or scheduled to play. |
| SubProcessStart | InitService( ) | Creates a PlayerConfiguration object, determines what the players are doing using UpdateSystemState( ) | bility. Derived from the CabinService class, the VideoServiceClass is responsible for connecting the GUI 426 to the individual players 227 for preview and overhead control. The following database tables are affected by the Video Service Class: VideoMedium, VideoPlayer, and VideoUse.

The following table shows those functions that are used by CAPI.CPP calls 701:

| VideoServiceClass Public Function | Purpose |
| --- | --- |
| PLAYERSTATE CommandPlayer (PGENERIC_TEXT pszPlayerName, PLAYERCOMMANDS nCommand, PGENERIC_TEXT pszExtra) | Uses PlayerConfiguration class functions to tell VCP pszPlayerName to perform nCommand (e.g., start, stop, play . . . etc). |
| void GetOverhead (OVERHEADSTATETYPE *pOHState, long *pChannel) | Returns the state and channel # of the currently selected Overhead Video source. |
| PLAYERSTATE GetPlayerState (PGENERIC_TEXT pszPlayerName) | Uses CommandPlayer( ) to prompt the VCP to supply its current state. Returns this state to caller. |
| long GetRemainingPlayerTime (PGENERIC_TEXT pszPlayerName) | Uses CommandPlayer( ) to prompt the VCP to supply its remaining play time. Currently, this always returns ZERO. |
| bool SetAnnouncementAudioLevel (PCONTEXT_HANDLE_TYPE phContext, long lAudioLevel, DWORD dwZone, bool Persist) | Sets the Cabin Audio volume level. A value of −1 for dwZone specifies that PA volume for all zones is to be set to the specified audio level. If Persist is set TRUE, this updates the database as well, making this a permanent setting. |
| void SetOverhead (OVERREADSTATETYPE OHState, long Channel, PGENERIC_TEXT pszPlayerName) | Transmits a message to the PESC-V via the Backbone NAU to identify which channel represents the overhead video source. All parameters are Input Parameters. |
| bool SetPlayerSegment (PGENERIC_TEXT pszPlayerName, long lSegment) | Tells the VCP NAU to set the given pszPlayerName VCP to the selected lSegment. Returns FALSE if Segment value is invalid (> 0xff). |
| void UpdateSystemState (PCONTEXT_HANDLE_TYPE phContext) | Notifies this Service that a change to the system state has occurred. |

IFE Message Support 718 handles incoming IFE Messages using its overcast ProcessRequest( ) thread 715. In addition to the standard IFE messages, this class handles the following messages: FailedPlayer, VCPStatus, and VideoControl.

The VideoAnnouncementService class is derived from the CabinService class and contains several additional sets of functions that are used sporadically throughout the flight to support the playing of video clips, such as a safety video that must be broadcast to all passengers 117 at specific times during the flight. It provides the following functionality: creates a message for cabin configuration (cabin audio/video), works with MovieCycleService to pause the movie cycle, starts an announcement tape, and talks to PESC-V 224b to control PA. The database tables affected by the

| IFE Message | Function Called | Purpose |
| --- | --- | --- |
| FailedPlayer | ProcessFailedPlayer( ) | Returns to the caller the number of players and which ones are flagged as failed. |
| SubProcessStart | InitService( ) | Creates a PlayerConfiguration object and initiazize its variables. |
| VCPStatus | ProcessVCPStatus( ) | Updates the VCPState (via PlayerConfiguration::SetVCPState( )), updates the database and tell the MovieCycle Service of the changed status via an IFE_Message. |
| VideoControl | ProcessVideoControl( ) | Updates the named player's status as given in the message, and outputs it to the Status Window. |

VideoAnnouncementService Class are: Aircraft, PA_Volume, VA_Distribution, VideoMedium, and VideoSegment.

The following table shows those functions that are used by CAPI.CPP calls 701:

| VideoAnnouncementService Public Functions | Purpose |
|---|---|
| APIRESULT GetFirstVideoAnnouncementPlayList (PCONTEXT_HANDLE_TYPE phContext, PGENERIC_TEXT pszVideoAnnouncementName, PGENERIC_TEXT pszPlayerName, VIDEOANNOUNCEMENTSTATUSTYPE *nState) | |
| APIRESULT GetNextVideoAnnouncementPlayList (PCONTEXT_HANDLE_TYPE phContext, PGENERIC_TEXT pszVideoAnnouncementName, PGENERIC_TEXT pszPlayerName, VIDEOANNOUNCEMENTSTATUSTYPE *nState) | |
| bool ReplaceVideoAnnouncementPlayer (PCONTEXT_HANDLE_TYPE phContext, PGENERIC_TEXT pszAnnouncementName, PGENERIC_TEXT pszReplacementPlayer) | |
| bool ResumeVideoAnnouncement (PCONTEXT_HANDLE_TYPE phContext) | Starts the PlayerConfiguration Object associated with the next Video Announcement to be played. |
| bool startVideoAnnouncement (PCONTEXT_HANDLE_TYPE phContext, PGENERIC_TEXT pszAnnouncementName) | Starts the specified video announcement. |
| bool StopVideoAnnouncement (PCONTEXT_HANDLE_TYPE phContext, PGENERIC_TEXT pszAnnouncementName) | Stops the specified video announcement. |
| void UpdateSystemState (PCONTEXT_HANDLE_TYPE phContext) | Notifies this Service that a change to the system state has occurred. |

In addition to the CAPI support functions 717, IFE Message Support 718 also handles incoming IFE Messages using its overcast ProcessRequest( ) thread 715. In addition to the standard IFE messages, this class handles the following messages:

| IFE Message | Function Called | Purpose |
|---|---|---|
| Ack or Nak | SetNextState( ) | Sets the next state for the video announcement associated with the Player Configuration Object pPlayerConfig. |
| PlayNextVA | PlayNextAnnouncement( ) | First, determines if the next announcement in the Video Announcement Play list requires installation of a new tape (i.e., Media ID). If so, then an Unsolicited message is transmitted to the GUI and the video announcement cycle is suspended. Once paused, the cycle must be restarted via either StartVideoAnnouncement( ) or ResumeVideoAnnouncement( ). |
| SubProcessStart | InitService( ) | Performs the necessary Inits to get this Service going, including: SetAudioDistributionInfo( ) SetVideoDistributionInfo( ) SetPlayerInfo( ) |

Sales Services control all the functions of In-Flight Service in which goods and entertainment are made available to passengers 117. Sales Services 482–486 are divided into the following Services: GamesService 482, MovieSaleService 483, CatalogService 484, DutyFreeService 486, and DrinkService 485.

The design structure of the Sales Service classes are similar to the Cabin Service classes, except that sales services 482–486 launch many more ProcessRequest( ) threads 715 to be able to service as many passengers 117 as possible. This is not necessary for the Cabin Services because they do not service individual passengers 117; they service the system as a whole.

In addition to its overcast versions of the Service class virtual functions, SalesService Class includes its own virtual definitions within its children classes. This keeps the CAPI consistent in its calls:

| SalesService Virtual Function | Purpose |
| --- | --- |
| virtual bool CancelOrder (ID OrderID) | Abstract to cancel an open order. |
| virtual ID CreateOrder (unsigned char *ProductCode, long Quantity, LRU_NAME Seat, unsigned char *EmployeeNumber, long lProductMap, MONEY AmountDue) | Abstract to Create an order. |
| virtual bool DeliverOrder (ID OrderID, GENERIC_TEXT EmployeeNumber) | Abstract to schedule an Order for Delivery. |
| virtual bool PayForOrder (ID OrderID, MONEY AmountCash, MONEY AmountCredit, GENERIC_TEXT CurrencyCode, GENERIC_TEXT EmployeeNumber, GENERIC_TEXT AccountNumber, GENERIC_TEXT ExpirationDate, GENERIC_TEXT CardName, CREDITCARDS CardType) | Abstract to record the payment for an order. |
| virtual bool RefundOrder (ID OrderID, GENERIC_TEXT EmployeeNumber, bool RevokeProduct) | Abstract to Refund an order. |
| virtual bool StartPipeThreads( ) | Abstract to start the I/O with Transaction Dispatcher. |
| virtual bool StartUpProcessThreads( ) | Abstract to start ProcessRequest( ) threads. |

SalesService also provides several 'generic' sales functions, as shown in the sub-sections that follow.

The following functions are called by CAPI functions. In the Sales Services 482–486, all CAPI calls cause an update message to be built and sent to the applicable seat 123, so that it knows the status of its sales.

| SalesServiceClass Public Functions | Purpose |
| --- | --- |
| bool BackOrderOut( CONTEXTHANDLESTRUCT *pContextHandle, ID OrderID) | Removes the any OrderId records from the database. |
| bool CloseSalesStore( ID StoreID) | Sets the status of the store to Closed. |
| SERVICESTATUSTYPE IsValidCreditCard( char *CardNumber, char *ExpirationDate, double CreditAmount, CONTEXTHANDLESTRUCT ContextHandle) | Verifies the type of card, expiration date and checksum according to the policy of this card type. |
| bool OpenSalesStore( ID StoreID) | Sets the status of the store to Open. |

The following functions are provided to support these IFE Messages for all Sales:

| IFE Message | SalesService Function | Purpose |
| --- | --- | --- |
| BackOut | bool BackOrderOut( CONTEXTHANDLESTRUCT *pContextHandle, ID OrderID) | Removes the order from the database. This is usually due to an error during processing, rather than a customer request. |
| Cancel | bool PrepareCancel( CONTEXTHANDLESTRUCT *pContextHandle, Seat_Message *pSeatMessage) | Cancels an open order upon customer request. |
| CompleteUpdate | void ProcessUpdateRequest( Seat_Message *pMsg, IfeIdType nProcessID, Queue *pTransmitQueue) | Collects revenue and movie or game lock information for a specified seat and returns the data to the SeatNAU. |
| Delivery | bool PrepareDelivery( CONTEXTHANDLESTRUCT | Prepares an order for delivery. |

-continued

| IFE Message | SalesService Function | Purpose |
|---|---|---|
| IncrementalUpdate | *pContextHandle, Seat_Message *pSeatMessage) void ProcessUpdateRequest( ) | See CompleteUpdate message above. |
| Payment | bool PreparePayment( CONTEXTHANDLESTRUCT *pContextHandle, Seat_Message *pSeatMessage, ID *OrderID) | Applies the provided payment information to the specified order. |
| Refund | bool PrepareRefund( CONTEXTHANDLESTRUCT *pContextHandle, Seat_Message *pSeatMessage) | Processes a refund request to return payment(s) to a customer and update inventory (if needed). |

Movie Viewing is a highly variable feature of the system. At the discretion of the airline, and subject to change from time to time, different video offerings are free to certain classes of passengers 117, while others are chargeable. The Movies Sales Service 483 controls this feature. The database tables affected by the VideoAnnouncementService Class are: Policy, Price, VideoMedium, VideoSegment, and VideoUse.

Derived from SalesService class, the MovieServiceClass provides the functions needed to process the sales of movies onboard. Like CabinService class, it provides its own ProcessRequest( ), GetMessage( ), PutMessage( ), etc. functions.

The following overcast functions are called by their corresponding CAPI calls 701: CancelOrder( ), CreateOrder( ), DeliverOrder( ), PayForOrder( ), and RefundOrder( ).

In addition to the CAPI support functions, IFE Message Support 718 also handles incoming IFE Messages using its overcast ProcessRequest( ) thread 715. Currently, all of the supported messages are supported using inline code that includes functions from the generic SalesService class along with the following:

| IFE Message | Function | Purpose |
|---|---|---|
| Order | CreateOrder( ) | See CAPI Support |

Nintendo Video Games are available for passengers to enjoy. To play them, a request must be made and often a payment is required. The Games Rental Service 482 uses the database tables GameDetail, Policy, and Price.

Derived from SalesService class, the GameServiceClass provides the functions needed to process the sales of movies onboard. Like CabinService class, it provides its own ProcessRequest( ) 715, GetMessage( ) 719, PutMessage( ) 720, etc. functions.

The following overcast functions are called by their corresponding CAPI calls: CancelOrder( ), CreateOrder( ), DeliverOrder( ), PayForOrder( ), and RefundOrder( ). See SalesService class for details.

In addition to the CAPI support functions 717, IFE Message Support 718 also handles incoming IFE Messages using its overcast ProcessRequest( ) thread 715. Currently, all of the supported messages are supported using inline code that includes functions from the generic SalesService class along with the following:

| IFE Message | Function | Purpose |
|---|---|---|
| Order | CreateOrder( ) | See CAPI Support |

Package Entertainment is a hybrid of Games and Movies Sales and is maintained within the MoviesSales class. It involves a one-time purchase to all entertainment services onboard. The Package Entertainment Functions may be used to control this capability, but currently the SEAT NAU and CAPI.CPP calls 701 route Package products to either the Game Service or the Movie Service, based on the product code that is used. The PackageDetail table is used to identify the components of a "Package".

Purchasing goods through an electronic catalog is an enhancement provided by the system 100. All functions that control it are kept in the Catalog Sales Service 484. The following tables support the feature: Address, Order_, and ShippingRate.

Ordering drinks through the In-Flight Entertainment system 100 is provided. All functions that control it are kept in the Drinks Sales Service 485. The following table supports the feature: Product Purchasing onboard duty-free goods through the In-Flight Entertainment system 100 is provided. All functions that control it are kept in the Duty Free Sales Service 486. The following tables support the feature: Cart, CartInventory, Commitment, and InventoryLog.

All the application-level database functions are directly accessible via calls to the CAPI functions. These calls are available directly, or via the RPC server. Thus, any service as well as any RPC client can access the CAPI calls.

CAPI.CPP 701 contains the actual commands that interface to the database 493 and perform the application duties (such as CreateOrder( ), GetOrder( ), etc.). CAPI_S.C 702 is the RPC server whose functions are made available to RPC clients (via CAPI_C.C). The server functions use the CAPI.CPP 701 calls to perform application duties. They are used together to make up this set of routines. In addition, the PAT GUI 426 can also access CAPI.CPP via APIINT.CPP and CAPI_S.C in the RPCCLNT.DLL.

The cabin file server database 493 stores the following types of information. This information is utilized by both the cabin file server application and the PAT GUI 426 and is described in greater detail below.

The cabin file server database 493 stores other line replaceable units in the IFE system 100, the products and services available to the passengers 117, revenue due to the sales of products and services, system usage due to the flight attendants and passengers 117, surveys offered to passengers 117, the state of the cabin file server application, video announcements, and global attributes of the IFE system 100.

The cabin file server database 493 provides storage for line replaceable unit information. This enables the cabin file server application to communicate with and/or control these other devices. Some line replaceable unit information is provided by the two data files that are generated by the ACS tool. Line replaceable unit information is stored in the following tables: LRU, Member, PA_Volume, PassengerMap, Set_, and VideoPlayer.

All purchased goods and services, purchase summary information, complimentary service assignments, and movie lockout information is stored on a per passenger basis. This information may be swapped from one seat 123 to another seat to accommodate the occasion when a passenger 117 must be moved during a flight. Each passenger 117 is represented in a PassengerMap table by a single record. This record contains the following pertinent information:

| Field Name | Purpose |
| --- | --- |
| SeatNumber | Passenger seat number |
| PassengerID | Passenger Identifier |

When a passenger 117 changes seats, the SeatNumber fields of the two records involved are swapped. Thus, all the information associated with the passenger 117 is not with the seat 123, but with their PassengerID.

The viewing of any movie and/or the playing of any game can be locked out at any seat, usually at the request of a parent to prevent a child from seeing a certain movie or excessive game play. Each passenger 117 is represented in the PassengerMap table by a single record. This record contains the following pertinent information:

| Field Name | Purpose |
| --- | --- |
| SeatNumber | Passenger seat number |
| MovieLockoutMap | Movie lockout bit map |
| GameLockoutMap | Game lockout bit map |

The MovieLockoutMap and GameLockoutMap fields are bit map fields whose bits correspond to individual movie and game titles, respectively. A movie or game is locked out when it's corresponding bit in this field is set to one.

Loss of communication with a seat display unit 122a is also recorded in the PassengerMap table.

| Field Name | Purpose |
| --- | --- |
| SeatNumber | Passenger seat number |
| SeatCommSuccessCount | # Successful communications |
| SeatCommFailCount | # Unsuccessful communications |

At the beginning of each flight, the SeatCommFailCount and SeatCommSuccessCount fields for each seat are initialized to zero. The SeatCommFailCount field is incremented for each first-time-failure encountered for the corresponding seat 123 (i.e., increment if fail<=success). The SeatCommSuccessCount field is incremented for each first-time-success encountered for the corresponding seat (i.e., increment if success<fail). These rules are enforced through triggers on these database fields. The seat 123 is considered bad if the SeatCommSuccessCount is less than the SeatCommFailCount.

The cabin file server database 493 provides storage for product and service information (e.g., movie titles, viewing times, movie audio languages, game titles, audio entertainment titles, audio channels, etc.). This information is sent by the cabin file server application to the Seat Display Unit 122a for each flight. This enables up-to-date information to be presented to the passengers 117 so they can know which products and services are available to them and at what cost on a per flight basis. Product and Service information is stored in the follow MovieCycle ing tables: AudioDetail, Cart, CartInventory, GameDetail, IFE_Service, InventoryLog, MovieCycleDetail, PackageDetail, Price, Product, ProductEffectivity, Route, ShippingRate, Store, VideoMedium, VideoPlayer, VideoSegment, and VideoUse.

Video Game information is maintained in the GameDetail table, one record per Title/EffectivityDate combination:

| Field Name | Purpose |
| --- | --- |
| Title | The Game Title that is displayed on the seat display unit 122a |
| EffectivityDate | The date on or after which this game information is effective. |
| RouteType | The flight route type during which this game is available. |
| ProductCode | Corresponds to a product code in the Price table for price lookups. |

Video Game information is maintained in the VideoMedium table, one record per video program, one record per MediaTitle:

| Field Name | Purpose |
| --- | --- |
| MediaTitle | The Game Title that is displayed on the seat display unit 122 |
| ProductCode | Corresponds to a product code in the Price table for price lookups. |

The IFE system 100 can inhibit the selectability of these video programs based on the date stored in the EffectivityDate of the VideoSegment table. Movie titles are associated with a specific flight route through the RouteType field of the VideoUse table. Prices are controlled via these fields in the Price table, one per ProductCode/RouteType combination:

| Field Name | Purpose |
| --- | --- |
| ProductCode | Corresponds to Game or Movie Products for sale |
| RouteType | The flight route type during which this price applies |
| FreeMap | Identifies which zones (identified in bitmap) offer this product free of charge |
| Pricing1 | Pricing structure for zone 1 during this flight route |
| Pricing2 | Pricing structure for zone 2 during this flight route |
| Pricing3 | Pricing structure for zone 3 during this flight route |
| Pricing4 | Pricing structure for zone 4 during this flight route |

The database tables used in Movie Cycle are: Member, MovieCycle, Set—, Videomedium, VideoPlayer, VideoSegemnt, and VideoUse.

Video sources such as video cassette player 227 or video reproducers (VR) 227 are assigned to a movie cycle through the Member and Set_tables. Each VCP or VR 227 is stored in the Member field of the Member table. Each movie cycle is stored in the SetName field of the Set_ table. The following movie cycle information is stored in the database.

A movie cycle type is a predefined grouping of video reproducers 227 and movie titles. Movie titles are assigned to video reproducers 227 through the VideoMedium and VideoUse tables. The database 493 can store up to eight different movie cycle types. Information about each movie cycle type is stored in the MovieCycle table. A movie cycle can include from one to fifteen video reproducers 227 (i.e., one to fifteen records of the Member table can be associated with a single movie cycle in the Set_table).

The start time for a movie cycle is stored in the RelativeStartTime field of the MovieCycle table. It is stored in minutes relative to the time since movie cycle initiation at the primary access terminal 225. A between-cycle intermission time is stored in the IntermissionLength field of the MovieCycle table. It is stored in minutes and must exceed the time required to prepare the video reproducer 227 containing the longest playing tape for the next cycle (e.g., tape rewind).

The end time of a movie cycle is the time in which the final viewing of a particular movie cycle ends. The number of viewings that can be scheduled for each movie cycle depends upon the length of a single viewing of the movie cycle and the flight duration. The length of a single viewing of the specific movie cycle can be calculated by adding the InternissionLength field of the MovieCycle table to the SegmentRunTime field of the VideoSegment table for the movie with the longest run time in the specific movie cycle. The expected flight duration is stored in the FlightDuration field of the Flight table.

Information about the state of a particular Video Reproducer 227 is stored in the State field of the VideoPlayer table. This information includes whether or not the video reproducer 227 is operational, whether or not the video reproducer 227 contains a tape, etc.

The number of minutes before the start of each cycle can be calculated using the RelativeStartTime field of the MovieCycle table, the calculated length of the single viewing of the movie cycle, and the IntermissionLength field of the MovieCycle table. The number of minutes before intermission for the current cycle is stored in the RemainingViewingTime of the MovieCycle table.

The number of minutes until the next viewing of a specific movie cycle is stored in the NextViewingTime of the MovieCycle table. The number of minutes remaining on the current viewing of the specific movie cycle is stored in the RemainingViewingTime of the MovieCycle table. The number of minutes elapsed into the current viewing of the specific movie cycle is stored in the ElapsedViewingTime of the MovieCycle table.

A predetermined set of movies and/or games can be assigned to an airline-defined package. Package information is stored in the PackageDetail table.

Audio programming (entertainment) can be distributed on a maximum of 83 mono audio channels, controlled by the AudioDetail table, one record per program. The title of each audio program is stored in the AudioTitle field. The channel of each Audio program is stored in the AudioChannel field.

The VideoMedium table stores up to four different languages for a particular video tape (e.g., movies). These languages are displayed on the display screen 122 for passenger selection. The languages are stored in the LanguageCode1, LanguageCode2, LanguageCode3, and LanguageCode4 fields of the VideoMedium table. Each video tape must have one language designated as the default primary language (i.e., LanguageCode1 must not be empty) but it can have up to three other languages. The relationship of the output configuration of the video players and available language configuration is stored in the VideoPlayer table.

Information about each video reproducer 227 is stored in the VideoPlayer table. In order to "preview" the output of a particular video player on the primary access terminal screen, both primary access terminal tuners (audio and video) must be tuned to the proper channels. Video channel information for each video reproducer 227 is stored in the VideoRF_Channel field. Audio time-slot information is stored in the various time slot fields (i.e., LeftTimeSlot1, RightTimeSlot1, LeftTimeSlot2, etc.).

A video reproducer 227 can be reassigned for use during a video announcement. The MediaType field in the VideoMedium table distinguishes a video announcement from a movie. The VideoUse table tracks which movie or video announcement is assigned to which video reproducer 227. When a video reproducer 227 is reassigned, the PlayerName field in the VideoUse table is modified. The playing status of each video reproducer 227 is stored in the State field of the VideoPlayer table.

Overhead monitors 162 can be assigned to a video source (i.e., video player 227) for movies. This information is stored in the OverheadAudioMap and OverheadVideoMap fields of the MovieCycleDetail table.

The cabin file server database 493 provides storage for revenue information (e.g., credit card data, cash collection data, etc.) concerning the sales of products (e.g., duty free) and services (e.g., movies and games). When a passenger 117 uses a credit card to pay for movies or games, this information must be stored in the database so that it can be transferred to the credit card company. Likewise, when a passenger 117 uses cash to pay for movies or games, this information must be stored in the database 493 so that the IFE system 100 has a record of how much cash should be collected by the flight attendant.

Revenue information is stored in the following tables: Address, BadCreditCards, Commitment, CreditCard, Currency_, Exchange, Flight, Order_, OrderHistory, PassengerMap, PAT_History, Policy, Price, Product, ProductEffectivity, ShippingRate, and ValidCardData.

The purpose of transaction processing is to maintain a record of monetary transactions for service and products. When a flight attendant is involved with an order placed by a passenger 117 (e.g., order refunded, order placed at the PAT, etc.), then the flight attendant ID is stored in the FlightAttendant field of the Order_ table.

Information about each product and service is stored in the Product table. Information about each package of goods or services is stored in the PackageDetail table. The pricing information for each product, service, and package is stored in the Price table. Prices can be altered according to the policy stored in the PolicyDescription field of the Policy table. For example, the policy may specify different service price data for movies and games offered in each seat class zone (e.g., first class) in the aircraft 111.

Services and products may be paid by cash, credit card, or a combination of the two. Cash and credit card payments are respectively stored in the CashTotal and CreditTotal fields of the Order_table. Orders are comprised of sets of products or services of the same type. If the passenger 117 uses a credit card, the credit card information (e.g., passenger name, account number, etc.) is stored in the CreditCard table.

Cash transactions may be represented in up to 30 different currency types. Information about each currency type is stored in the Currency_ table. Each aircraft 111 has associated with it a base currency that is stored in the BaseCurrencyCode field of the Aircraft table.

Passengers 117 may pay for products and services using any single card from the credit card types accepted by the airline. Information about each valid credit card type is stored in the ValidCardData table. The credit card payment made on a given order is stored in the CreditTotal field of the Order_ table. This payment is recorded in the base currency type as specified in the BaseCurrencyCode field of the Aircraft table.

Credit card numbers are validated against the standard number format and range for that particular credit card type. This standard number format is stored in the ValidationPattern field of the ValidCardData table. Also, credit card transactions are validated against the credit limit specified by the passenger 117 for that particular credit card type. This credit limit is stored in the CreditLimit field of the ValidCardData table. In addition, each credit card is compared against the credit card numbers in the BadCreditCards table. This table may contain up to 10,000 records, for example.

All transactions (i.e., service orders, product orders) processed by the system are stored in the Order_ table. The state of an order (open, paid, canceled, refunded) is stored in the State field of the Order_ table. For refunded orders, a duplicate order record is created with the AmountDue field, the CashTotal field, the CreditTotal field, and the Quantity field all set to negative amounts. Orders that are placed at the primary access terminal 225 also have a corresponding entry in the PAT_History table. A new record is generated for the OrderHistory table for each change to the State field or the Delivered field.

The following information is maintained for each order:

| Table | Field | Description |
| --- | --- | --- |
| PassengerMap | SeatNumber | seat number |
| Product | ProductDescription | service or product ordered |
| Order_ | Quantity | quantity of service or product ordered |
| CreditCard | all fields | credit card information for credit card orders |
| Price | UnitPrice | unit cost of service or product ordered |
| Order_ | AmountDue | total cost of service or product ordered |

Prior to shutdown of the IFE system 100, a message is displayed on the primary access terminal 225 if the database 493 contains any open transactions from the current flight. The number of open orders for the current flight is always displayed in the status window on the primary access terminal 225. This is calculated by counting each order in the Order_ table (for the current flight) whose associated State field is set to "Open".

A running tabulation of all expenses incurred for each passenger during the current flight can be displayed on the seat display unit 122*a* or seat display 122. Each order is associated with a specific passenger 117 via the PassengerID field of the Order_ table. The total cost of each order is stored in the AmountDue field of the Order_ table. Total expenses incurred for a particular passenger 117 is the sum of the total cost of each order placed by the specific passenger 117.

The following subsections describe selected database interactions that occur when the corresponding functions in the SalesServiceClass classes are executed.

Upon cancellation of any cash passenger product and/or service order that has not been paid, the State field of the Order_ table is changed from "Open" to "Cancelled". If the service (i.e., video game or movie) is revoked from the passenger 117, then the ProductRevoked field in the Order_ table is set to TRUE.

A list of orders can be generated for which cash collection is to be made in-flight. Information related to each order is as follows:

| Table | Field | Description |
| --- | --- | --- |
| PassengerMap | SeatNumber | seat number |
| Product | ProductDescription | product or service ordered |
| Order_ | AmountDue | amount due |

Orders can be listed by service type and/or by general service zone. The service type of an order (i.e., game, movie, package) is stored in the ServiceType field of the Product table. The general service zone of the passenger 117 that placed the order is stored in the SetName field of the Set_ table.

A list of orders can be generated for which delivery is to be made in-flight. Information related to each order is as indicated above. Orders can be listed by service type and/or by general service zone.

Complimentary service for movies, games, and/or entertainment packages may be offered to individual passengers or to the entire aircraft 111. For individual passengers, an order is placed in the Order_ table for each passenger 117 receiving a service that is complimentary, the PayCurrencyCode field is set to "Free" and the State field is set to "Paid". The order is then associated with the record in the PassengerMap table where the SeatNumber corresponds to the specific passenger 117.

To provide complimentary service for the entire aircraft 111, all entertainment (movies, games, packages) must be complimentary. A single order is placed in the Order_ table: The PayCurrencyCode field is set to "Free" and the State field is set to "Paid". The order is then associated with the record in the PassengerMap table where the SeatNumber field is set to "Allseats". The FreeServicesMode field of the Aircraft table is set to TRUE.

The system 100 can support up to thirty forms of currency. Currency information is stored in the Currency_ table. Exchange rate information is stored in the Exchange table. Currency exchange rate calculations can be performed that support a display with up to four decimal places. The number of decimal places to display is stored in the DisplayPrecision field of the Currency_ table.

Each currency is associated with a Policy table entry to specify how to convert from one currency to another. For example, the policy for converting to US dollars might be to round to the nearest penny, or nearest whole dollar if the airline does not wish to deal with change. The policy actually points to the applicable stored procedure to perform this function.

The cabin file server database 493 provides storage for system usage by both the flight attendants and passengers 117.

The cabin file server database 493 keeps track of each time the flight attendant logs on and off. Additionally, the flight attendants may also enter flight identification information (e.g., flight number, destination, etc.) which is stored in the cabin file server database 493. Flight attendant activity is stored in the following tables: Access, Flight, and Personnel.

Each time a user (i.e., employee) logs in to the IFE system 100, this login information is stored in the Access table. It is also added to the Personnel table (once for each user) if a predefined set of valid users does not already exist. If a predefined set of valid users is preloaded into the Personnel table, then each user that tries to login can be validated against this pre-defined set of valid users.

An access level for each user is stored in the AccessLevel field of the Personnel table. This access level can be used to direct the user's access throughout the system 100, effectively controlling what they can see or do. For example, a Service Person should not have access to Revenue Modification functions.

When users are required to insert a magnetically encoded card during the logon process, the card is encoded with the user ID (EmployeeNumber field), pin number (PIN field), and grade level (AccessLevel). This information is stored in the Access table for each login. This information is also added to the Personnel table (once for each user) if a pre-defined set of valid users does not already exist. If a predefined set of valid users is preloaded into the Personnel table, then each user that tries to login can be validated against this predefined set of valid users.

In the case where the card read is not successful, the user must manually enter the user ID, pin number, and grade level. This information is stored in the Access table for each login. This information is also added to the Personnel table (once for each user) if a predefined set of valid users does not already exist. If a predefined set of valid users is preloaded into the Personnel table, then each user that tries to login can be validated against this predefined set of valid users.

The cabin file server database 493 also logs system activity (i.e., passenger usage of the system 100 from the seat display unit standpoint). The database 493 stores how much time each seat spent on each movie, on each game, and on each audio selection. This allows the airline to see how passengers 117 are using the system 100.

Passenger activity is stored in the following tables: PassengerStatistics.

The following passenger statistic information is stored in the database 493:

The cabin file server database 493 provides storage of passenger survey information. Passengers 117 at each seat 123 can elect to participate in the survey. The database 493 records each result (i.e., passenger's answer) to each survey taken so that this information can be made available to the airline. Passenger survey information is stored in the following tables: Survey, SurveyAnswer, SurveyAnswerKey, and SurveyQuestion.

The results of each survey taken (or same survey taken multiple times) by each passenger are stored in the SurveyAnswer table. Survey results may be off-loaded using the Data Offload approach discussed above. The name of the survey is stored in the Survey table. The corresponding questions contained in the survey are stored in the SurveyQuestion table. All possible answers (i.e., six multiple choice answers) for each survey question are stored in the SurveyAnswerKey table.

The cabin file server database 493 provides storage for application state information. This is useful in cases where there is an interruption of aircraft power while the application is running. Storing this information in the database 493 allows the system to resume operation where it left off. There may be over 100 processes running at any given time. Each process can store as much information as needed in the Data field of the PowerRecovery table in order for the process to know where it should continue once power is resumed. The Data field is defined as a Binary Large OBject (BLOB).

The state (e.g., start, pause, stop, init) of the IFE system 100 is stored in the IFE_State field of the Aircraft table. Products and/or services ordered by the passenger 117 are stored in the Order_ table (as well as at the seat display unit 122a for backup). This enables the IFE system 100 to start from where it left off once passenger entertainment and interactive services are resumed.

The cabin file server database 493 provides storage for Video Announcement information. This information may include attributes such as video announcement titles, overhead audio, overhead video, and whether in-seat displays 122 are overridden. Video Announcement information is stored in the following tables: VA_Distribution, VideoMedium, VideoSegment, VideoPlayer, and VideoUse.

| Table(s) | Field(s) | Definition or Comment. |
| --- | --- | --- |
| PassengerMap | SeatNumber PassengerID | Each passenger is associated with their seat number. |
| Member Set_ | Member SetName | Each seat number is associated with one class (e.g., first class, coach, etc.). The seat number is stored in the Member field of the Member table. The class is stored in the SetName field of the Set_ table. |
| PassengerStatistics | StatImage | Time spent viewing movies by title: Each movie watched and length of time spent watching each movie is stored here as a Binary Large OBject (BLOB) which can hold up to 2GBytes of data if disk space allows. |
| PassengerStatistics | StatImage | Time spent listening to entertainment audio by title: Each audio entertainment listened to and the length of time spent listening to each audio entertainment is additionally stored here (BLOB). |
| PassengerStatistics | StatImage | Time spent playing games by title: Each game played and length of time spent playing each game is additionally stored in the here (BLOB). |

Video Announcement information is stored in the Video-Medium table. Examples include boarding announcements, safety announcements, short subject programs, etc. Each Video Announcement has more specific information stored in the VideoSegment table.

Attributes for each Video Announcement are stored in the VA_Distribution table. Attributes include, but are not limited to: if the announcement is heard on the overhead audio and in which zone (OverheadAudioMap field, where each bit in the field represents a zone), if the announcement is viewed on the overhead video and in which zone (OverheadVideoMap field, where each bit in the field represents a zone), if the announcement (audio and video) overrides whatever is currently being viewed at the seat (InseatOverrideMap field, where each bit in the field represents a zone), or be available for in-seat viewing (default) and in which zone.

Video Announcements (audio and video) are available for in-seat viewing (default). This means that the passenger 117 has the option to select the video channel on which the video announcement is being played. Video Announcements can also be set to override in-seat viewing. In this case, the IFE system 100 causes the overridden in-seat displays in a specified zone to select the video channel on which the video announcement is being played, and the passenger 117 is unable to turn off the in-seat video display 122.

Each Video Announcement is assigned to a particular source (i.e., video player) through the VideoUse table. Attributes for each video player are stored in the VideoPlayer table. The default volume level for the PA speakers is stored in the DefaultPA_AudioLevel field of the Aircraft table. The volume level for the PA speakers can be different for each zone. This is stored in the AudioLevel field in the PA_Volume table.

Overhead monitors 162 can be assigned to a video source (i.e., video player 227) for video announcements. This information is stored in the OverheadAudioMap and OverheadVideoMap fields of the VA_Distribution table.

The cabin file server database 493 provides storage for global attribute information (i.e., information that can be accessed by any service). Examples may include the current state of the IFE system 100, the base currency, and the default PA audio. IFE system global attribute information is stored in the following tables: Aircraft, Airline, Airport, Country, Flight, and Route.

The following flight information is pre-loaded and stored in the Route table, one record per known route:

| Field | Description |
| --- | --- |
| FlightNumber | flight number assigned to this flight leg |
| FlightDuration | estimated flight duration in minutes |
| DepartureAirport | departure airport code |
| ArrivalAirport | arrival airport code |
| RouteType | route type to determine which services are available on this route |

When the flight attendant enters a FlightNumber and RouteType at the primary access terminal 225, the corresponding flight information (i.e., FlightDuration, ArrivalAirport, and DepartureAirport) is found in the Route table and presented at the primary access terminal 225 and stored in the current record of the Flight table. The DepartureDate and DepartureTime are determined based on when the weight-off-wheels signal is received. This date and time is then stored in the WeightOffWheelTime field of the Flight table to calculate movie cycle and other sales times.

The following IFE data is configurable in order to tailor the IFE functionality for a particular airline. This tailoring is done using the IFE Tools software.

(a) IFE function data configuration ID: Version field of the DB_Version table.

(b) For each video game: (1) The cost of each video game is specified in the UnitPrice field of the Price table. This cost can be altered based on the PolicyDescription field of the Policy table. A video game can be offered for free in a given zone by setting the associated bit in the FreeMap field of the Price table to 1. (2) The type of video game is stored in the GameType field of the GameDetail table. (3) The activation date is stored in the EffectivityDate field of the GameDetail table.

(c) For each movie: (1) The cost of each movie is specified in the UnitPrice field of the Price table. This cost can be altered based on the PolicyDescription field of the Policy table. A movie can be offered for free in a given zone by setting the associated bit in the FreeMap field of the Price table to one. (2) The length of each movie is stored in the SegmentRunTime field of the VideoSegment table. (3) The activation date is stored in the EffectitvityDate field of the VideoUse table.

(d) For each aircraft seat class zone: whether video games and movies are pay or free is addressed in items (b) and (c) above.

(e) For each aircraft seat class zone: which passenger survey is available.

(f) Logical seat groups (e.g., general service zones, duty free zones) are specified in the Member and Set_ tables. Seat numbers are stored in the Member field of the Member table. Zones are stored in the SetType field of the Set_ table.

(g) For each route type: Titles to appear in the video game menu, audio menu, and movie menu of the seat display unit 122a. Titles to appear in the video game menu can be limited according to route type. The titles are stored in the Title field of the GameDetail table. The route type is stored in the RouteType field of the GameDetail table. Titles to appear in the audio menu can be limited according to route type. The titles are stored in the AudioTitle field of the AudioDetail table. The route type is stored in the RouteType field of the AudioDetail table. Titles to appear in the movie menu can be limited according to route type. The titles are stored in the MediaTitle field of the VideoMedium table. The route type is stored in the RouteType field of the VideoUse table.

(h) Currency exchange rates are stored in the ExchangeRate field of the Exchange table.

(i) The primary access terminal display currency is stored in the PAT_DisplayCurrency field of the Aircraft table.

(j) For each flight number: Arrival/departure city pairs, flight duration and route type. Each flight number is associated with a specific route. The route is specified by the FlightNumber and Leg fields of the Route table. The arrival/departure city pairs for a given route is respectively stored in the ArrivalAirport and DepartureAirport fields of the Route table. The scheduled flight duration for a given route is stored in the FlightDuration field of the Route table. The calculated flight duration (e.g., based on tail wind, etc.) for a given route is stored in the FlightDuration field of the Flight table. The route type of a given route is stored in the RouteType field of the Route table.

(k) Movie cycle attributes are specified in the Cabin File Server Executive Extensions Software Design Document.

(l) Video announcement titles are stored in the MediaTitle field of the VideoMedium table. Video announcement lengths are stored in the SegmentRunTime field of the VideoSegment table.

(m) The video announcement cabin speaker default volume is stored in the DefaultPA_AudioLevel field in the Aircraft table. This volume cannot be changed during a flight. During database initialization, a record for the PA_Volume table is created for every PA zone (as specified by the LRU table). The AudioLevel field in each record of the PA_Volume table is initialized to the DefaultPA_AudioLevel. The video announcement cabin speaker default volume can then be modified for each PA zone (e.g., passengers in the PA zone over the engine may need a louder default volume). The new volume is stored in the AudioLevel field of the PA_Volume table.

(n) The video reproducer 227 assigned to a particular video announcement is stored in the PlayerName field of the VideoUse table. The video reproducer 229 assigned to a particular movie is stored in the PlayerName field of the VideoUse table.

(o) Product pricing data is stored in the UnitPrice field of the Price table. Product effectivity data is stored in the EffectivityDate of the ProductEffectivity table.

(p) Accepted credit card types (i.e., Visa, Discover, etc.) are stored in the CardName field of the ValidCardData table. Accepted charge limits are stored in the CreditLimit field of the ValidCardData table. This charge limit is defined by the airline.

(q) The airline name is stored in the AirlineName field of the Airline table.

(r) The number of movies in a particular package is stored in the MovieQuantity field of the PackageDetail table. The hours of game play is stored in the GameQuantity field of the PackageDetail table. Additional package details (e.g., which games/movies are in the package) are also stored in the PackageDetail table.

The primary access terminal 225 must perform certain coordinating functions prior to being able to operate with the cabin file server 268 successfully. A System Initializer establishes the cabin file server hard drives as shared devices with the primary access terminal 225, synchronizes its system date and time with the date and time of the cabin file server 268, and turns on the LCD's backlight so the user can see what's going on. The System Initializer, INITSYS.EXE, performs these functions at boot time. This program includes the source file INITSYS.CPP.

Primary access terminal Stand Alone Utilities are PAT-resident utilities that are needed between runtimes (i.e., between flights). They are used by Service Personnel to manage data and system behavior.

A Data Offloader is provides so that specific data is offloaded from the aircraft 111 for the purpose of revenue collection and system performance evaluation. At the end of each flight, the NT event logs are archived on the cabin file server hard disk. Passenger Statistics information, passenger survey results, and Transaction records are stored in the cabin file server database 493 for later retrieval.

This database information is stored for up to forty flight legs. The number of flight legs is stored in the FlightID field of the Flight table. FlightID is simply a counter which is incremented after each flight. The Data Offload approach discussed previously describes the Data Archival, Data Offload and Disk Space Management processes.

The following paragraphs describe the additional functionality associated with the Data Offload process, in the utility OLUTIL.EXE.

The flight number for a test flight always begins with a "9". This enables a custom trigger, FLIGHT_ITRIG.SQL, to purge just test flight data (i.e., flights beginning with a "9") from the database at the beginning of a subsequent flight. The purge is automatically performed at the beginning of the next flight rather than at the end of the test flight so that the information can remain in the database long enough to offload the data for trouble-shooting purposes but not so long that credit card data may be compromised. However, if the Data Offload process is manually initiated at the end of the test flight, then the test flight data is purged at this time.

Archived data (i.e., previous flight leg) can be off-loaded on a per-flight basis. All credit card transaction data is encrypted using PKZIP.EXE (an industry-standard third-party file-compression utility). PKZIP was chosen because it provides excellent file compression ratios and allows for password encryption of the compressed data.

At the start of each flight, the Offload field in the Flight table for the specific flight is initialized to one. Once a particular flight has been off-loaded, the Offload field in the Flight table is set to zero (i.e., flight data is tagged). It is possible to automatically specify the off-load of all non-tagged data (i.e., all flights with Offload field set to one). It is also possible to manually specify the off-load of data for a specific flight.

An operator is able to disable the Watchdog driver 410. DISWDOG.EXE is used to disable the hardware Watchdog by issuing an IOCTL Disable command to the Watchdog Driver 410.

Cabin file server Runtime Utilities 425 are programs that are used once per flight, either at the beginning or at the end. As a result, they are part of the application and are maintained along with the cabin file server Executive Extensions.

SDU_BLDR.EXE, the seat display unit database builder, is used to develop a download file to be downloaded to all seats 117. The download file is comprised of product and entertainment information that is subject to change based on the contents of the cabin file server database 493.

When flight information is entered by the Flight Attendants at the primary access terminal 225, the SDU_BLDR on the cabin file server 268 is initiated. The GUI 426 calls SDU Builder via the CAPI to extract the information from the cabin file server database 493 that is pertinent to the current flight. This information is used to create the download file (sdu_data.dnl) that is sent to each seat 123 on the aircraft 111.

The purpose of sdu_data.dnl is to provide current information (i.e., entertainment, pricing, etc.) from the database 493 to the passenger seats 123. The creation of the download file triggers the Seat NAU to notify each seat that a new download file exists. Each seat then requests the file and applies the portion of the download file that is applicable to their programming (i.e., first class seats don't read the information in the download file applicable to coach seats 123).

CFSLOGS.EXE is the main C++ executable associated with the archival of the event logs. It runs on the cabin file server 268 and is initiated during the data archive process. Cfslogs.exe is responsible for dumping the NT event logs of the cabin file server 268 to the hard disk using a unique archive file name. This file name is passed to cfslogs.exe as an input parameter. DUMP_POS.EXE is the main C++ executable associated with offloading Point of Sales data. It runs on the cabin file server 268 and is initiated during the data offload process. Dump_pos.exe is responsible for writ ing the archived database information for a given flight to the various FLTSALES.CSV files on the hard disk. The flight ID is passed to dump_pos.exe as an input parameter.

PARCHIVE.EXE is the main C++ executable associated with the purging of archive data. It runs on the cabin file server 268 and is initiated as part of the effort to manage the disk space on the cabin file server 268. Parchive.exe is responsible for deleting both the Archive file and the Offload file from the hard drive. Both of these files are passed to parchive.exe as input parameters.

DUMPSTAT.EXE is the main C++ executable associated with offloading Passenger Statistic data. It runs on the cabin file server 268 and is initiated during the data offload process. Dumpstat.exe is responsible for writing the archived database information for a given flight to the paxstats.csv files on the hard disk. The flight ID is passed to dumpstat.exe as an input parameter.

Common Software Libraries

The following common software libraries of functions and utilities are used throughout the primary access terminal and cabin file server applications.

The Database Utilities, DBUTILS.CPP are commonly used by all database applications. They use the SQL commands (recognizable as starting with db . . . ( ), such as dbexit( ), dbresults( ), etc.):

| Function | Purpose |
| --- | --- |
| CheckResults( ) | Continuously loops calling dbresults( ) to get the results of the prior SQL call for this process until they have all been obtained. If there are errors, it displays function text for tracing. |
| UpdateStats( ) | Updates the statistics of the given table for the given process. |
| FailureExit( ) | Standard exit function, displays the error before calling dbexit( ). |
| TransactionLogControl( ) | |
| SelectIntoControl( ) | |

The event logging functions, EVENTLOG.CPP, RETRYSYS.CPP, are used exclusively in SYSMON.EXE and POWERDWN.EXE. They each call EventLog's ProblemReport( ) subroutine (which is recursive!) which calls EventLog::WriteHAILog( ) which eventually uses NT's ReportEvent( ) to record the information.

The set SQL Error and Message Handlers, HANDLERS.CPP includes two routines used by functions such as ARCHIVE.CPP CREATEDB.CPP DUMP_POS.CPP, INITDB.CPP and SUD_BLDR.CPP to handle SQL informational and error messages: err_handler( ) and msg_handler( ). These functions are identified to the SQL code using dberrhandle(err_handler) and dbmsghandle(msg_handler) respectively.

| Function | Purpose |
| --- | --- |
| int err_handler( input DBPROCESS *dbproc, input int severity, input int dberr, input int oserr, input char *dberrstr, input char *oserrstr) | Builds a DB-LIBRARY error message containing both a database error (dberr and dberrstr) and an operating system error (oserr and oserrstr), echoes it to stdout and (if oserr is not DBNOERR) uses UtilityClass::LogEvent( ) to put this info into the event log. See UtilityClass::LogEvent( ) for severity definition. Returns INT_EXIT if the database process pointer dbproc is no good. Otherwise, INT_CANCEL. |
| int msg_handler( input DBPROCESS *dbproc input DBINT msgno, input int msgstate input int severity, input char *msgtext) | If the severity is greater than zero, it logs it to the event log, otherwise it simply builds and displays the message. It always returns ZERO. |

Queues include QUEUE.CPP and QPAIR.CPP. A Queue is a dynamic list of pointers to elements of any type which must wait for sequential processing such as an output queue. The actual elements are not stored in the Queue. A QPair is a set of two Queues used for related purposes, for example one for Input and one for Output associated with a named pipe pair or a serial port.

This class is used to create and maintain all Queues in the Control Center software to buffer message traffic. The first or top or head position of the queue is identified as element number zero (0).

Queues made with this class are considered to be "thread safe". That is, multiple threads can access these queues concurrently. These queues generate a signal when data is written to them. One can choose whether the queue should signal with only an event handle or with a semaphore as well. This class allows one to create and control the size of (or number of elements in) your queue, move elements in and out of the queue, and allow multiple users or readers to manipulate a single queue.

The following member functions are used to create and control the size of (or number of elements in) the queues.

| Queue class Function | Purpose |
|---|---|
| The Constructors:<br>Queue( ),<br>Queue (ULONG Size) | Initialize the queue. If no Size (or if Size = 0) is given, then the Queue is not delimited and can grow to the capacity of the system (defined by constant LONG_MAX). If Size is given, the queue is limited to contain no more than Size elements by having all Put functions display "Queue Overflow" to stdout and returning TRUE when an attempt is made to exceed the limit. |
| short<br>GetCount( ) | Returns the number of elements currently in the queue. |
| ULONG<br>GetSize( ) | Returns the preset maximum size of the queue. If the value returned is zero, the size is not delimited. |
| bool<br>SetSize<br>(ULONG Size) | Allows one to increase the maximum size of the queue. Returns FALSE if Queue was already defined as undelimited or if the new size is less than the previous size. |

The Selective Style member functions are used when the priority of the queue elements is controlled.

| Queue class Function | Purpose |
|---|---|
| void *<br>GetNth(<br>long N) | Removes and returns the Nth element from the queue. Returns NULL if the Nth element does not exist. If the queue is already locked, it waits for permission to access the queue. Therefore, it is important to lock( ) the queue prior to determining the Nth element (with PeekNth( ), for example) and then retrieving it with GetNth( ). |
| void *<br>PeekNth(<br>long N) | Returns the contents of the Nth element of the list but doesn't remove it from the queue. If none, returns NULL. |
| bool<br>PutNth(<br>void *Element,<br>long N) | Inserts the Element's pointer into the queue at position N. If N+1 is greater than the current number of elements on the queue, then the Element's pointer is placed at the end of the queue instead of at N. Returns FALSE if. |

The FIFO Style member functions are used when a First-In-First-Out FIFO style queue is desired.

| Queue class Function | Purpose |
|---|---|
| void *<br>Get( ) | Returns the element at the top of the list. If none, returns NULL. Same as GetNth(0). |
| void *<br>Peek( ) | Returns the contents of the element at the top of the list, but doesn't remove it from the queue. If none, returns NULL. Same as PeekNth(0). |
| bool<br>Put(<br>void *Element) | Places the Element's pointer at the end of the queue. Same as PutNth(Element, −1). Returns FALSE if |
| bool<br>PutHead(<br>void *Element) | Places Element's pointer at the head or top of the queue. Same as PutNth(Element, 0). Returns FALSE if |

Allow multiple users or readers to manipulate a single queue.

| Queue class Function | Purpose |
| --- | --- |
| Constructor:<br><br>Queue (<br>ULONG Size,<br>bool useSemaphore =<br>TRUE) | Set useSemaphore = TRUE if the queue is going to be referenced by more than one 'reader' or thread. Otherwise, set it to FALSE or don't supply it. When set to TRUE, the constructor calls CreateSemaphore to establish the semaphore handle, and assigns a Resource Count equal to the Size, which means that if you specify a queue of 10, at most 10 threads can access it at once. |
| const HANDLE<br>getEventHandle( ) | Returns the signal handle for use primarily with WaitForSingleObject( ) to halt a thread until something is placed in the queue. |
| const HANDLE<br>getSemaphoreHandle( ) | Returns the semaphore handle for use primarily with WaitForSingleObject( ) to halt a thread until something is placed in the queue. Use only when useSemaphore is TRUE in constructor. |
| void<br>Lock( ) | Locks the queue so other 'readers' can't alter its contents. If the queue is already locked (in use), this call waits until it is no longer locked. The Queue member functions each perform a lock and unlock when they update the queue, but there are times when you need to perform several queue functions while keeping total control of the queue. In this case, use the Lock( ) function. |
| void<br>Unlock( ) | Releases control of the queue so others can add or remove elements. Use only if you previously used Lock( ) to isolate queue access. |

The short class Queue Pairs maintains a set of two queues that are related. Typically one is used for Input and one is used for Output. Their names, however, are Lefty and Righty.

| Queue class Function | Purpose |
| --- | --- |
| The Constructors:<br><br>Qpair(<br>ULONG Size,<br>bool bUseSemaphore),<br>Qpair(<br>ULONG Size) | These constructors simply construct the two Queues, Lefty and Righty. |

-continued

| Queue class Function | Purpose |
| --- | --- |
| Queue& Left( ) | Returns a pointer to Queue Lefty. |
| Queue& Right( ) | Returns a pointer to Queue Righty. |

The RpcClientClass, RPCCLNTC.CPP contains all of the functionality needed for an application to communicate with the Fileserver RPC Server via the Cabin Application Programming Interface (CAPI). To use it, the Create( ) call should be executed. Then a call to GetContextHandle( ) provides the I/O handle for communications.

| RpcClientClass class Function | Purpose |
| --- | --- |
| bool<br>Create( ) | Creates and initializes an RPC Interface channel between an application and the RPC Server process using RpcNsBindingImportBegin( ).<br>Returns TRUE if successful, FALSE otherwise. |
| bool<br>Delete( ) | Terminates the RPC Session with the server process.<br>Returns TRUE if successful, FALSE otherwise. |
| bool<br>GetContextHandle(<br>output PPCONTEXT_HANDLE_TYPE<br>pphContext) | Retrieves a database context handle from the server process via an RPC channel previously opened using Create( ). Calls the Capi_c.c InitializeInterface( ) function to connect to RPC. Returns FALSE if none. |
| bool<br>ReleaseContextHandle( | Returns a database context handle which was previously obtained by a call |

-continued

| RpcClientClass class Function | Purpose |
| --- | --- |
| output PCONTEXT_HANDLE_TYPE phContext) | to GetContextHandle( ). Returns FALSE if none. |

The System Monitor Interface, SYSMNNTR.CPP is a set of routines that is used by any process that is under the control of SYSMON.EXE for shutdown purposes. This Constructors class has three constructors available for use: SysmonInterfaceClass( ) is not used, SysmonInterfaceClass (ParentProcess_id, EventHandle), SysmonInterfaceClass (ParentProcess_id, MessageQueue) SysmonInterfaceClass (ParentProcess_id).

ParentProcess_id is used to identify the process in all communications with SysMon (see WriteToSysMon( )). The other parameters are used to control the method of shutdown for the given process. If the process prefers to hear about it using an event, it can pass the EventHandle to be used when shutdown is needed. If the process prefers to hear about it via a message queue, it can pass the Queue ID in.

Each Initialization process must first create a SysmonInterfaceClass object and then register communications with Sysmon using SysmonInterfaceClass::Register( ). This calls ConnectSystemMonitor( ) to create handles to two Named Pipes (input and output) to use to talk to the System Monitor. It then creates an IFE_Message and sends it to Sysmon via WriteToSysMon( ). Finally, Register( ) launches two threads to manage the named pipes with CreateSystemMonitorThreads( ).

CreateSystemMonitorThreads( ) launches two communication threads who in turn call the actual I/O function: InputThreadInterface( ) calls ReadFromSysMon( ), OutputThreadInterface( ) calls HeartBeatSysMon( ). ReadFromSysMon( ) continuously reads from Sysmon, calling ProcessRequest( ) when any message is received. HeartBeatSysMon( ) continuously issues a pulse message to Sysmon, to let it know that this process is alive.

WriteToSysMon( ) is used to send any message to the System Monitor via the output named pipe. It uses IFE_Message::PutData( ) to do it.

Anytime a message is received in ReadFromSysMon( ), ProcessRequest( ) is called. This simply parses out any ProcessStop message and calls Shutdown( ) to continue. All other messages are ignored.

Shutdown( ) cares about how this class was constructed. If an event handle was given, it sets this event to announce the shutdown to the host process. If a message queue was given, it forwards the ProcessStop message to the queue so the host can shutdown in a more orderly fashion. If neither of these was given, it halts the process with a ProcessExit( ).

A Timer Utilities file, TMDCLLBC.CPP, contains a class timedCallback that is used to schedule activity in regular intervals. The user first creates a function to be called when a 'timeout' occurs by declaring it as long (*timedCallbackFun) (timedCallback *Entry); This function must return the number of ticks to wait until the next call should be invoked, or Zero to stop the re-queueing.

| Public timedCallback Functions | Purpose |
| --- | --- |
| timedCallback( ) | Constructs a callback using a default 'do-nothing' function. This allows one to create arrays of timedCallback objects and define the callback function later by use of member setFun( ). |
| timedCallback( input timedCallbackFun SomeFun) | Constructs a real-time clock callback to be used for later calls to queue( ) and cancel( ). SomeFun is the user-defined function to call when a timeout occurs. |
| ~timedCallback( ) | Cancels the callback before it goes out of scope. |
| void cancel( ) int isQueued( ) | Cancels 'this' callback if it is queued, but retains the object for subsequent queueing. Returns 1 if 'this' callback is queued, 0 otherwise. |
| void queue(input long Delta) | Queues the callback to be called after the specified number of invocations of tick( ). Delta == 0 cancels the callback. Queue( ) is automatically called each time the user's timedCallbackFunction is invoked. queue( ) can be used to change the interval of an already queued callback. |
| void setFun(input timedCallbackFun SomeFun) | Redefines the callback function to be used for 'this' callback as what's contained in SomeFun. |
| static void tick( ) | Advances the time by one tick. As a result, queued callbacks may time-out and are then invoked from within tick( ). Normally not used externally, this is maintained by the timer thread that was launched by the constructor. |

The General Utilities include UTLTYCLS.CPP. The UtilityClass Class provides a general interface to the following generic utility functions. Many of these functions are declared as STATIC, which means that you can use them without creating an object of UtilityClass, just by calling them with the class name in front, such as UtilityClass::bin2Ascii(0x2f, &Hi, &Lo).

| UtilityClass Public Function | Purpose |
|---|---|
| static void bin2Ascii (input unsigned char Hex, output unsigned char*Hi, output unsigned char*Lo) | Converts a binary hex value into a two byte ASCII character representation. e.g., Hex = 0x2F, *Hi = '2' *Lo = 'F'. |
| unsigned char BuildNetworkAddress (input unsigned char *cpBuffer, output unsigned char *cpNetworkAddress, input DeviceHandlerType DeviceHandler) | Receives a character buffer of input data and creates a network address, returning it as an unsigned character. DeviceHandler defines whether the data is from ARCNET or RS-422. The length of the address is returned. If ZERO, no address was made. |
| bool ConnectNetworkResource (input char *LocalName, input char *RemoteName) | Connects the Windows NT Network Resource specified by RemoteName to the drive specified by LocalName. Returns FALSE if any errors are encountered and connect fails. |
| static unsigned short ConvertAsciiToBin (input unsigned char*byAscii) | Takes 2 ASCII characters and returns them as unsigned binary. e.g., by ASCII = "2F", returns 0x2F. |
| static unsigned char ConvertAsciiToBin (unsigned char AsciiChar) | Takes a single ASCII char and returns a single unsigned binary char. e.g., AsciiChar = 'F', returns 0x0F. |
| static bool CreateIfeIdConversionMap( ) | Initializes the IfeIdMap data structure. For each entry in the IfeId Type definition, a corresponding text string is written to the map. This data structure is used in conversions between process enumeration values and text values. Always returns TRUE. |
| static bool CreateIfeFuncConversionMap( ) | Initializes the IfeFuncMap data structure. For each entry in the IfeFunction Type definition, a corresponding text string is written to the map. This data structure is used in conversions between process enumeration values and text values. Always returns TRUE. |
| bool GetFirstRegistryValue (input char *pszKeyName, output char *pszValueName, input LPDWORD dwValueNameLen, output LPDWORD lpdwType, output LPBYTE lpbData, output LPDWORD lpcbData) | Retrieves the name and data associated with the first value contained in the NT Registry that matches the registry keyname. Returns FALSE if unsuccessful. |
| bool GetNextRegistryValue (output char *pszValueName, output LPDWORD dwValueNameLen, output LPDWORD lpdwType, output LPBYTE lpbData, output LPDWORD lpcbData) | After calling GetFirstRegistryValue( ), this function can be called to retrieve subsequent registry value names and data. Returns FALSE if unsuccessful. |
| bool GetRegistryDWord (input char *lpszKeyName, input char *lpszValueName, output DWORD *lpdwValue) | Retrieves a DWORD value from the Registry into lpdwValue. Returns FALSE if unsuccessful. |
| bool GetRegistryInfo (output CStringArray *RegValueArray) | Retrieves all registry information by iterating through the registry key values, returning it in an array of strings. Returns FALSE if unsuccessful. |
| bool GetRegistryString | Retrieves a string in lpbData corresponding to the input parameter ValueName. |

-continued

| UtilityClass Public Function | Purpose |
|---|---|
| (input char *lpszValueName, output LPBYTE lpbData, output LPDWORD lpcbData) | Returns FALSE if unsuccessful. |
| static bool IfeFuncToText (input IfeFunctionType nIfeFunction, output PGENERIC_TEXT pszIfeFuncText) | Converts the IFE Function Message identifier contained in the nIfeFunction input argument into a text string representing the same enumeration name. Returns FALSE if unsuccessful. |
| static bool IfeIdToText (input IfeIdType nIfeId, output PGENERIC_TEXT pszIfeIdText) | Converts the IFE Process/Thread identifier contained in the nIfeId input argument into a text string representing the same enumeration name. Returns FALSE if unsuccessful. |
| static IfeFunctionType IfeTextToFunc (input PGENERIC_TEXT pszIfeFuncText) | Returns the corresponding Enumeration value for the Text String contained in pszIfeIdText from the IfeFunctionType Type definition. If none, returns NoDestination. |
| static IfeIdType IfeTextToId (input PGENERIC_TEXT pszIfeIdText) | Returns the corresponding Enumeration value for the Text String contained in pszIfeIdText from the IfeIdType Type definition. If none, returns NoDestination. |
| static void LogEvent (input IfeIdType nProcessId, input WORD wCategory, input DWORD dwErrorCode, input char *pszFormat, input . . . ) | This is the call-level interface to the Windows NT event log. This takes the passed variables and develops a series of strings using printf(pszFormat, arg, arg, arg) style, then forwards the developed string to ReportEvent( ). |
| bool SetRegistryConfigValue (input char *ModuleName, input REGCONFIGINFO *ConfigInfo) | This function is used by a process to register its Unit Id, Part Number, and Revision number to the Windows NT Registry. Returns FALSE if any errors are encountered. |
| bool SetRegistryString (input char *lpszKeyName, input char *lpszValueName, input char *szString) | Writes specified value and string data into specified registry key under HKEY_LOCAL_MACHINE. Returns FALSE if any errors are encountered. |

The Discrete Library, DISCRETE.LIB, contains the UTILITY.LIB Library plus the following. The WinRUtilClass class contains simple utilities for use with WinRT drivers:

| WinRTUtilClass Functions | Purpose |
|---|---|
| void BuildWinRTDeviceName (output LPSTR szDeviceName, input LPSTR szDeviceNumber | Returns the full WinRT device name from a null-terminated device number. |
| DWORD GetWinRTDeviceNumber (input LPSTR szDriverName, output PUCHAR szDeviceNumber, input LPDWORD lpdwDeviceNumberBufSize) | Uses null-terminated DriverName to look-up WinRT device number string in the registry. Returns the value returned by its called RegQueryValueEx( ) function. |

DSCRTDRV.RT replaces DSCRTDRV.CPP and is the name of the Discrete Driver code. It is fed into the WinRT Preprocessor to create DISCRETE.CPP, which is compiled into the DISCRETE.LIB library. The DiscreteDriverClass controls the system discretes, which are used to control peripherals such as LED indicators.

| DiscreteDriverClass Public Function | Purpose |
|---|---|
| void CloseDiscretes( ) | Closes the Discrete WinRT device if it is open. |
| UCHAR GetId( ) | Returns the Enumerated LRU ID. If 0, LRU ID has not yet been obtained. May be called after ReadId( ). |
| bool GetLCDbacklight( ) | Returns the state of the LCD backlight (on or off). |
| bool GetLED (LED_TYPE LEDchoice) | Returns the state of the specified LED. |
| bool GetVTRDiscrete (VTR_DISCRETE_TYPE VTRdiscreteChoice) | Returns the state of the specified VTR discrete. |
| bool IsPAT( ) | May be called after ReadId( ). Returns TRUE if this LRU is a PAT, FALSE if this LRU is a CFS. |
| DWORD OpenDiscretes( ) | Opens the Discrete WinRT device. |
| DWORD ReadId( ) | Reads discrete input I/O port to obtain this LRU id and stores it in the form: 0110fijk where f=1 if CFS, f=0 if PAT; ijk is the LRU id 000-111 (0–7). In this form the byte may be used as an ARCNET address. If successful, ERROR_SUCCESS is returned. |
| UCHAR ReadInputDiscretes( ) | Returns a byte representing the state of the input discretes. |
| UCHAR ReadOutputDiscretes( ) | Returns a byte representing the state of the output discretes. |
| bool SetLCDbacklight (bool bOnOff) | Turns the LCD backlight on or off. Returns the state of the backlight prior to this function call. |
| bool SetLED (LED_TYPE LEDchoice, bool bOnOff) | Turns the specified LED on or off. Returns the state of the LED prior to this function call. |
| bool SetVTRDiscrete (VTR_DISCRETE_TYPE VTRdiscreteChoice, bool bOnOff) | Asserts or de-asserts the specified VTR discrete. Returns the state of the discrete before this function call. |
| UCHAR WriteOutputDiscretes (UCHAR ucOutputMask) | Sets the output discretes according to the specified mask. Returns the state of the output discretes before they were changed by this function. |

A message library MESSAGE.LIB provides the means of moving data from one place and format to another without needing detailed understanding of the protocols involved. In general, all messages transmitted within the control center are of the type IFE_Message. Therefore, a class called IFE_Message is used to translate information into and out of this message type. Similarly, many messages enter the control center from the ARCNET devices, so to support them the ARCNET_Message Class is made. Instead of requiring the user to start with an ARCNET_Message and convert it to an IFE_Message, the ARCNET_Message is a superset of IFE_Message. In this way, the ARCNET_Message contains the additional functions to manage the translations, and the migration from one form to another is nearly transparent.

For example, when raw data is read into MP.EXE from ARCNET, it is put into a new ARCNET_Message object and passed to MessageToPipeProcessor( ) that treats this message as an IFE_Message to send it to the appropriate NAU. The NAU uses its own flavor of IFE_Message (Seat_Message, for example) to read the data (via its own NAUGetMP( )) and from that point forward, the IFE_message is treated more specifically. No special handling is needed to affect this change. By the time the message finally reaches its ultimate destination process, the message class functions are used to deal with the actual bytes of the messages. These functions are described below.

The IFE_Message class IFMSSAGE.CPP is the base class for all IFE message processing. A hierarchy exists such that each derived class implements specifics for its data processing. This makes translating data formats transparent to application programmers.

| IFE_Message Public Function | Purpose |
| --- | --- |
| IFE_Message<br><br>(IFE_MESSAGE_DATA<br>*pIfeMessageData) | This constructor prefills the local IfeMessageData with the raw pIfeMessageData. |
| virtual void<br>GetAddress<br><br>(char *pAddress) | Returns the Address data, (e.g., "SDU 001A"), from the Address member found in the IfeMessageData. |
| bool<br>GetData<br><br>(Queue *pInputQueue) | Initializes the IfeMesageData structure of an IFE_Message object with data from the Queue. The address of an IfeMessageData structure is read from the specified queue, the data is copied into the IFE_Message class. The IfeMessageData structure read from the input queue is then Deleted.<br>Returns FALSE if fails to get data. |
| bool<br>GetData<br><br>(HANDLE hInPipe,<br>ULONG *pBytesRead) | Does a ReadFile( ) on the specified handle and uses the data read to populate the IfeMessageData structure contained in this instance of the IFE_Message class.<br>Returns FALSE if fails to get data from Pipe. |
| virtual IfeIdType<br>GetDestination( ) | Returns the Destination data found in the IfeMessageData data member. |
| IfeFunctionType<br>GetIfeFunction( ) | Returns the IfeFunction element of the IFE_MESSAGE_DATA structure associated with this IFE_Message. |
| void<br>GetLruInfo<br>(char *pLruInfo) | Returns the LRU information from the IFE_Message. |
| bool<br>GetLruType<br><br>(char *pszLruType) | Copies the data contained in the LRUType field of the IfeMessageData structure contained in this IFE_Message into the location specified by the input argument pszLruType.<br>Returns FALSE if pszLruType is a null pointer. |
| void<br>GetMessageData<br><br>(BYTE *pData,<br>WORD *wDataLen) | Copies the data field of this IFE_Message object into the pData argument. The number of bytes copied is written to the wDataLen argument. |
| virtual long<br>GetMessageLength( ) | Returns the MessageLength data member value. |
| CString<br>GetNetworkAddress( ) | Retrieves the network address from the raw data buffer of an IFE Message. GetNetworkAddress determines the location of address information in the Raw Data buffer based on the destination ID. Address information is converted from Binary to ASCII if necessary then placed into a CString which is returned to the calling function. |
| virtual IfeIdType<br>GetSource( ) | Returns the Source data found in the IfeMessageData data member. |
| UnsolicitedMessageType<br>GetUnsolicitedMessage( ) | Returns the value contained in the UnsolicitedMessage field of this IFE_Message object. |
| void<br>Log(int nMessageDirection,<br>IfeIdType nProcessId,<br>char *pszDataFormat) | Formats a text string containing pertinent message information and writes it to standard output.<br>MessageDirection can be set to LogInpMsg or any other value to indicate whether the log should say 'Received' or 'Transmitted', respectively. ProcessId is simply added to the Log string along with the IFE_Message data. The DataFormat is used to determine which fields are used. If null, only the Process Id, Function, Destination Id, Source Id and Address are output to stdout. Otherwise the actual message data also prints. |
| bool<br>PutData<br><br>(Queue *pOutputQueue) | Allocates sufficient memory to hold a copy of the IfeMessageData structure associated with a message. The IfeMessageData is copied from the Class data area to the newly allocated memory. The pointer to the copied data is then placed on the specified queue.<br>Returns FALSE if fails to create a new IFE_Message object. |

-continued

| IFE_Message Public Function | Purpose |
|---|---|
| bool PutData (HANDLE hOutPipe, ULONG *pBytesWritten) | Copies the contents of the IfeMessageData class variable to the pipe specified by hOutPipe. The number of bytes actually written to the pipe are returned in the pBytesWritten argument. Returns FALSE if fails to output to the pipe. |
| virtual void SetAddress (char *pAddress) | Updates the IfeMessageData Address data field with pAddress info. |
| virtual void SetDestination (IfeIdType DestinationId) | Updates the Destination field in the IfeMessageData data member. |
| void SetIfeFunction (IfeFunctionType nIfeFunction) | Copies the IfeFunctionType input argument into the IfeFunction element of the IFE_MESSAGE_DATA structure associated with this IFE_Message. |
| void SetLruInfo (char *pLruInfo) | Saves information about the host LRU. |
| bool SetLruType (char *pszLruType) | Fills the LRUType field in the IfeMessageData structure for this IFE_Message with the data contained in the input argument pszLruType. Returns FALSE if input LruType is too big to store. |
| void SetMessageData (BYTE *pData, WORD wDataLen) | Copies the specified data block to the MessageData field of this IFE_Message object. |
| void SetMessageLength (long Length) | Sets the MessageLength local data member to Length. |
| void SetNetworkAddress (CString csNetworkAddress) | Converts the Network Address in csNetworkAddress as necessary and writes the resulting data to the Raw Message Data buffer. The type of conversion required as well as the location of data in the Raw Message data buffer is determined by the identifier of the process that sent the message (i.e., Message Source Id). |
| virtual void SetSource (IfeIdType SourceId) | Updates the Source field found in the IfeMessageData data member with SourceId. |
| void SetUnsolicitedMessage (UnsolicitedMessageType Message) | Sets the UnsolicitedMessage field for this IFE_Message object with the value contained in Message. |

The ARCNET_Message class ARCNTMSS.CPP is a derived class from IFE_Message. It is used to carry and process ARCNET data from the Message Processor to an appropriate Network Addressable Unit (e.g., Seat NAU, Backbone NAU). It is used as a base class to any ARCNET devices, such as the Seat_Message, PESCA_Message, and PESCV_Message classes.

Some of the virtual functions defined in IFE_Message have been overridden within ARCNET_Message.

| ARCNET_Message Class Public Functions | Purpose |
|---|---|
| ARCNET_Message( IFE_MESSAGE_DATA *pIfeMessageData) | This constructor fills the IfeMessageData data member with the message data structure. |
| ARCNET_Message( BYTE *pMessageData, CMapStringToPtr& LookUpTable) | This constructor takes what must be a valid message and parses it to fill the local structure. |
| bool BuildArcnetMessage( CMapStringToPtr& LookUpTable, char *pLRUName, BYTE *pOutBuf) | This method builds the MessageData into an ARCNET message. The first two bytes of the output message buffer are set to the length of the message (as read from the MessageLength field of the IfeMessageData structure. The remainder of the output buffer is populated with the raw ARCNET data from the MessageData field of the |

-continued

| ARCNET_Message Class Public Functions | Purpose |
| --- | --- |
| | IfeMessageData structure. Returns FALSE if failure. |
| BYTE GetCommand( ) | Returns the value of the Command Byte in the ARCNET MessageData. |
| IfeIdType GetDestination( CMapStringToPtr LookUpTable, char *pAddress) | Extracts the Destination bytes from the ARCNET MessageData, attempts to map the raw data and returns the Enumerated IfeIdType and Mapping address. Returns NoDestination if none found. |
| IfeFunctionType GetIfeFunction( ) | Returns the IfeFunction data member. |
| long GetMessageLength( BYTE *pMessageData) | Processes the raw ARCNET data to determine the message length, update the local data member and return the value. |
| bool IsTestPrimitive( BYTE byTestPrimitive) | Determines whether or not this IFE_Message is a test primitive by comparing the command byte with the constant TP_COMMAND. A value of TRUE is returned if the command byte equals TP_COMMAND. A value of FALSE is returned otherwise. |
| bool PutData( HANDLE hOutPipe, ULONG *pBytesWritten) | Overloaded ARCNET PutData( ) method. Completes the Message Header and calls the IFE_Message function. Returns FALSE if write to OutPipe fails. |
| bool PutData( Queue *pOutputQueue) | Overloaded ARCNET PutData( ) method. Completes the Message Header and calls the IFE_Message function. Returns FALSe if no data was found to put into Queue. |
| bool SetAddress( CMapStringToPtr LookUpTable, char *pAddress) | This method is an override of the IfeMessage SetAddress( ). It takes in a mapping table and an Address. The address is looked-up in the mapping table and if a match is found the Address data member is updated. Returns FALSE if unsuccessful. |
| void SetCommand( BYTE Command) | This method takes a Command Byte and update the MessageData member. |
| void SetDestination( IfeIdType DestinationId) | Simply calls the same IFE_Message function to set the Destination data member. |
| void SetDestination( BYTE *pDestinationNetworkAddress) | Parses the DestinationNetworkAddress for the IFE_Message Destination. |
| bool SetDestination( CMapStringToPtr& LookUpTable, char *pAddress) | Looks up the pAddress in the specified LookUpTable to determine the corresponding Destination and stores it in the IFE_Message Destination member. Returns FALSE if lookup fails. |
| void SetIfeFunction( IfeFunctionType Function) | Updates the IFE Function with the given value. |
| bool SetSource( CMapStringToPtr LookUpTable, char *pAddress) | Cross-references the Address, (e.g., 'SDU 01A') in the LookUpTable. If a match, updates the Source bytes of MessageData with corresponding value. Returns FALSE if failure. |
| void SetSource( BYTE *pSourceNetworkAddress) | This method takes the BYTE parameter and update the MessageData data member for source. |

The following are virtual functions that may be used in classes derived from this class:

| ARCNET_Message Class Virtual Functions | Purpose |
| --- | --- |
| virtual void CompleteMessageHeader( ) | To finish up the message for shipment. Base version simply calls SetMessageLength( ). |
| virtual void GetAddress( char *pAddress) | Base version simply calls the IFE_Message version. |
| virtual IfeIdType GetDestination( ) | Base version simply calls the IFE_Message version. |
| virtual IfeIdType GetSource( ) | Base version simply calls the IFE_Message version. |
| virtual void SetAddress( char *pAddress) | Base version simply calls the IFE_Message version. |
| virtual void SetDestination( IfeIdType DestinationId) | Base version simply calls the IFE_Message version. |
| virtual void SetMessageLength( ) | Handles ARCNET messages that do not have sub-functions (i.e., 1F messages). Base version does nothing. |
| virtual void SetSource( IfeIdType SourceId) | Base version simply calls the IFE_Message version. |

ARCNET Simulation class ARCSMCLS.CPP contains similar functions to the runtime ARCNET_Message class, except that instead of communicating with the actual ARCNET Driver, this simulates data I/O for test purposes.

PESC-A_Message class PSCMSSGE.CPP is derived from the ARCNET_Message class to implement the functions needed to support the PESC-A devices.

| PESC-A_Message Function | Purpose |
| --- | --- |
| bool IsGearDown( ) | Returns indication of whether landing gear is down and locked. |
| bool IsGearCompressed( ) | Returns indication as to whether landing gear is compressed (weight on wheels). |

PESCV_Message class PSCVMSSG.CPP is derived from the ARCNET_Message class to implement the functions necessary to format and transmit interface messages between the Cabin Control Center and the PESC-V 224*b*.

| PESC-V_Message Function | Purpose |
| --- | --- |
| void WriteVideoControlData (BYTE *byData) | Initializes the data portion of this PESCV_Message with all information necessary for a Video Control Message (0xE9). byData must contain the Video Control Data bytes. |

The Seat_Message class SETMSSGE.CPP is derived from the ARCNET_Message class to process Seat data between the Seat NAU and the Services. Methods and data relating to all seat sessioning and sales services, along with some cabin services, are provided.

| Seat_Message Function | Purpose |
| --- | --- |
| void CompleteMessageHeader( ) | Finishes up the message for shipment, adds message length, et. al. |
| BYTE GetApplicationId( ) | Retrieves the Application ID from the IFE_Message data. |
| double GetCashTotal( ) | Retrieves the Cash Total from the IFE_Message data. |
| BYTE GetCommandId( ) | Returns the Command ID found in the IFE_Message data. |
| BYTE GetControlIdentifier( ) | Returns the Control Identifier found in the IFE_Message data. |
| void GetCreditCardAccountNumber (BYTE *pCreditCardAccount) | Retrieves the Credit Card Data from the IFE_Message data. |
| void GetCreditCardCustomerName (char *pCustomerName) | Retrieves the Credit Card Customer Name from the IFE_Message data. |
| void GetCreditCardExpirationDate (BYTE *pExpirationData) | Retrieves the Credit Card Expiration Date from the IFE_Message data. |
| double GetCreditTotal( ) | Retrieves the Credit Total from IFE_Message data and returns it as a floating point value. |

-continued

| Seat_Message Function | Purpose |
|---|---|
| short GetFlags( ) | Retrieves the Flags from the IFE_Message data. |
| void GetFlightAttendantId (char *pAttendantId) | Retrieves the Flight Attendant Id from the IFE_Message data. |
| BYTE GetMessageId( ) | Returns the Message ID found in the IFE_Message data. |
| ID GetOrderId( ) | Returns the Order ID from the IFE_Message data. |
| void GetProductCode (char *pProductCode) | Returns the Product Code from the IFE_Message data. |
| long GetProductMap( ) | Returns the Product Map from the IFE_Message data. |
| BYTE GetQuantity( ) | Returns the Quantity from the IFE_Message data. |
| BYTE GetRetryCount( ) | Returns the Retry Count from the IFE_Message data. |
| void GetSeat( char *pSeat) | Returns the Seat from the IFE_Message data. |
| void GetSeatTransferData (CString &csSeat1, CString &csSeat2) | Transfers the seat identifiers from the data area of this IFE_Message object into the two output arguments. |
| WORD GetSequenceNumber( ) | Returns the value of the Sequence Number data member. |
| BYTE GetSessionStatus( ) | Retrieves the session status from the message |
| BYTE GetTransactionStatus( ) | Retrieves the Transaction Status from the IFE message. |
| BYTE GetUpdateType( ) | Retrieves the Update Type from the IFE message. |
| void InitializeSeat( ) | Initializes the LengthMap array with seat Ids once per flight. |
| void SetAddress( char *pAddress) | Copies the Address info into the IFE_Message data member. |
| void SetCashTotal (double Amount) | Copies the Amount into the IFE_Message data. |
| void SetControlIdentifier (BYTE ID) | Copies the ID info into the IFE_Message data. |
| void SetCPMSFlags (BYTE byFlags) | Writes the value contained in byFlags to the Flags location in the CPMS Status message. |
| void SetCreditCardAccountNumber (BYTE *pCreditCardAccount) | Copies the CreditCardAccount data into the IFE_Message data. |
| void SetCreditCardCustomerName (char *pCustomerName) | Copies the CustomerName data into the IFE_Message data. |
| void SetCreditCardExpirationDate (BYTE *pExpirationDate) | Copies the ExpirationDate data into the IFE_Message data. |
| void SetCreditTotal (double Amount) | Formats as a dollar amount and copies Amount into the IFE_Message data. |
| void SetDBBuildId( WORD wBuildId) | Writes the value in wBuildId to the Database Build ID field position in the IFE_Message data. |
| void SetElapsedTime (TIME tmElapsed) | Formats elapsed time 0–999 into IFE_Message data. Values greater than 999 are reduced to 999. |
| void SetHSDLQueueStatus (BYTE *pHSDLQueueStatus) | Copies the High Speed Download Queue Status into the IFE_Message data. |
| void SetIfeState( BYTE IfeState) | Copies the IFE State value into the IFE_Message data. |
| void SetMessageId (BYTE MessageId) | Copies the Message Id into the IFE_Message data. |
| void | Sets the length of the IFE_Message data |

-continued

| Seat_Message Function | Purpose |
| --- | --- |
| SetMessageLength( ) | based on the raw data message length. |
| void SetMessagesProcessed (short MessagesProcessed) | Copies the MessagesProcessed into the IFE_Message data. |
| void SetMovieCycleId (BYTE MovieCycleId) | Copies the MovieCycleId into the IFE_Message data. |
| void SetMovieCycleStatus (BYTE MovieCycleStatus) | Copies the MovieCycleStatus into the IFE_Message data. |
| void SetMovieNumber (BYTE MovieNumber) | Copies the MovieNumber into the IFE_Message data. |
| void SetNewVideoChannelNumber (BYTE ChannelNumber) | Copies the ChannelNumber into the IFE_Message data. |
| void SetNewVideoRecordNumber (BYTE RecordNumber, BYTE LanguageId) | Copies the RecordNumber into the IFE_Message data using LanguageId to pad the text field appropriately. |
| void SetOrderId (ID OrderId) | Copies the OrderId into the IFE_Message data. |
| void SetProductCode (char *pProductCode) | Copies the ProductCode into the IFE_Message data. |
| void SetProductMap (long ProductMap) | Copies the ProductMap into the IFE_Message data. |
| void SetQuantity (BYTE Quantity) | Copies the Quantity into the IFE_Message data. |
| void SetQueuePosition (short QueuePosition) | Copies the QueuePosition into the IFE_Message data. |
| void SetSeatTransferData (CString &csSeat1, CString &csSeat2) | Copies the seats identified by the two input arguments into the IFE_Message data. |
| void SetSEBMessagingOff( ) | Sets IFE_Message data to SEB-Messaging Off. |
| void SetSEBMessagingOn( ) | Sets IFE_Message data to SEB-Messaging On. |
| void SetSEBMessageSeatAddress (char *SeatAddress) | Copies SeatAddress into the IFE_Message data. |
| void SetSequenceNumber (WORD SequenceNumber) | Copies SequenceNumber into the IFE_Message data. |
| void SetSessionStatus (BYTE SessionStatus) | Copies the SessionStatus into the IFE_Message data. |
| void SetSIBacklightCmd (bool bBacklightOn) | Sets the Message ID to SI_BACKLIGHT_CTL and the first data byte 1 (ON) or 0 (OFF) based on bBacklightOn. |
| void SetStoreStatus (BYTE *StoreStatus) | Copies StoreStatus into the IFE_Message data. |
| void SetTimeLeftOnCurrentCycle (TIME tmRemaining) | Copies tmRemaining into the IFE_Message data. |
| void SetTimeUntilNextShowing (TIME tmNextShow) | Copies tmNextShow into the IFE_Message data. |
| void SetTransactionStatus (BYTE TransactionStatus) | Copies TransactionStatus into the IFE_Message data. |
| void SetUpdateType (BYTE UpdateType) | Copies UpdateType into the IFE_Message data. |

The TestPort_Message class TSTPRTMS.CPP is derived from ARCNET_Message to communicate with the test port of the file server.

| TestPort_Message Class Function | Purpose |
| --- | --- |
| void<br>GetBiteResults<br><br>(DWORD *pdwErrorCode,<br>DWORD *pdwTestID,<br>DWORD *pdwWitnessType,<br>DWORD *pdwSuspectType,<br>DWORD *pdwSuspectID,<br>DWORD *pdwTSData,<br>DWORD *pdwErrorClear) | Extracts data from an BIT_BITE_STATUS (op_status) and returns it to the calling function for inclusion in the Application event log. |
| void<br>GetRawSourceAddress<br><br>(BYTE *pszSrcAddrs) | Extracts the source address field from the IFE_Message data and copies it into pszSrcAddrs. |
| BYTE<br>GetSubCommand( ) | Returns the SubCommand byte from the IFE_Message data. |
| bool<br>SetRevInfo<br><br>(BYTE *pbyRevInfo) | Parses the text contained in the pszRevInfo string and formats the data into the IFE_Message data. |
| void<br>SetSubCommand<br>(BYTE command) | Sets the SubCommand byte in the IFE_Message data with command. |

StandardProtocol class STNDRDPR.CPP is derived from the IFE_Message class and is the base class that supports the Hughes standard start-stop protocol as described in the, which is used in communications with PATMessage class, PIMessage class, PATSEBMessage class.

| StandardProtocol Class Functions | Purpose |
| --- | --- |
| bool<br>Decode( ) | Decode data from Hughes standard start-stop data into just plain data. Returns FALSE if decoding failed. |
| void<br>Encode( ) | Encodes the data into the Hughes standard start-stop format. |
| BYTE<br>GetCommand( ) | Returns the Command Byte from the IFE_Message data. |
| bool GetData<br><br>(HANDLE hInPipe,<br>ULONG *pBytesRead) | Reads data from the hInPipe into the IFE_Message data. Returns the number of bytes read in pBytesRead.<br>Returns FALSE if read failed. |
| bool<br>GetData<br><br>(Queue *pInputQueue) | Reads and encodes the data from the InputQueue into the IFE_Message data. Returns FALSE if no data or if pointer is NULL. |
| BYTE<br>GetLengthOfCommand( ) | Returns the Command Length from IFE_Message data. |
| bool<br>IsValidCommand( ) | Returns FALSE if Command in IFE_Message is not recognized as one of the Standard Protocol commands. |
| bool<br>PutData<br><br>(HANDLE hOutPipe,<br>ULONG *pBytesWritten) | Outputs encoded data from IFE_Message data to the OutPipe, reporting the number of BytesWritten.<br>Returns FALSE if failed the written. |
| bool<br>PutData<br><br>(Queue *pOutputQueue) | Decodes the data from the IFE_Message data and puts it on the OutputQueue. Returns FALSE if message could not be decoded. |
| void<br>SetLength( ) | Sets the Message Length and Destination Address of the IFE_Message. |

The PATMessage PATMSSGE.CPP is derived from StandardProtocol to support communication with the primary access terminal's 225 PI board.

| PATMessage Function | Purpose |
|---|---|
| void ConvertCardDataToASCIIFormat (unsigned char *pCardData, long 1CardDataLength) | Converts binary format card data in pCardData to ASCII format in IFE_Message data. Requires CardDataLength to set the length of the IFE_Message data field. |
| void ConvertPrinterStatusToASCII (long 1PrinterStatus) | Converts PrinterStatus to ASCII format and stores in IFE message data. |
| void DerivedDecode( ) | Stub. |
| void DerivedEncode( ) | Stub. |
| void GetAudioChannel (BYTE *LeftTimeSlot, BYTE *RightTimeSlot) | Stub. |
| long GetCardDataBinaryFormat (unsigned char *pCardData) | Copies magcard data (MagCardReadData Command is first byte) in the original binary format into pCardData. Size of user-supplied buffer should be MAXMESSAGEDATASIZE. Returns adjusted message length. Returns 0 if unable to copy data. |
| BYTE GetControlByte( ) | Returns the control byte from the IFE_Message data. |
| BYTE GetDestinationDevice( ) | Returns address of destination device from IFE_Message data. |
| BYTE GetSourceDevice( ) | Returns address of source device from IFE_Message data. |
| void GetVideoPreviewChannel (BYTE *Channel, BYTE *AudioSel) | Returns the Preview Channel info from the IFE_Message data into Channel and AudioSel. |
| void GetVideoPreviewSource (char *Source) | Stub. |
| void SetAddress (char *Address) | Simply calls the IFE_Message version. |
| void SetAudioChannel (BYTE LeftTimeSlot, BYTE RightTimeSlot) | Develops the Audio Channel info in the IFE_Message data based on the LeftTimeSlot and RightTimeSlot values. |
| void SetAudioVolume (BYTE LeftVolume, BYTE RightVolume) | Develops the Audio Volume info in the IFE_Message data based on the LeftVolume and RightVolume values. |
| void SetCardData( unsigned char *pCardData) | Sets up request to PI to dump the most recent magcard buffer into CardData. |
| void SetDestinationDevice (BYTE byDstDeviceAddr) | Sets address of destination device in IFE_Message data to byDstDeviceAddr. |
| void SetSourceDevice (BYTE bySrcDeviceAddr) | Set address of source device in IFE_Message data to bySrcDeviceAddr. |
| void SetVideoPreviewChannel (BYTE Channel, BYTE AudioSel) | Copies the Channel and AudioSel data into IFE_Message data. |
| void SetVideoPreviewSource (har *Source) | Stub. |

The PIMessage class PIMSSAGE.CPP is derived from the StandardProtocol class to handle the specifics of the primary access terminal's 225 PI board.

| PIMessage Class Function | Purpose |
| --- | --- |
| void DerivedDecode( ) | Massages the data in IFE__Message data for local usage. |
| void DerivedEncode( ) | Massages the data in IFE__Message data for output to the PI board. |
| BYTE fooGetCommand( ) | For testing only. |
| BYTE fooGetLengthOfCommand( ) | For testing only. |
| bool fooIsValidCommand( ) | For testing only. |
| bool GetCardData (unsigned char *CardData) | Stub. Always returns FALSE. See PATMessage for this functionality. |
| bool GetCurrentChannelResponse (BYTE *Channel, BYTE *AudioSel) | If the current command was a Channel Request, this returns the Channel and AudioSel. Otherwise returns FALSE. |
| BYTE GetMsgCommandByte( ) | Returns the Command Byte from last PIMessage. |
| bool GetPartAndRevisionData (BYTE *PartAndRevision) | If current command was a Part&Revision command, copies the data from IFE__Message data into PartAndRevision. Otherwise returns FALSE. |
| bool GetStatusResponse (BYTE *Response) | If current command was a Status Request command, copies the data from IFE__Message data into Response. Otherwise returns FALSE. |
| bool GetVideoPreviewVCP (char *VCPName) | If current command was a Video Preview VCP command, returns the current VCP assigned to Video Preview screen, persisted by PIInterface VLRU into VCPName. Otherwise returns FALSE. |
| bool IsCardReaderCommand( ) | Returns TRUE only if the current Command is one from the card reader. |
| bool IsTunerCommand( ) | Returns TRUE only if the current Command is one from or for the Tuner. |
| bool IsUnsolicated( ) | Stub. Always returns FALSE. |
| void PartAndRevisionRequest( ) | Builds a Part&Revision Request into the IFE__Message data. |
| void PutCardData (unsigned char *CardData) | Stub. See PATMessage for this functionality. |
| void RequestCurrentChannel( ) | Builds a Current Channel Request into the IFE__Message data. |
| void SetAck( BYTE byCmdToBeAcked) | Builds an Ack-by-Current-Command into the IFE__Message data. |
| void SetMsgCommandByte (BYTE byMsgCmd) | Copies byMsgCmd into the Message Command Byte class member data. |
| void SetNak (BYTE byCmdToBeNaked) | Builds a NAK-by-Current-Command into the IFE__Message data. |
| void SetVideoPreviewToVCP( char *VCPName) | Stub. |
| void SoftwareReset( ) | Builds a Software Reset Command into the IFE__Message data. |
| void StatusRequest( ) | Builds a Status Request Command into the IFE__Message data. |
| void SwitchTunerType (BYTE TunerType) | Builds a Switch Tuner Type Command into the IFE__Message data. |
| void TuneChannel (BYTE Channel, BYTE AudioSel) | Builds a Tune Channel Command into the IFE__Message data using Channel and AudioSel as part of the command. |

The PATSEBMessage class PTSBMSSG.CPP is derived from StandardProtocol but currently none of its functions are implemented. Therefore, it behaves exactly like StandardProtocol.

| PATSEBMessage Class Function | Purpose |
|---|---|
| void DerivedDecode( ) | Stub. |
| void DerivedEncode( ) | Stub. |
| BYTE GetLengthOfCommand( ) | Stub. Returns Zero. |
| bool IsValidCommand( ) | If Command is recognized by GetLengthOfCommand( ), returns TRUE. Currently returns FALSE. |

The Serial_Message SRLMSSGE.CPP is derived from IFE_Message. It is used to carry and process Serial data from the Message Processor to any serial I/O devices NAU. Currently, it is the base class for VCP_Message. The pure virtual functions defined in IFE Message is implemented within Serial Message.

| Serial_Message Function | Purpose |
|---|---|
| bool GetData (HANDLE hInPipe, ULONG *pBytesRead) | Local version reads data into IFE_Message data from InPipe, returning the number of BytesRead. Returns FALSE if no data read from InPipe. |
| bool GetData (IfeIdType idSource, IfeIdType idDestination, BYTE *pData, DWORD dwDataLen) | Local version fills IFE_Message data structures with data contained in input arguments. Always returns TRUE. |
| bool GetData (Queue *pInputQueue) | Simply calls the IFE_Message version. |
| bool PutData (BYTE *byData, DWORD *pDataLen) | Local version copies the data and length elements from an IFE_Message to the specified arguments. Always returns TRUE. |
| bool PutData (HANDLE hOutPipe, ULONG *pBytesWritten) | Simply calls the IFE_Message version. |
| bool PutData(Queue *pOutputQueue) | Simply calls the IFE_Message version. |

The VCP_Message class VCPMSSGE.CPP is derived from Serial_Message (which is derived from IFE_Message) to communicate with the Video Players. It is used between the Message Processor and the VCP NAU.

| VCP_Message Class Function | Purpose |
|---|---|
| void Format (VCPMessageFormat nMessageFormat) | Stub. |
| CString GetAddress( ) | Overrides the one in the IFE_Message base class. Returns the contents of the IFE_Message data Address field in a CString. |
| void GetCommandData (PLAYERCOMMANDS *pPlayerCommand, BYTE *byData, int *pDataLen) | If a valid VCP PlayerCommand, parses out the Command Bytes from the IFE_Message data, returning it in byData. Returns the number of bytes in DataLen, Zero if invalid command. |

-continued

| VCP_Message Class Function | Purpose |
| --- | --- |
| CString GetLruInfo( ) | Overrides the one in the IFE_Message class. This version creates a CString from the data contained in the LruInfo field of the IfeMessageData structure and returns it to the function. |
| void GetPlayerResponse (PlayerCommands *pPlayerCommand, PLAYERSTATE *pPlayerState, BYTE *pData, BYTE *pDataLen) | Stub |
| void GetResponseData  (IfeFunctionType *pResponseCommand, BYTE *byData, int *pDataLen) | Parses data from IFE_Message data into byData, returning the DataLen size of the data. Returns responses Ack or Nak in ResponseCommand. |
| PLAYERSTATE GetState( ) | Returns the enumerated state of the VCP (e.g., Playing, FastForward, etc.) |
| void GetStateInfo  (PLAYERSTATE *pState, DWORD *pTime) | Retrieves state information from this IFE Message object. Assumes that state information was writing using the SetStateInfo member function. |
| bool IsValidChecksum( ) | Returns FALSE if checksum test. |
| void SetAddress  (CString csAddress) | Overrides SetAddress in IFE_Message base class. Address field of the IfeMessageData structure for this message is populated using the CString input argument. |
| void SetChecksum( ) | Calculates and writes a checksum to the IFE Message. Then stores the full length of the message in the MessageLength field of the message. |
| void SetLruInfo( CString csLruInfo) | Overrides the function in the IFE_Message base class. This version copies the csLruInfo data to the LruInfo field of IFE_Message data. |
| void SetPlayerCommand  (PlayerCommands nPlayerCommand, BYTE *byData, BYTE byDataLen) | Converts enumerated internal PlayerCommand into the actual command byte to go to the VCP. Returns any associated data from IFE_Message data into byData and returns its length in DataLen. |
| void SetStateInfo  (PLAYERSTATE nState, DWORD dwTime) | Writes VCP State and Time information to the IFE Message data. State information is retrieved using GetStateInfo( ). |
| void SetUnitId (PGENERIC_TEXT pszUnitId) | Writes the UnitId into the IFE Message data. |

Thus, systems, methods and articles of manufacture have been disclosed that provide for a networked passenger entertainment system that integrates audio, video, passenger information, product ordering and service processing, communications, and maintainability features, and permits passengers to selectively order or request products and services, receive video, audio and game data for entertainment purposes, and communicate with other passengers and computers on- and off-board the aircraft, and which thereby provides for passenger selected delivery of content over a communication network. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

Having thus described our invention, what we claim as new, and desire to secure by Letters Patent is:

1. A method of enabling a computer having a display to control a passenger entertainment system having a plurality of line replaceable units, comprising the steps of:
   transmitting a message to a message processor from one of said line replaceable units;
   receiving the message in the message processor;
   decoding the received message into a common format message;
   creating a virtual line replaceable unit (VLRU) within a network addressable unit when a line replaceable unit transmits a message;
   routing the common format message through the virtual line replaceable unit to a transaction dispatcher.

2. The method as recited in claim 1, wherein the computer comprises a primary access terminal said method further comprising the steps of:

controlling the passenger entertainment system with a graphical user interface (GUI) that generates and receives GUI format messages; and providing an interface between the graphical user interface and the transaction dispatcher with a cabin applications interface library that transfers GUI format messages and common format messages.

3. The method as recited in claim 2 further comprising the steps of:

receiving operator requests from the graphical user interface through the cabin applications programming interface library;

providing the operator requests to a services function;

communicating the operator request to a database server;

retrieving information relating to services from a database; and generating an appropriate response to the operator request.

4. The method as recited in claim 2 wherein the GUI further performs the step of communicating with the line replaceable units through a GUI monitor VLRU within the network addressable unit.

5. The method as recited in claim 1, wherein the computer comprises a cabin file server said method further comprising the steps of:

receiving a common format message that is a passenger transaction that originates at a passenger seat from the transaction dispatcher;

providing the passenger transaction to a services function;

communicating the passenger transaction to a database server;

retrieving information relating to services from a database; and generating an appropriate response to the passenger transaction.

6. The method as recited in claim 5 further comprising the step of creating a seat VLRU in the network addressable unit when the passenger seat originates the passenger transaction.

7. The method as recited in claim 1 further comprising communicating between the plurality of line replaceable units and the computer with one or more drivers.

8. A system for controlling a passenger entertainment system, including a computer with one or more components for controlling one or more line replaceable units of the passenger entertainment system, comprising:

a message processor that receives and transmits messages between the one or more line replaceable units and decodes the received messages to generate common format messages and encodes common format messages in a format for the one or more line replaceable units;

one or more network addressable units corresponding to the one or more line replaceable units wherein when a line replaceable unit (LRU) communicates with the computer a virtual LRU (VLRU) is created for said LRU within a network addressable unit wherein said VLRU routes common format messages from the LRU and to the LRU; and a transaction dispatcher that routes the common format messages to and from the message processor through a VLRU within a network addressable unit.

9. A system as recited in claim 8 wherein the computer comprises a primary access terminal said primary access terminal further comprising:

a graphical user interface (GUI) for controlling the system and generating and receiving GUI format messages; and a cabin applications programming interface (CAPI) library that provides an interface between the graphical user interface and the transaction dispatcher for transferring GUI format messages and common format messages.

10. A system as recited in claim 9 wherein the CAPI library receives operator requests from the graphical user interface and Provides the request to a services function.

11. A system as recited in claim 9 wherein the GUI communicates through a GUI monitor VLRU within the one or more network addressable units.

12. A system as recited in claim 8 wherein the computer comprises a cabin file server said cabin file server further comprising:

a database server having a database containing information relating to each of the components of the system that allow communication with and/or control of these components and information relating to services offered by the system; and a services function that communicates queries from the transaction dispatcher relating to the services offered by the system to the database server to retrieve information defining the selected product or service and generating an appropriate response to requests from passenger seats.

13. A system as recited in claim 12 wherein the passenger seats communicate through a seat VLRU within one of the network addressable units.

14. A system as recited in claim 8 further comprising one or more drivers for communicating between the one or more line replaceable units and the computer.

15. The system as recited in claim 12, wherein the services include passenger entertainment system control services, movie cycle services, video services, video announcement services, game rental services, movie sales services, catalog sales services, drink sales services, duty free sales services, landscape camera services, media server services, Internet services, and video teleconferencing services.

16. A passenger entertainment system comprising a plurality of line replaceable units for performing entertainment and passenger and operator control functions, a primary access terminal for providing an operator interface to the passenger entertainment systems, and a cabin file server for processing passenger transactions said primary access terminal and said cabin file server each having a control center common executive said control center common executive further comprising:

a message processor for moving messages to and from the line replaceable units and for putting messages from the line replaceable units in a common format;

one or more network addressable units connected to the message processor for routing common format messages wherein each line replaceable unit in the plurality of line replaceable units that communicates with the control center common executive has a corresponding network addressable unit; and a transaction dispatcher connected to the one or more network addressable units wherein said transaction dispatcher moves common format message between the one or more network addressable units and applications services.

17. The passenger entertainment system of claim 16 wherein when a line replaceable unit communicates with the control center common executive a virtual line replaceable unit is created within said one or more network addressable units.

18. The passenger entertainment system of claim 17 wherein said primary access terminal control center common executive one or more network addressable units further comprise:
- an audio tuner virtual line replaceable unit for controlling audio selections;
- a card reader virtual line replaceable unit for collecting and forwarding data from a credit card reader;
- a graphical user interface virtual line replaceable unit to start and end a graphical user interface;
- a primary access terminal virtual line replaceable unit for built-in testing; and
- a printer virtual line replaceable unit for querying a control center printer.

19. The passenger entertainment system of claim 17 wherein said cabin file server control center common executive one or more network addressable units further comprise a seat network addressable unit for controlling communications with passenger seats and receiving passenger transactions from said seats.

20. The passenger entertainment system of claim 19 wherein said cabin file server control center common executive one or more network addressable units further comprise:
- a backbone network addressable unit for receiving and processing messages that originate from audio video units, area distribution boxes, and passenger entertainment system controller line replaceable units;
- a video cassette player network addressable unit for communicating with video source line replaceable units; and
- a test port network addressable unit for controlling built-in test communications.

* * * * *